(12) United States Patent
Li et al.

(10) Patent No.: US 11,737,096 B2
(45) Date of Patent: Aug. 22, 2023

(54) SIDELINK BANDWIDTH PARTS WITH SIDELINK CARRIER AGGREGATION

(71) Applicant: QUALCOMM Incorporated, San Diego, CA (US)

(72) Inventors: Qing Li, Princeton Junction, NJ (US); Seyedkianoush Hosseini, San Diego, CA (US); Junyi Li, Fairless Hills, PA (US); Ozcan Ozturk, San Diego, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 17/444,259

(22) Filed: Aug. 2, 2021

(65) Prior Publication Data
US 2023/0040863 A1    Feb. 9, 2023

(51) Int. Cl.
*H04W 72/20* (2023.01)
*H04W 76/27* (2018.01)

(52) U.S. Cl.
CPC ........... *H04W 72/20* (2023.01); *H04W 76/27* (2018.02)

(58) Field of Classification Search
CPC . H04W 72/1278; H04W 76/27; H04W 92/18; H04W 76/19; H04W 76/23; H04W 72/20; H04L 5/001; H04L 5/0051; H04L 5/0092; H04L 5/0053; H04L 5/0055; H04L 5/0057; H04L 5/0033; H04L 5/0098
See application file for complete search history.

(56) References Cited

U.S. PATENT DOCUMENTS

2020/0029318 A1* 1/2020 Guo .................... H04W 72/042
2020/0252990 A1* 8/2020 Ganesan ............... H04W 76/14
(Continued)

FOREIGN PATENT DOCUMENTS

EP    3723435 A1    10/2020
EP    3979677 A1    4/2022
(Continued)

OTHER PUBLICATIONS

3GPP TSG RAN WG1 Meeting #95; R1-1813555, Source: Huawei, HiSilicon; Title: Bandwidth Parts and Resource Pools for V2X sidelink; Spokane, USA, Nov. 12-16, 2018; (Year: 2018).*
(Continued)

*Primary Examiner* — Mohammed S Chowdhury
(74) *Attorney, Agent, or Firm* — Changwoo Yang

(57) ABSTRACT

Various aspects of the present disclosure generally relate to wireless communication. In some aspects, a user equipment (UE) may identify a sidelink bandwidth part configuration for a plurality of sidelink carriers, wherein the sidelink bandwidth part configuration configures one or more sidelink bandwidth parts for each sidelink carrier of the plurality of sidelink carriers. The UE may identify at least one selected sidelink carrier selected from the plurality of sidelink carriers and an active sidelink bandwidth part for each of the at least one selected sidelink carrier from the one or more sidelink bandwidth parts configured for the at least one selected sidelink carrier. The UE may communicate with another UE in the active sidelink bandwidth part on each of the at least one selected sidelink carrier. Numerous other aspects are described.

5 Claims, 17 Drawing Sheets

(56) References Cited

U.S. PATENT DOCUMENTS

| | | | |
|---|---|---|---|
| 2020/0288434 A1* | 9/2020 | Choi | H04L 5/0091 |
| 2020/0328865 A1* | 10/2020 | Choi | H04W 72/0453 |
| 2021/0028912 A1* | 1/2021 | Xu | H04W 72/0446 |
| 2021/0168814 A1* | 6/2021 | Chen | H04W 72/0493 |
| 2021/0219292 A1* | 7/2021 | Wang | H04W 72/0453 |
| 2022/0007364 A1* | 1/2022 | Hou | H04W 72/0453 |
| 2022/0070878 A1* | 3/2022 | Lee | H04L 5/0098 |
| 2022/0225292 A1* | 7/2022 | Mohammad Soleymani | H04L 1/0038 |
| 2022/0255680 A1* | 8/2022 | Moon | H04W 72/1284 |

FOREIGN PATENT DOCUMENTS

| | | |
|---|---|---|
| KR | 20200119720 A | 10/2020 |
| WO | 2020238684 A1 | 12/2020 |

OTHER PUBLICATIONS

3GPP TSG RAN WG1 Meeting #96; R1-1903572, Source: Huawei, Title: Feature lead summary for AI 7.2.4.3: Uu-based sidelink resource allocation/configuration, Athens, Greece, Feb. 25-Mar. 1, 2019; (Year: 2019).*

3GPP TSG RAN WG1 Meeting #97; R1-1906008, Source: Huawei, HiSilicon, Title: Sidelink physical layer procedures for NR V2X, Reno, USA, May 13-17, 2019. (Year: 2019).*

International Search Report and Written Opinion—PCT/US2022/073220—ISA/EPO—dated Oct. 10, 20022.

* cited by examiner

SIDELINK BANDWIDTH PARTS WITH SIDELINK CARRIER AGGREGATION

FIELD OF THE DISCLOSURE

Aspects of the present disclosure generally relate to wireless communication and to techniques and apparatuses for sidelink bandwidth parts with sidelink carrier aggregation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio "NR," which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a first user equipment (UE) for wireless communication. The first user equipment may include a memory and one or more processors coupled to the memory. The one or more processors may be configured to identify a sidelink bandwidth part configuration for a plurality of sidelink carriers, wherein the sidelink bandwidth part configuration configures one or more sidelink bandwidth parts for each sidelink carrier of the plurality of sidelink carriers. The one or more processors may be configured to identify at least one selected sidelink carrier selected from the plurality of sidelink carriers and an active sidelink bandwidth part for each of the at least one selected sidelink carrier from the one or more sidelink bandwidth parts configured for the at least one selected sidelink carrier. The one or more processors may be configured to communicate with a second UE in the active sidelink bandwidth part on each of the at least one selected sidelink carrier.

Some aspects described herein relate to a method of wireless communication performed by a first UE. The method may include identifying a sidelink bandwidth part configuration for a plurality of sidelink carriers, wherein the sidelink bandwidth part configuration configures one or more sidelink bandwidth parts for each sidelink carrier of the plurality of sidelink carriers. The method may include identifying at least one selected sidelink carrier selected from the plurality of sidelink carriers and an active sidelink bandwidth part for each of the at least one selected sidelink carrier from the one or more sidelink bandwidth parts configured for the at least one selected sidelink carrier. The method may include communicating with a second UE in the active sidelink bandwidth part on each of the at least one selected sidelink carrier.

Some aspects described herein relate to a non-transitory computer-readable medium that stores a set of instructions for wireless communication by a first UE. The set of instructions, when executed by one or more processors of the first UE, may cause the first UE to identify a sidelink bandwidth part configuration for a plurality of sidelink carriers, wherein the sidelink bandwidth part configuration configures one or more sidelink bandwidth parts for each sidelink carrier of the plurality of sidelink carriers. The set of instructions, when executed by one or more processors of the first UE, may cause the first UE to identify at least one selected sidelink carrier selected from the plurality of sidelink carriers and an active sidelink bandwidth part for each of the at least one selected sidelink carrier from the one or more sidelink bandwidth parts configured for the at least one selected sidelink carrier. The set of instructions, when executed by one or more processors of the first UE, may cause the first UE to communicate with a second UE in the active sidelink bandwidth part on each of the at least one selected sidelink carrier.

Some aspects described herein relate to an apparatus for wireless communication. The apparatus may include means for identifying a sidelink bandwidth part configuration for a plurality of sidelink carriers, wherein the sidelink bandwidth part configuration configures one or more sidelink bandwidth parts for each sidelink carrier of the plurality of sidelink carriers. The apparatus may include means for identifying at least one selected sidelink carrier selected from the plurality of sidelink carriers and an active sidelink bandwidth part for each of the at least one selected sidelink carrier from the one or more sidelink bandwidth parts configured for the at least one selected sidelink carrier. The apparatus may include means for communicating one or more sidelink communications in the active sidelink bandwidth part on each of the at least one selected sidelink carrier.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
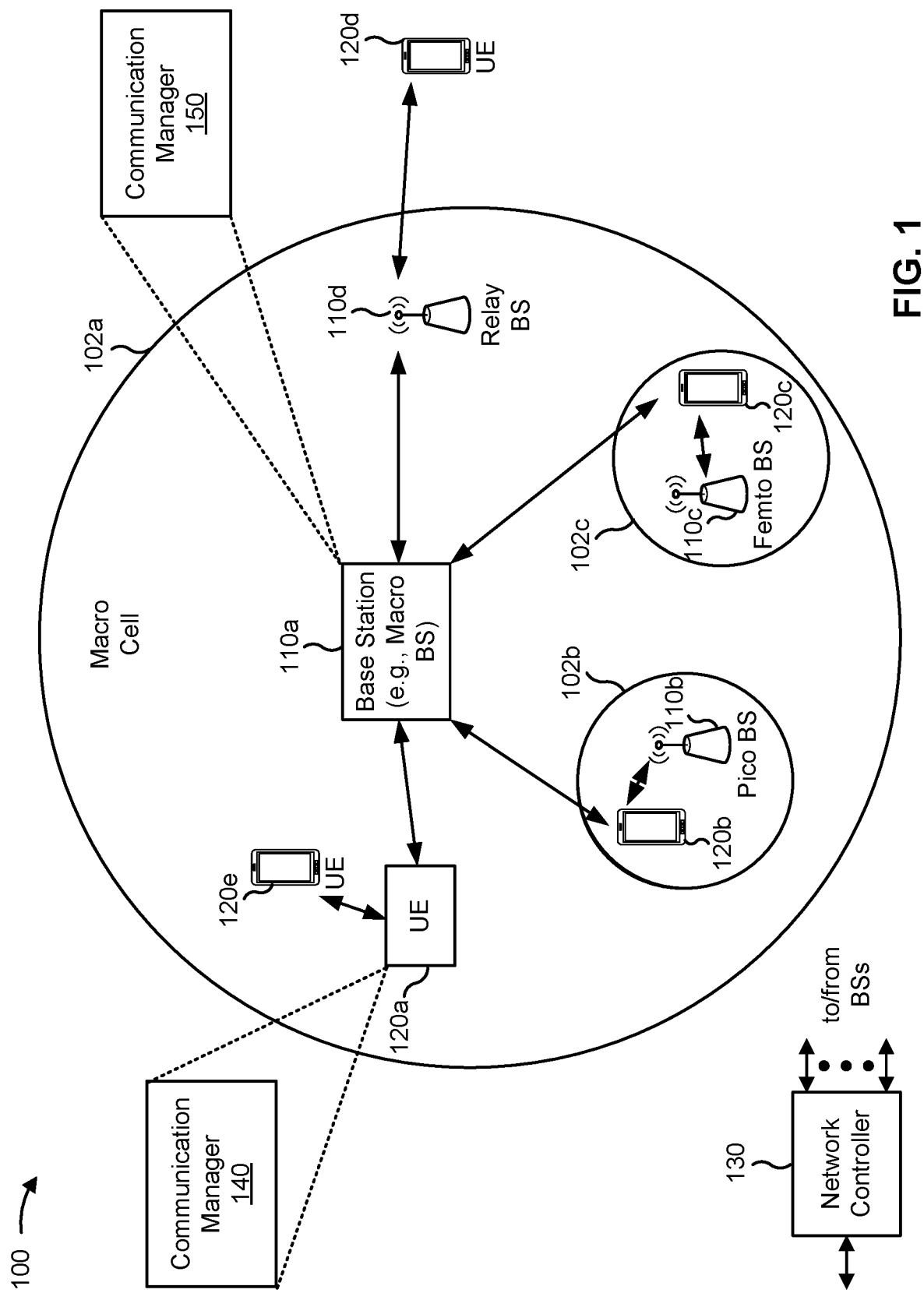
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may identify a sidelink bandwidth part configuration for a plurality of sidelink carriers, wherein the sidelink bandwidth part configuration configures one or more sidelink bandwidth parts for each sidelink carrier of the plurality of sidelink carriers; identify at least one selected sidelink carrier selected from the plurality of sidelink carriers and an active sidelink bandwidth part for each of the at least one selected sidelink carrier from the one or more sidelink bandwidth parts configured for the at least one selected sidelink carrier; and communicate with another UE in the active sidelink bandwidth part on each of the at least one selected sidelink carrier. Additionally, or alternatively, the communication manager 140 may perform one or more other operations described herein.

In some aspects, as described in more detail elsewhere herein, the communication manager 140 may transmit, to one or more other UEs, a sidelink bandwidth part configuration for a plurality of sidelink carriers, wherein the sidelink bandwidth part configuration configures one or more sidelink bandwidth parts for each sidelink carrier of the plurality of sidelink carriers; and transmit, to the one or more other UEs, an indication of at least one selected sidelink carrier and an active sidelink bandwidth part for each of the at least one selected sidelink carrier from the one or more sidelink bandwidth parts configured for the at least one selected sidelink carrier. Additionally, or alternatively, the communication manager 140 may perform one or more other operations described herein.

In some aspects, the base station 110 may include a communication manager 150. As described in more detail elsewhere herein, the communication manager 150 may transmit, to a UE, a sidelink bandwidth part configuration for a plurality of sidelink carriers, wherein the sidelink bandwidth part configuration configures one or more sidelink bandwidth parts for each sidelink carrier of the plurality of sidelink carriers; and transmit, to the UE, an indication of at least one selected sidelink carrier and an active sidelink bandwidth part for each of the at least one selected sidelink carrier from the one or more sidelink bandwidth parts configured for the at least one selected sidelink carrier. Additionally, or alternatively, the communication manager 150 may perform one or more other operations described herein.

As indicated above, FIG. 1 is provided as an example. Other examples may differ from what is described with regard to FIG. 1.

Figure 2:
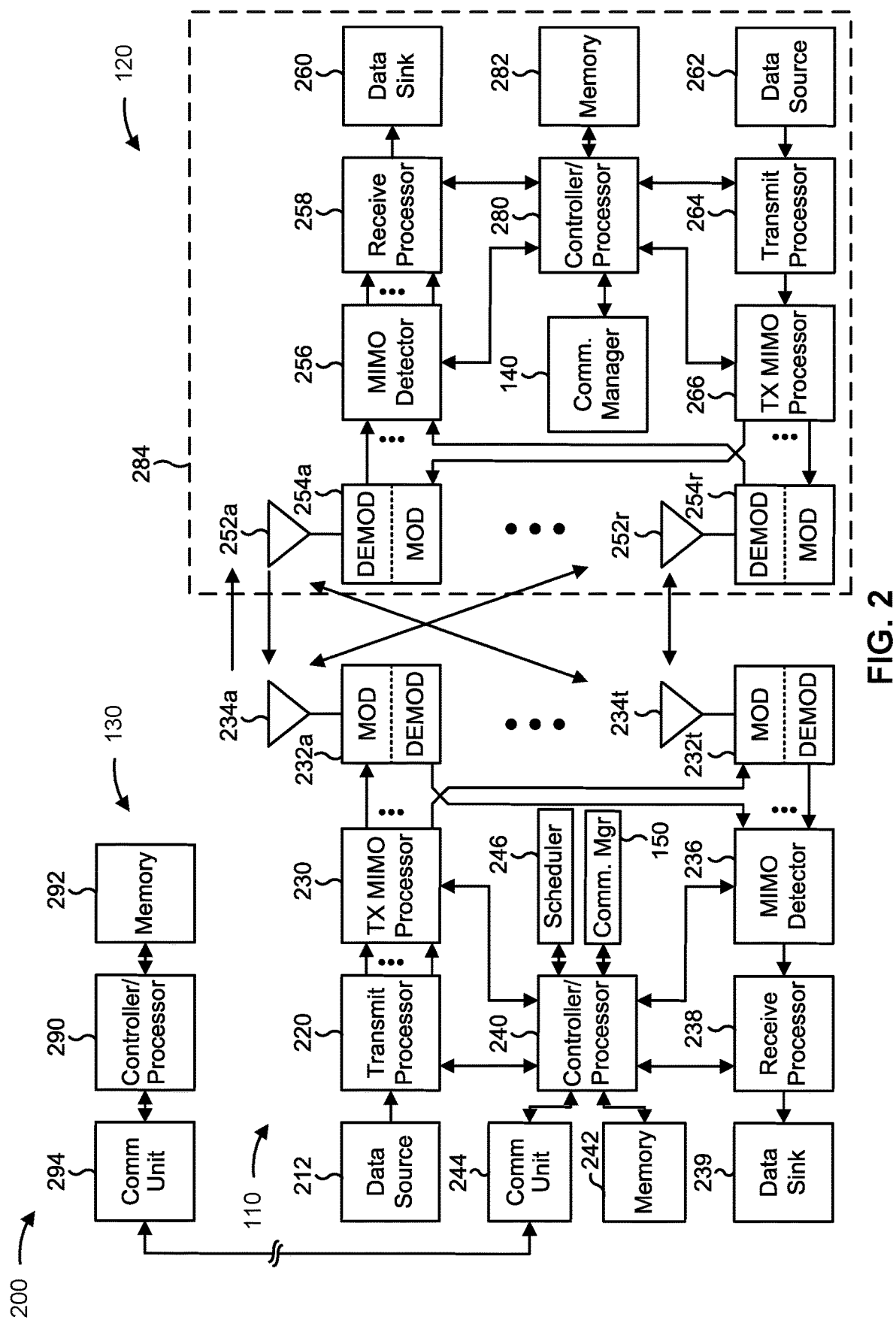
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information and control information (e.g., CQI requests, grants, and/or upper layer signaling) and provide overhead symbols and control symbols. The transmit processor 220 may generate reference symbols for reference signals (e.g., a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-17).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-17).

The controller/processor 240 of the base station 110, the controller/processor 280 of the UE 120, and/or any other component(s) of FIG. 2 may perform one or more techniques associated with sidelink bandwidth parts, as described in more detail elsewhere herein. For example, the controller/processor 240 of the base station 110, the controller/processor 280 of the UE 120, and/or any other component(s) of FIG. 2 may perform or direct operations of, for example, process 1300 of FIG. 13, process 1400 of FIG. 14, process 1500 of FIG. 15, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1300 of FIG. 13, process 1400 of FIG. 14, process 1500 of FIG. 15, and/or other processes as described herein. In some examples, executing instructions may include running the instructions, converting the instructions, compiling the instructions, and/or interpreting the instructions, among other examples.

In some aspects, the UE 120 includes means for identifying a sidelink bandwidth part configuration for a plurality of sidelink carriers, wherein the sidelink bandwidth part configuration configures one or more sidelink bandwidth parts for each sidelink carrier of the plurality of sidelink carriers; means for identifying at least one selected sidelink carrier selected from the plurality of sidelink carriers and an active sidelink bandwidth part for each of the at least one selected sidelink carrier from the one or more sidelink bandwidth parts configured for the at least one selected sidelink carrier; and/or means for communicating with another UE in the active sidelink bandwidth part on each of the at least one selected sidelink carrier. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for transmitting, to one or more other UEs, a sidelink bandwidth part configuration for a plurality of sidelink carriers, wherein the sidelink bandwidth part configuration configures one or more sidelink bandwidth parts for each sidelink carrier of the plurality of sidelink carriers; and/or means for transmitting, to the one or more other UEs, an indication of at least one selected sidelink carrier and an active sidelink bandwidth part for each of the at least one selected sidelink carrier from the one or more sidelink bandwidth parts configured for the at least one selected sidelink carrier. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE, a sidelink bandwidth part configuration for a plurality of sidelink carriers, wherein the sidelink bandwidth part configuration configures one or more sidelink bandwidth parts for each sidelink carrier of the plurality of sidelink carriers; and/or means for transmitting, to the UE, an indication of at least one selected sidelink carrier and an active sidelink bandwidth part for each of the at least one selected sidelink carrier from the one or more sidelink bandwidth parts configured for the at least one selected sidelink carrier. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
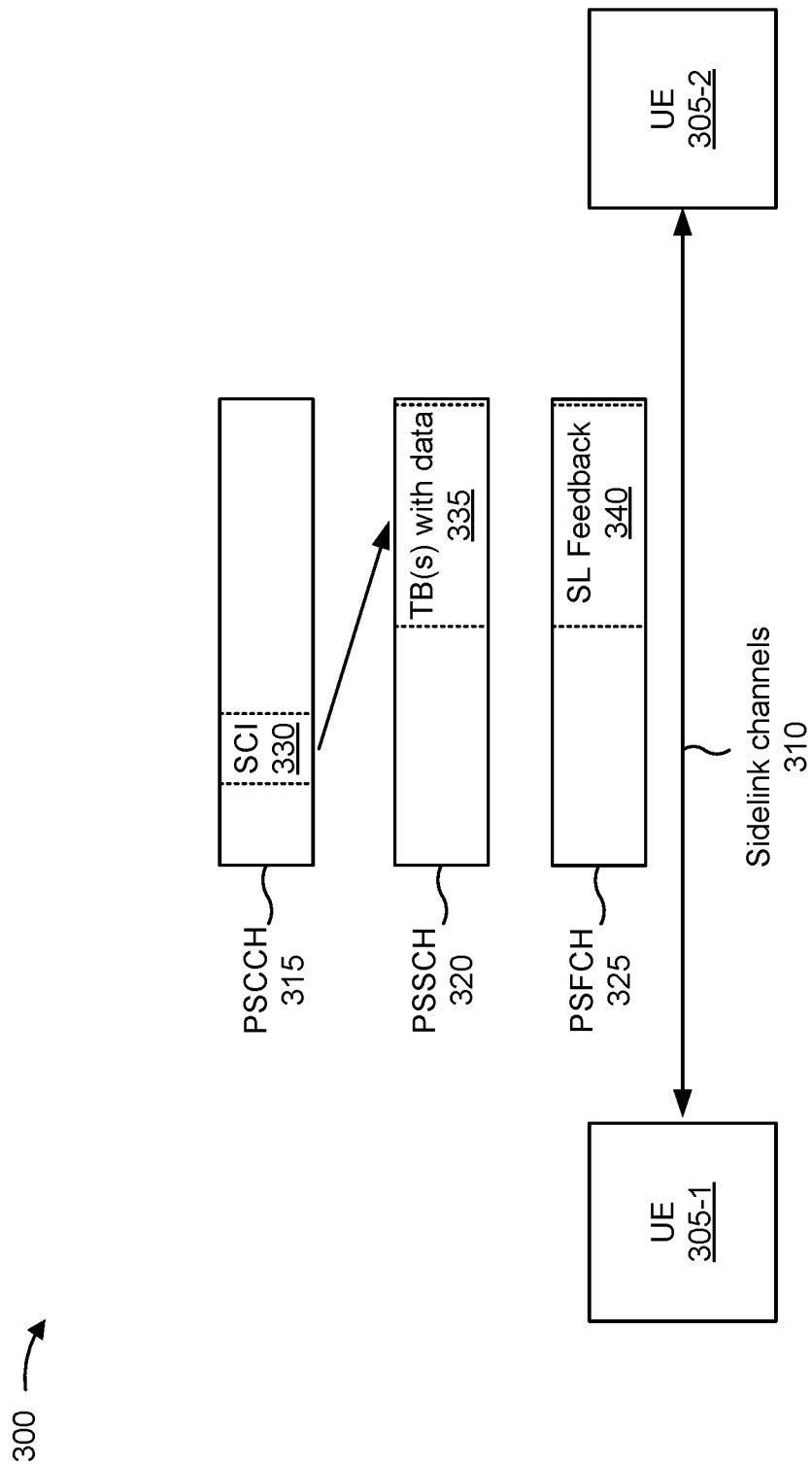
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some examples, the UEs 305 (e.g., UE 305-1 and/or UE 305-2) may correspond to one or more other UEs described elsewhere herein, such as UE 120. In some examples, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330 (e.g., first stage SCI (SCI-1)) which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information).

Although shown on the PSCCH 315 in FIG. 3, in some examples, the SCI 330 may include multiple communications in different stages. For example, SCI (SCI-1) may be transmitted on the PSCCH 315, and second stage SCI (SCI-2) may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process identifier (ID), a new data indicator (NDI), a source identifier, a destination identifier, and/or a channel state information (CSI) report trigger.

In some examples, the one or more sidelink channels 310 may use resource pools. For example, a scheduling assignment (e.g., included in SCI 330) may be transmitted in sub-channels using specific resource blocks (RBs) across time. In some examples, data transmissions (e.g., on the PSSCH 320) associated with a scheduling assignment (e.g., SCI-1) may occupy adjacent RBs in the same slot as the scheduling assignment (e.g., using frequency division multiplexing).

In some examples, a UE 305 may operate using a resource allocation mode (e.g., Mode 1) in which a base station allocates resources for sidelink communications between UEs 305. In some examples, a UE 305 may operate using a resource allocation mode (e.g., Mode 2) in which resource selection and/or scheduling is autonomously performed by the UE 305 (e.g., rather than a base station 110). In some examples, the UE 305 may perform resource selection and/or scheduling by sensing channel availability for transmissions using Mode 2. For example, the UE 305 may measure an RSSI parameter (e.g., a sidelink-RSSI (S-RSSI) parameter) associated with various sidelink channels, may measure an RSRP parameter (e.g., a PSSCH-RSRP and/or PSCCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 carried in the PSCCH 315 (e.g., SCI-1), which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of RBs that the UE 305 can use for a particular set of subframes).

In the resource allocation mode 2 where resource selection and/or scheduling is performed by a UE 305, the UE 305 may generate sidelink grants with reserved resources, and may transmit the grants in SCI 330. A sidelink grant may indicate, for example, one or more parameters (e.g., transmission parameters) to be used for an upcoming sidelink transmission, such as one or more subchannels to be used for the upcoming sidelink transmission on the PSSCH 320 (e.g., for TBs 335), one or more slots to be used for the upcoming sidelink transmissions, and/or an MCS to be used for the upcoming sidelink transmission. In some examples, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an aperiodic sidelink transmission.

As indicated above, FIG. 3 is provided as an example. Other examples may differ from what is described with respect to FIG. 3.

Figure 4:
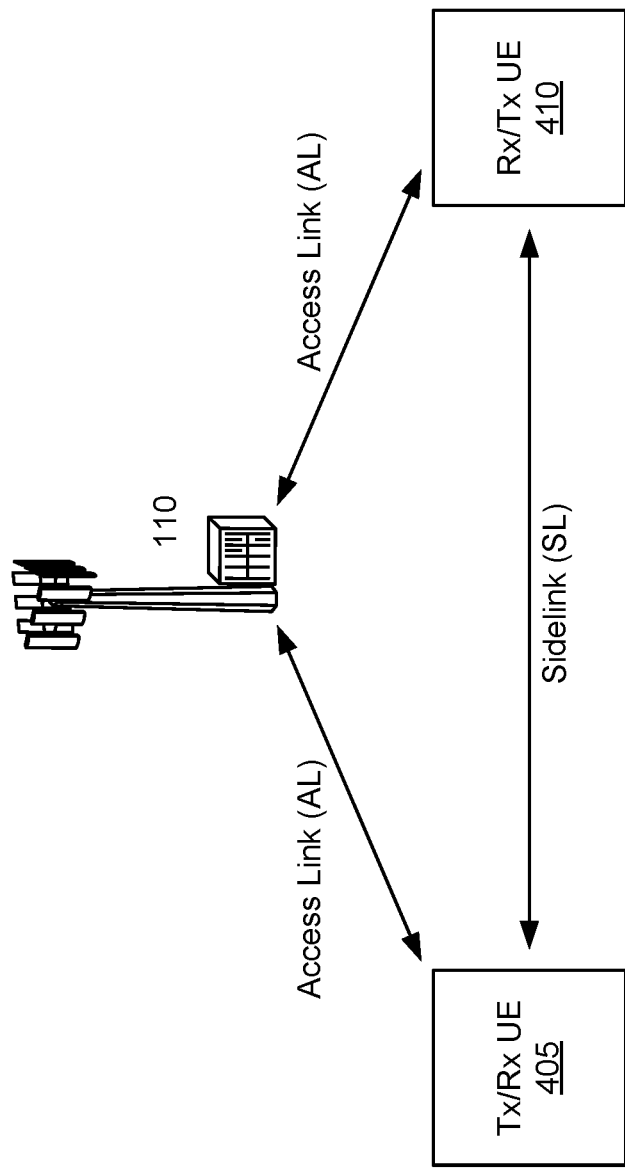
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink resource allocation modes, a base station 110 may communicate with the Tx/Rx UE 405 via a first access link. Additionally, or alternatively, in some sidelink resource allocation modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
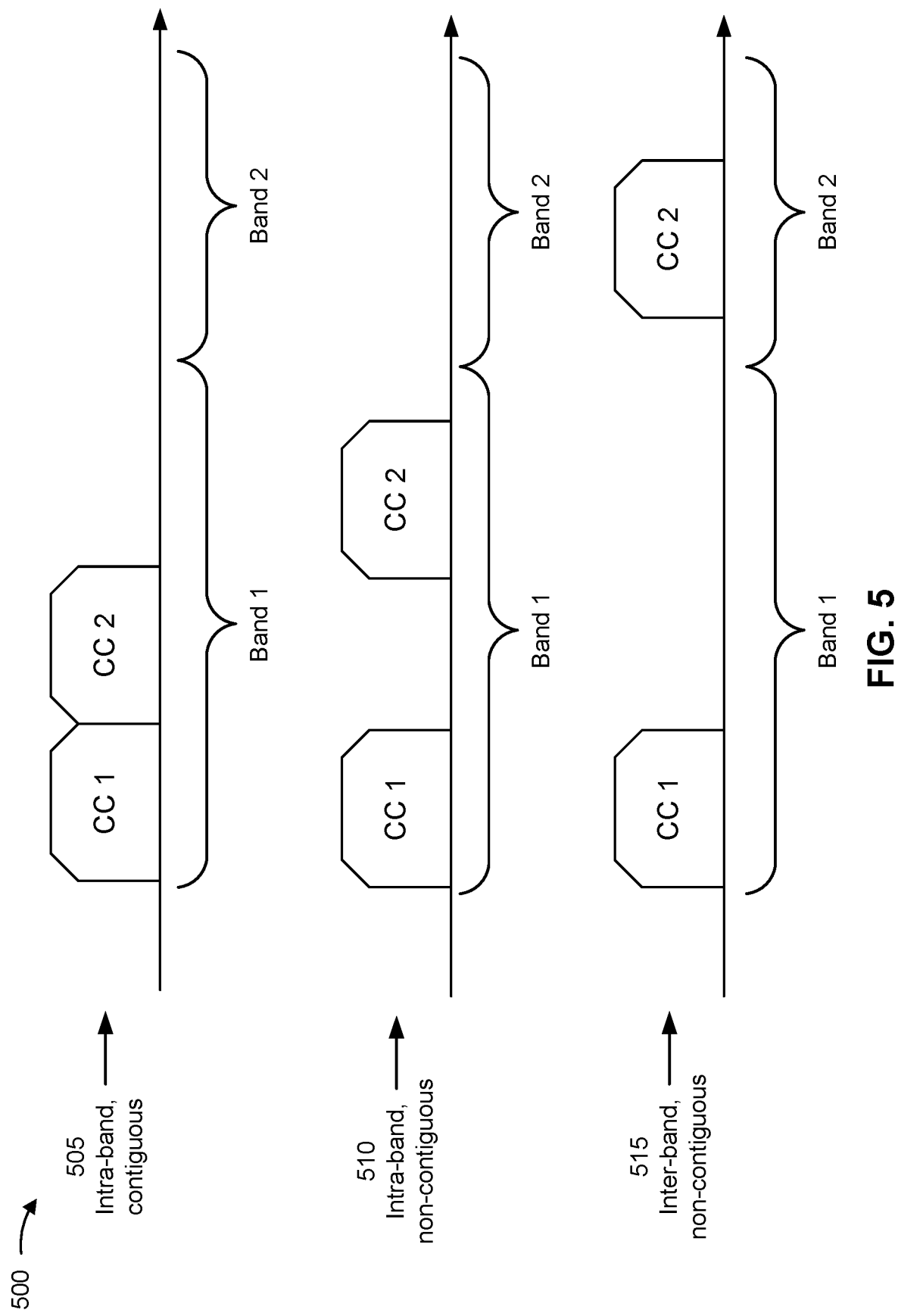
FIG. 5 is a diagram illustrating examples of carrier aggregation, in accordance with the present disclosure.

FIG. 5 is a diagram illustrating examples 500 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A base station 110 may configure carrier aggregation for a UE 120, such as in a radio resource control (RRC) message, downlink control information (DCI), and/or another signaling message.

As shown by reference number 505, in some examples, carrier aggregation may be configured in an intra-band contiguous mode where the aggregated carriers are contiguous to one another and are in the same band. As shown by reference number 510, in some examples, carrier aggregation may be configured in an intra-band non-contiguous mode where the aggregated carriers are non-contiguous to one another and are in the same band. As shown by reference number 515, in some examples, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells) at the Uu interface. In some examples, the primary carrier may carry control information (e.g., downlink control information and/or scheduling information) for scheduling data communications on one or more secondary carriers, which may be referred to as cross-carrier scheduling at the Uu interface. In some examples, a carrier (e.g., a primary carrier or a secondary carrier) may carry control information for scheduling data communications on the carrier, which may be referred to as in-carrier scheduling.

In cases of carrier aggregation for uplink or downlink (e.g., on the Uu interface, the multi-carrier nature of the physical layer may be exposed only to the medium access control (MAC) layer, for which one HARQ entity may be required per serving cell. For example, in both uplink and downlink, there may be one independent HARQ entity per serving cell, and one TB may be generated per assignment or grant per serving cell in the absence of spatial multiplexing.

In some examples, sidelink carrier aggregation may be implemented in LTE V2X on PC5 interface. In cases of sidelink carrier aggregation for LTE V2X, one independent HARQ entity per carrier may be used for V2X sidelink communication, and potential HARQ retransmissions for the HARQ entity are mapped to a single carrier. In some examples, multiple TBs may be transmitted in parallel on different carriers, resulting in a throughput gain. In a case in which a UE is operating in a resource allocation mode in which a base station allocates resources for sidelink communications, sidelink carrier aggregation may be implemented by including a carrier indication field (CIF) in the DCI received from the base station (e.g., in resource allocation Mode 3 in LTE), that includes the dynamic grant for a sidelink communication. In a case, in which a UE is operating in a resource allocation mode in which resource selection and/or scheduling is autonomously performed by the UE (e.g., in resource allocation Mode 4 in LTE), the UE may use a sensing procedure to select resources independently on each involved carrier. In this case, the same carrier is used for all TBs of the same sidelink process, at least until the sidelink process triggers resource re-selection. As of Release 16 (Rel-16) of the 3GPP wireless communication standard, sidelink carrier aggregation is not supported for NR/5G sidelink communications (e.g., NR V2X).

As indicated above, FIG. 5 is provided as an example. Other examples may differ from what is described with regard to FIG. 5.

In some examples, a UE may be configured with multiple bandwidth parts (BWPs) per carrier for downlink and uplink (e.g., up to four BWPs per carrier for downlink and up to four BWPs per carrier for uplink), but only one BWP per carrier may be active for downlink and one BWP per carrier may be active for uplink at a given time. When a base station configures a BWP for a UE, the base station may configure parameters for the BWP including BWP numerology (u), BWP bandwidth size, frequency location (e.g., NR absolute radio-frequency channel number (NR-ARFCN)), and a control resource set (CORESET) for the BWP. In this case, the UE is expected to receive and transmit only within the frequency range configured for the active BWPs with the associated numerologies. In some cases (e.g., in Rel-16 of the 3GPP wireless communication standard), multiple sidelink bandwidth parts on a sidelink carrier may not be supported in NR/5G sidelink communications. That is, in some cases, only one BWP may be configured and activated for all UEs on a sidelink carrier, and only one sidelink carrier may be supported for NR/5G sidelink communications.

Supporting new carrier frequencies and operation scenarios may provide more flexible operations in the NR sidelink spectrum, such as combinations of NR carriers in licensed and unlicensed carriers or intelligent transportation system (ITS) carriers or combinations of NR sidelink carriers in different frequency bands (e.g., FR1 and FR2 or 60 GHz band). Sidelink carrier aggregation with different carrier combinations of inter-band or intra-band carriers may be beneficial for providing increased operation bandwidth for high data rate applications or services, as well as for providing redundance over multiple carriers for low latency and high reliability applications or services, such as industrial IoT (IIoT), mission-critical sensing and control, video surveillance, and/or extended reality (XR) (e.g., virtual reality and/or augmented reality (AR)), among other examples. With sidelink carriers in FR2 or the 60 GHz band, a wider operation bandwidth may have a benefit of increasing data rates. However, users of some services or applications, such as IIoT or XR wearable devices, may not demand a high data rate. The use of a single wide BWP for all UEs may result in high power consumption, which is not desirable for many types UEs, such as IIoT devices and/or XR wearable devices, among other examples.

Some techniques and apparatuses described herein enable a UE to support sidelink carrier aggregation with multiple sidelink BWPs per sidelink carrier. In some aspects, a UE may identify a sidelink BWP configuration for a plurality of sidelink carriers, and the sidelink BWP configuration may configure one or more sidelink BWPs for each sidelink carrier of the plurality of sidelink carriers. The UE may identify, for at least one selected sidelink carrier, an active sidelink BWP from the one or more sidelink BWPs for each of the at least one selected sidelink carrier. The UE may communicate with another UE in the active sidelink BWP on the at least one selected sidelink carrier. As a result, UEs may be configured to transmit and/or receive sidelink communications within smaller operation bandwidths, which may result in reduced power consumption for UEs, as compared with utilizing wideband operations for all UEs communicating on a sidelink carrier with a large bandwidth (e.g., a carrier in FR2 or the 60 GHz band).

Figure 6:
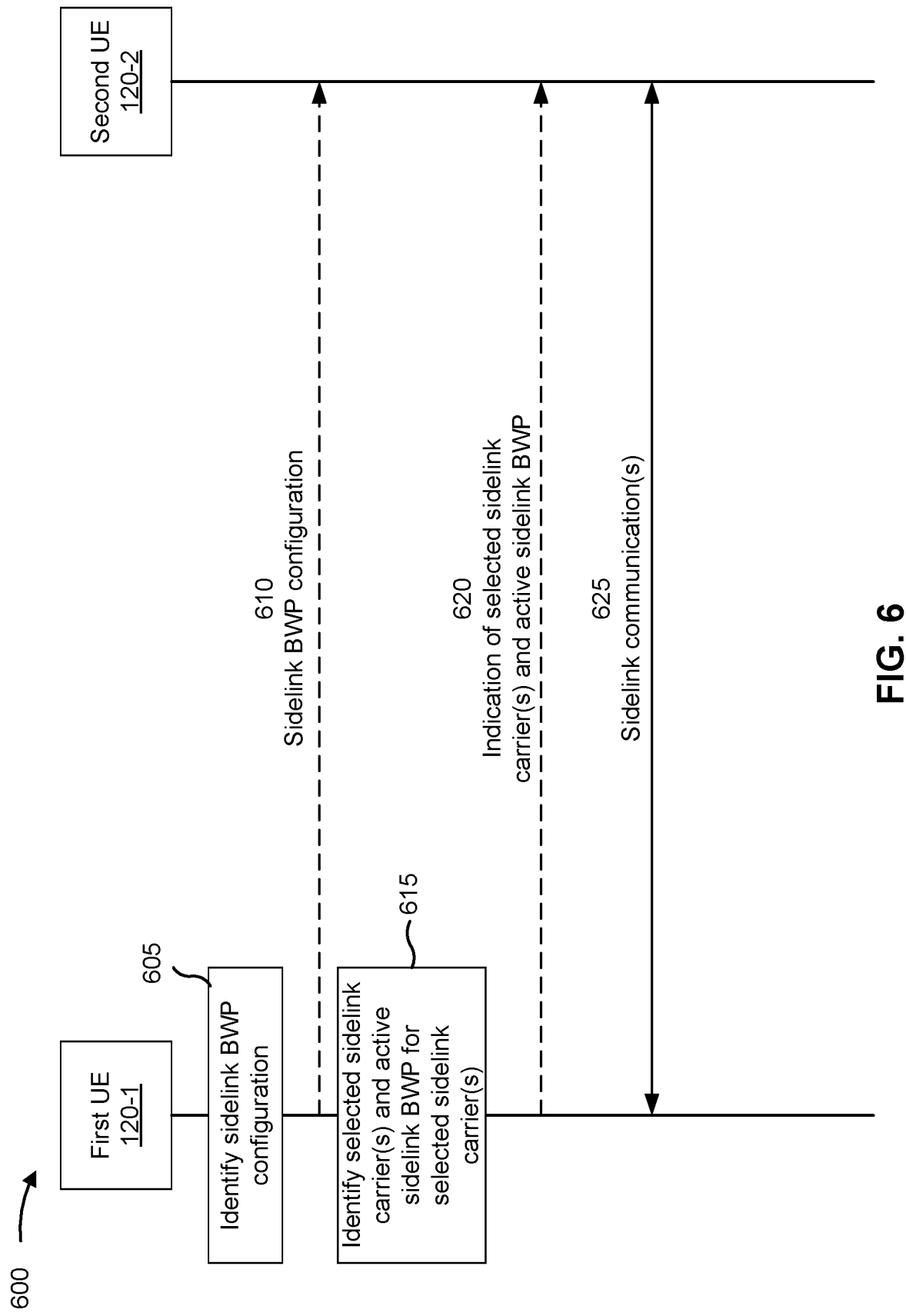
FIGS. 6-12 are diagrams illustrating examples associated with sidelink bandwidth parts with sidelink carrier aggregation, in accordance with the present disclosure.

FIG. 6 is a diagram illustrating an example 600 associated with sidelink BWPs with sidelink carrier aggregation, in accordance with the present disclosure. As shown in FIG. 6, example 600 includes communication between a first UE 120-1 and a second UE 120-2. In some aspects, the first UE 120-1 and/or the second UE 120-2 may be included in a wireless network, such as wireless network 100. The first UE 120-1 and the second UE 120-2 may communicate via a wireless access link, which may include a sidelink. In some aspects, the first UE 120-1 may be a Tx UE and the second UE 120-2 may be an Rx UE. In some aspects, the first UE 120-1 may be an Rx UE and the second UE 120-2 may be a Tx UE.

As shown in FIG. 6, and by reference number 605, the first UE 120-1 may identify a sidelink BWP configuration. The sidelink BWP configuration may be for a plurality of sidelink carriers. For example, the plurality of sidelink carriers may include multiple sidelink carrier candidates, which may be selected to be used by the first UE 120-1 for sidelink communications between the first UE 120-1 and the second UE 120-2 and/or other UEs. The sidelink BWP configuration may configure one or more sidelink BWPs for each sidelink carrier in the plurality of sidelink carriers.

In some aspects, the first UE 120-1 may be pre-configured with a sidelink BWP configuration. For example, the first UE 120-1 may be pre-configured with the sidelink BWP configuration by an original equipment manufacturer (OEM), by a server (e.g., a V2X server), or by a network device in a cellular network (e.g., when initially accessing the cellular network), among other examples. In a case in which the first UE 120-1 may be pre-configured with a sidelink BWP configuration, the first UE 120-1 may store the pre-configured sidelink BWP configuration, and the first UE 120-1 may identify the sidelink BWP configuration by identifying the stored pre-configured sidelink BWP configuration. In some aspects, the pre-configured sidelink BWP configuration for the UE may be a default sidelink BWP configuration or an initial sidelink BWP configuration.

In some aspects, the first UE 120-1 may identify the sidelink BWP configuration by receiving the sidelink BWP configuration from a base station. For example, the base station may determine the sidelink BWP configuration for the first UE 120-1, and the base station may transmit, to the first UE 120-1, an RRC configuration message that includes the sidelink BWP configuration. In some aspects, the first UE 120-1 may transmit UE capability information for sidelink and/or UE assistance information for sidelink to the base station, and the base station may determine the sidelink BWP configuration for the first UE 120-1 based at least in part on the UE capability information for sidelink and/or the UE assistance information for sidelink. In some aspects, the first UE 120-1 may be pre-configured with a default or initial sidelink BWP configuration, and the base station may adjust the default or initial sidelink BWP configuration, and transmit an adjusted or updated sidelink BWP configuration to the first UE 120-1.

In some aspects, the first UE 120-1 may identify the sidelink BWP configuration by receiving the sidelink BWP configuration from another UE. For example, the other UE may be a "special purpose" UE, such as a roadside unit (RSU), group lead, cluster head, or scheduling UE, among other examples. In this case, the first UE 120-1 may be in proximity to the other UE, and out of the base station's control (e.g., out of a coverage range of a base station). In some aspects, the other UE (e.g., the "special purpose" UE) may determine the sidelink BWP configuration for the first UE 120-1, and the other UE may transmit the sidelink BWP configuration to the first UE 120-1. For example, the other UE (e.g., the "special purpose" UE) may broadcast the sidelink BWP configuration to UEs in proximity (including the first UE 120-1) via a PC5 RRC broadcast message, the other UE (e.g., the "special purpose UE) may groupcast the sidelink BWP configuration to a group of UEs (including the first UE 120-1) via a PC5 RRC groupcast message, or the other UE (e.g., the "special purpose UE) may unicast the sidelink BWP configuration to a UE (e.g., the first UE 120-1) via a PC5 RRC Reconfiguration message. In some aspects, the first UE 120-1 may transmit UE capability information and/or UE assistance information to the other UE on the PC5 interface, and the other UE may determine the sidelink BWP configuration based at least in part on the UE capability information and/or the UE assistance information. In some aspects, the first UE 120-1 may be pre-configured with a default or initial sidelink BWP configuration, and the other UE may adjust the default or initial sidelink BWP configuration, and transmit an adjusted or updated sidelink BWP configuration to the first UE 120-1 and/or UEs in a group or in proximity of the other UE.

In some aspects, the first UE 120-1 may identify the sidelink BWP configuration by determining the sidelink BWP configuration for the first UE 120-1. For example, the first UE 120-1 may establish a PC5 RRC connection with the second UE 120-2, and the first UE 120-1 may determine the sidelink BWP configuration for unicast sidelink communications between the first UE 120-1 and the second UE 120-2. In some aspects, the first UE 120-1 may determine a sidelink BWP configuration for bi-direction sidelink communications (e.g., bi-directional unicast communications) between the first UE 120-1 and the second UE 120-2. In some aspects, the first UE 120-1 may determine a sidelink BWP configuration for unidirectional sidelink communications (e.g., unidirectional unicast communications) from the first UE 120-1 to the second UE 120-2 or for unidirectional sidelink communications from the second UE 120-2 to the first UE 120-1. In this case, the second UE 120-2 may determine a sidelink BWP configuration for unidirectional sidelink communications from the second UE 120-2 to the first UE 120-1 or for unidirectional sidelink communications from the first UE 120-1 to the second UE 120-2. In some aspects, the second UE 120-2 may transmit UE assistance information to the first UE 120-1, and the first UE 120-1 may determine the sidelink BWP configuration based at least in part on the UE assistance information. Similarly, in some aspects, the first UE 120-1 may transmit UE assistance information to the second UE 120-2, and the second UE 120-2 may determine the sidelink BWP configuration based at least in part on the UE assistance information. In some aspects, the first UE 120-1 or second UE 120-2 may be pre-configured, or configured by a base station or another UE, with a default or initial sidelink BWP configuration. In this case, the first UE 120-1 or the second UE 120-2 may use the default or initial sidelink BWP configuration to determine an adjusted or updated sidelink BWP configuration for the unicast communications with the second UE 120-2 or the first UE 120-1 respectively.

The sidelink BWP configuration may configure one or more sidelink BWPs for each sidelink carrier of the plurality of sidelink carriers. In some aspects, the sidelink BWP configuration may configure different sidelink BWPs on a sidelink carrier based at least in part on QoS, service (or service type), destination ID, a PC5 RRC connection, and/or a traffic pattern. For example, in some aspects, the sidelink BWP configuration may include, for a sidelink carrier, different sidelink BWPs associated with different services (or applications) or different service types (e.g., a first sidelink BWP associated with a first service type and a second sidelink BWP associated with a second service type). Additionally, or alternatively, the sidelink BWP configuration may include, for a sidelink carrier, different sidelink BWPs associated with different destination IDs (e.g., a first sidelink BWP associated with a first destination ID and a second sidelink BWP associated with a second destination ID).

In some aspects, the sidelink BWP configuration may configure each sidelink BWP on a sidelink carrier with a respective offset and a respective bandwidth. The offset, for a sidelink BWP, may be an offset from a frequency reference point associated with the sidelink carrier (e.g., a starting point in the frequency domain for the sidelink carrier). For example, the offset may be an offset between the frequency reference point associated with the sidelink carrier and a starting frequency for the sidelink BWP. The bandwidth may be a bandwidth size of the sidelink BWP.

In some aspects, the bandwidth of the sidelink BWPs may be based at least in part on a QoS parameter associated with the sidelink BWP. For broadcast and/or groupcast sidelink communications, the bandwidth may vary greatly for different services with different QoS requirements. For example, for services with small amounts of packet data and/or low data rate transmissions (e.g., basic safety service with a basic safety message (BSM) or a cooperative awareness message (CAM)), the bandwidth of the associated sidelink BWP may be small, whereas for services with large amounts of packet data and/or high data rates (e.g., advanced V2X services with image and/or video files for a vehicle's maneuvering), the bandwidth of the associated sidelink BWP may be large. In some aspects, the bandwidth of a sidelink BWP for a service may be configured (e.g., by a base station, the first UE 120-1, or another UE) or pre-configured (e.g., in an initial sidelink BWP configuration) based at least in part on one or more PC5 QoS parameters associated with the service. For example, the bandwidth of a sidelink BWP may be configured based at least in part on one or more PC5 QoS parameters, such as a PC5 5G QoS identifier (PQI), latency (e.g., short latency requires wide bandwidth operation), reliability (e.g., high reliability requires redundant transmission infrequency), a PC5 flow bit rate, a PC5 link aggregated maximum bit rate (PC5 LINK-AMBR), and/or a maximum data burst volume (MDBV).

For unicast sidelink communications between paired UEs (e.g., the first UE 120-1 and the second UE 120-2) with an established PC5 RRC connection, multiple services with different QoS flows may be supported on the established PC5 RRC connection. In some aspects, the first UE 120-1 may configure the bandwidth for a service supported on the PC5 RRC connection based at least in part on maximum QoS requirements associated with the service and based at least in part on UE capability information or UE assistance information received from the second UE 120-2 (e.g., the paired UE). For example, the UE capability information or UE assistance information received from the second UE 120-2 may include QoS requirements (e.g., one or more QoS parameters) and sidelink BWP configuration information associated with the second UE 120-2. In some aspects, the bandwidth may be further negotiated between the first UE 120-1 and the second UE 120-2 (e.g., the paired UEs), for example, using PC5 RRC messages.

In some aspects, different sidelink BWPs associated with different services that use sidelink broadcast and/or sidelink groupcast communications may be configured with different offsets, such that UEs participating in a service may communicate with each other within the same sidelink BWP. In some aspects, the offset for a sidelink bandwidth part may be configured (e.g., by a base station, the first UE 120-1, or another UE) based at least in part on a service type. For example, the service type may be identified by a service type ID, such as an ITS application identifier (ITS-AID), a provider service identifier (PSID), or an application identifier (AID). In this case, different sidelink BWPs (e.g., with different offsets) on a sidelink carrier may be associated with different service type IDs. UEs participating in a service on a sidelink carrier may use the same sidelink BWP (e.g., the sidelink BWP associated with the service type ID for that service) to communicate with each other.

In some aspects, the offset for a sidelink BWP may be configured based at least in part on a destination ID associated with a broadcast or a groupcast. The destination ID may identify a broadcast or a groupcast. For example, different broadcasts or groupcasts (e.g., for different services) may be associated with different destination IDs. In some aspects, sidelink BWPs associated with different destination IDs may be configured with different offsets in a sidelink carrier.

In some aspects, an offset for a sidelink BWP configured for unicast sidelink communications may be based at least in part on a PC5 RRC connection. For example, the sidelink BWP configuration may configure different sidelink BWPs on a sidelink carrier for different PC5 RRC connections (e.g., for unicast sidelink communications with different UEs). In some aspects, a sidelink BWP configured for a PC5 RRC connection may be bi-directional. In this case, the paired UEs (e.g., the first UE 120-1 and the second UE 120-2) may transmit unicast sidelink communications to each other in the same sidelink BWP. The PC5 RRC connection may be identified by a PC5 link ID for both directions in a case in which the paired UEs (e.g., the first UE 120-1 and the second UE 120-2) are configured with the same sidelink BWP (e.g., the sidelink BWP associated with the PC5 link ID) for bi-directional communications. In some aspects, the first UE 120-1 may determine the offset value for the sidelink BWP for bi-direction communications based at least in part on UE assistance information on sidelink received from the second UE 120-2 (e.g., the paired UE). For example, the UE assistance information on sidelink may include sidelink BWP configuration information which may include one or more offset values and/or one or more bandwidth values configured for each of one or more sidelink carriers for the second UE 120-2. In some aspects, the offset value or bandwidth value may be further negotiated between the first UE 120-1 and the second UE 120-2 (e.g., the paired UEs), for example using PC5 RRC messages.

In some aspects, a sidelink BWP configured for a PC5 RRC connection may be unidirectional. For example, a first sidelink BWP may be configured for unicast sidelink communications from the first UE 120-1 to the second UE 120-2 or vice versa, and a second sidelink BWP may be configured for unicast sidelink communications from the second UE 120-2 to the first UE 120-1 or vice versa. In this case, a directional PC5 RRC connection may be identified by source ID and destination ID pair. For example, the first sidelink BWP may be associated with a first source ID and destination ID pair, and the second sidelink BWP may be associated with a second source ID and destination ID pair. In some aspects, the first UE 120-1 may configure or may be configured with a first offset for the first sidelink BWP for unicast sidelink transmissions of packets from the first UE 120-1 to the second UE 120-2 or vice versa, and the second UE 120-2 may configure or may be configured with a second offset for the second BWP for unicast sidelink transmissions of packets from the second UE 120-2 to the first UE 120-1 or vice versa.

In some aspects, the offset may be calculated with a modulo operation using an ID, for example, Offset=(ID mod N)*Offset$_{min}$, where the ID may be a service type ID, a destination ID, a PC5 link ID, or a ID derived from a pair of Source ID and Destination ID, N is a integer larger than 1 (e.g. based on the number of sidelink BWPs to be spread over a sidelink carrier), and Offset$_{min}$ is the minimum offset between two adjacent sidelink BWPs, which may be the minimum bandwidth or the maximum bandwidth of sidelink BWPs to be formed on a component carrier as configured in the sidelink BWP configuration.

In some aspects, the offset may be randomized using an ID for seed, for example, Offset=Random(ID, N)*Offset$_{min}$, where the ID may be a service type ID, a destination ID, a PC5 link ID, or a ID derived from a pair of Source ID and Destination ID, N is a integer larger than 1 for the upper bound of a random integer number [0, N] (e.g. based on the number of sidelink BWPs to be spread over a sidelink carrier), and Offset$_{min}$ is the minimum offset between two adjacent sidelink BWPs, which may be the minimum bandwidth or the maximum bandwidth of sidelink BWPs to be formed on a component carrier as configured in the sidelink BWP configuration.

In some aspects, the offset may be mapped in a lookup table using the last j (j>0) LSBs or first k (k>0) MSBs of an ID which may be a service type ID, a destination ID, a PC5 link ID, or an ID derived from a pair of Source ID and Destination ID.

In some aspects, the offset and/or bandwidth values for different sidelink BWPs for a sidelink carrier may be configured based at least in part on a traffic pattern. In some aspects, different offset values may be mapped to different traffic patterns. For example, for an XR service, the first UE 120-1 may configure or may be configured with a first sidelink BWP with a narrow bandwidth and a first offset value for a first traffic pattern (e.g., no data streaming), and the first UE 120-1 may configure or may be configured with a second sidelink BWP with a wide bandwidth and a second offset value for a second traffic pattern (e.g., data streaming). In this case, the sidelink BWP configuration may also configure a first timer duration associated with the first sidelink BWP and a second time duration associated with the second sidelink BWP. The first UE 120-1 may be configured to switch from the first sidelink BWP to the second sidelink BWP upon expiration of the first timer duration, and to switch from the second BWP to the first sidelink BWP upon expiration of the second time duration.

As further shown in FIG. 6, and by reference number 610, in some aspects, the first UE 120-1 may transmit the sidelink BWP configuration to the second UE 120-2. In some aspects, the first UE 120-1 may transmit the sidelink BWP configuration to the second UE 120-2 in a case in which the first UE 120-1 receives the sidelink BWP configuration from a base station or another UE (e.g., a "special purpose" UE) and the second UE 120-2 is outside of a coverage area associated with the base station or the other UE. In this case, first UE 120-1 may broadcast the sidelink BWP configuration to second UEs 120-2 in a proximity of the first UE 120-1, or the first UE 120-1 may groupcast the sidelink BWP configuration to a group of UEs 120-2. In some aspects, the first UE 120-1 may transmit the sidelink BWP configuration to the second UE 120-2 in a case in which the first UE 120-1 determines the sidelink BWP configuration for bi-directional unicast communications between the first UE 120-1 and the second UE 120-2 or for unidirectional unicast communications from the first UE 120-1 to the second UE 120-2 or from the second UE 120-2 to the first UE 120-1. In this case, the first UE 120-1 may transmit the sidelink BWP configuration to the second UE 120-2 via a PC5 RRC message (e.g., a PC5 RRC reconfiguration message).

As further shown in FIG. 6, and by reference number 615, the first UE 120-1 may identify at least one selected sidelink carrier and an active sidelink BWP for the at least one selected sidelink carrier. In some aspects, the first UE 120-1 may receive an indication of the selected at least one sidelink carrier and the active BWP for the selected at least one selected sidelink carrier from a base station. In this case, the base station may select a sidelink carrier or multiple sidelink carriers (e.g., for sidelink carrier aggregation) to be used by the first UE 120-1 for sidelink communications, and the base station may transmit an indication of the selected sidelink carrier (or carriers) to the first UE 120-1. The indication may also indicate, for each selected sidelink carrier, an active sidelink BWP for that sidelink carrier from among the sidelink BWPs configured for that sidelink carrier in the sidelink BWP configuration. In some aspects, the base station may transmit, to the first UE 120-1, an RRC message including an RRC configuration of the at least one selected sidelink carrier and the active BWP for each of the at least one selected sidelink carrier in an RRC configuration included in an RRC message. In some aspects, the base station may transmit, to the first UE 120-1, a MAC control element (MAC-CE) that includes the indication of the at least one selected sidelink carrier and the active BWP for each of the at least one selected sidelink carrier. In this case, the MAC-CE may activate the active BWP on each of the selected sidelink carrier (or carriers). In some aspects, the base station may transmit, to the first UE 120-1, DCI that includes the indication of the at least one selected sidelink carrier and the active BWP for each of the at least one selected sidelink carrier. For example, the indication of the at least one selected sidelink carrier and the active BWP for each of the at least one selected sidelink carrier may be included in scheduling DCI that schedules a sidelink communication for the first UE 120-1. In this case, the indication may activate the active sidelink BWP on each of the selected sidelink carrier (or carriers) for the sidelink communication scheduled by the scheduling DCI. In some aspects, the first UE 120-1 may receive, from the base station, an indication (e.g., via RRC, MAC-CE, and/or DCI) to deactivate a current active sidelink BWP for a sidelink carrier or to switch from a current active sidelink BWP for a sidelink carrier to another active sidelink BWP for the sidelink carrier.

In some aspects, the first UE 120-1 may receive an indication of the selected at least one sidelink carrier and the active BWP for each of the selected at least one selected sidelink carrier from another UE. For example, the other UE may be a "special purpose" UE, such as an RSU, group lead, cluster head, or scheduling UE, among other examples. In this case, the other UE may select a sidelink carrier or multiple sidelink carriers (e.g., for sidelink carrier aggregation) to be used by the first UE 120-1 for sidelink communications, and the other UE may transmit an indication of the selected sidelink carrier (or carriers) to the first UE 120-1. The indication may also indicate, for each selected sidelink carrier, an active sidelink BWP for that sidelink carrier from among the sidelink BWPs configured for that sidelink carrier in the sidelink BWP configuration. In some aspects, the other UE may transmit, to the first UE 120-1 or UEs 120, a PC5 RRC message (e.g., a PC5 RRC broadcast message to all UEs 120 in proximity for broadcast or a PC5 RRC groupcast message to a group of UEs 120 for groupcast or a PC5 RRC Reconfiguration message to UE 120-1 or UE 120-2 for unicast) including a PC5 RRC configuration of the at least one selected sidelink carrier and the active BWP for each of the at least one selected sidelink carrier. In some aspects, the other UE may transmit, to the first UE 120-1 or UEs 120 of a group or UEs 120 in proximity, a PC5 MAC-CE that includes the indication of the at least one selected sidelink carrier and the active BWP for each of the at least one selected sidelink carrier. In this case, the PC5 MAC-CE may activate the active BWP on the selected sidelink carrier (or carriers). In some aspects, the other UE may transmit, to the first UE 120-1 or UEs 120 of a group or UEs 120 in proximity, SCI that includes the indication of the at least one selected sidelink carrier and the active sidelink BWP for each of the at least one selected sidelink carrier. For example, the SCI may include indications of respective indexes associated with the selected sidelink carrier(s) and the active sidelink BWP for each of the selected sidelink carrier(s), or the SCI may include an indication of codepoint that provides a combined sidelink carrier and sidelink BWP indication. For example, the other UE may transmit first stage SCI (SCI-1) to activate or deactivate a sidelink BWP on a selected sidelink carrier for cross-carrier scheduling or second stage SCI (SCI-2) to activate or deactivate a sidelink BWP on a selected sidelink component carrier for cross-carrier retransmissions or feedback. In some aspects, the first UE 120-1 may receive, from the other UE, an indication (e.g., via RRC, MAC-CE, and/or DCI) to deactivate a current active sidelink BWP for a sidelink carrier or to switch from a current active sidelink BWP for a sidelink carrier to another active sidelink BWP for the sidelink carrier.

In some aspects, the first UE 120-1 may identify the at least selected sidelink carrier by selecting a sidelink carrier or multiple sidelink carriers (e.g., for carrier aggregation) to use for sidelink communications. For example, the first UE 120-1 may select the selected sidelink carrier (or carriers) to use for unicast sidelink communications with another UE (e.g., the second UE 120-2). In this case, the first UE 120-1 may perform measurements (e.g., sidelink RSRP, RSRQ, RSSI, and/or CBR measurements) over configured sidelink carrier candidates for sidelink transmissions and/or feedback, and the first UE 120-1 may select one or more sidelink carriers for transmission, retransmission, and/or feedback based at least in part on the measurements. In some aspects, the first UE 120-1 may select, for each selected sidelink carrier, an active sidelink BWP for that selected sidelink carrier from the one or more sidelink BWPs configured for that selected sidelink carrier in the sidelink BWP configuration. For example, the first UE 120-1 may select the active sidelink BWP for a selected sidelink carrier based at least in part on a service associated with the sidelink communication, one or more QoS parameters associated with the sidelink communication, and/or UE assistance information on sidelink received from another UE (e.g., the second UE 120-2).

In some aspects, the first UE 120-1 may identify the active sidelink BWP for one of the at least one selected sidelink carrier based at least in part on one or more sidelink BWP timers configured in the sidelink BWP configuration. In this case, the first UE 120-1 may be configured with one or more sidelink BWP timers that trigger the first UE 120-1 to switch the active sidelink BWP between different configured sidelink BWPs for a sidelink carrier. For example, the sidelink BWP configuration may configure a first sidelink BWP (e.g., associated with a first traffic pattern) and a second sidelink BWP (e.g., associated with a second traffic pattern) on a sidelink carrier. The sidelink BWP configuration may also configure a first timer duration associated with the first sidelink BWP and a second timer duration associated with the second sidelink BWP. The first timer duration may begin when the first sidelink BWP is activated as the active sidelink BWP, and the first UE 120-1 may be triggered to switch the active sidelink BWP from the first sidelink BWP to the second sidelink BWP upon expiration of the first timer duration. The second timer duration may begin when the second sidelink BWP is activated as the active sidelink BWP, and the first UE 120-1 may be triggered to switch the active sidelink BWP from the second sidelink BWP back to the first sidelink BWP upon expiration of the second timer duration As further shown in FIG. 6, and by reference number 620, in some aspects, the first UE 120-1 may transmit an indication of the at least one selected sidelink carrier and the active sidelink BWP for each of the at least one selected sidelink carrier to the second UE 120-2. In some aspects, in a case in which the first UE 120-1 receives an indication of the at least one selected sidelink carrier and the active sidelink BWP for each of the at least one selected sidelink carrier from a base station (e.g., via an RRC message, MAC-CE, or DCI) or from another UE (e.g., via a PC5 RRC message, PC5 MAC-CE, or SCI), the first UE 120-1 may forward the indication to the second UE 120-2. For example, the second UE 120-2 may be out of coverage of the base station or the other UE, and the first UE 120-1 may broadcast the indication (e.g., via a PC5 RRC broadcast message, PC5 MAC-CE, or SCI) to one or more other UEs 120 in a proximity of the first UE 120-1 or groupcast the indication (e.g., via a PC5 RRC broadcast message, PC5 MAC-CE, or SCI) to a group of UEs 120.

In some aspects, in a case in which the first UE 120-1 selects the at least one selected sidelink carrier and/or the active sidelink BWP for each of the at least one selected sidelink carrier (e.g., for unicast sidelink communications between the first UE 120-1 and the second UE 120-2), the UE may transmit an indication of the at least one selected sidelink carrier and the active sidelink BWP for each of the at least one selected sidelink carrier to the second UE 120-2. In some aspects, the first UE 120-1 may transmit, to the second UE 120-2, in PC5 RRC unicast message (e.g., a PC5 RRC reconfiguration message) including a configuration of the at least one selected sidelink carrier and the active sidelink BWP for each of the at least one selected sidelink carrier. In some aspects, the first UE 120-1 may transmit the indication of the at least one selected sidelink carrier and the active sidelink BWP for each of the at least one selected sidelink carrier to the second UE 120-2 in a PC5 MAC-CE that activates the active sidelink BWP in each of the selected at least one sidelink carrier. In some aspects, the first UE 120-1 may transmit, to the second UE 120-2, SCI including the indication of the at least one selected sidelink carrier and the active sidelink BWP for each of the at least one selected sidelink carrier.

As further shown in FIG. 6, and by reference number 625, the first UE 120-1 may communicate with the second UE 120-2 in the at least one active sidelink BWP respectively on the at least one selected sidelink carrier. For example, the first UE 120-1 may transmit sidelink communications to the second UE 120-2 with unicast and/or other UEs with groupcast or broadcast in the at least one active sidelink BWP respectively on the at least one selected sidelink carrier, and/or the first UE 120-1 may receive sidelink communications from the second UE 120-2 in the at least one active sidelink BWP respectively on the at least one selected sidelink carrier. In some aspects, the first UE 120-1 may broadcast sidelink communications (e.g., PSSCH communications) to one or more other UEs 120 in a proximity (e.g., a coverage area) of the first UE 120-1 in the at least one active sidelink BWP respectively on the at least one selected sidelink carrier. In some aspects, the first UE 120-1 may groupcast sidelink communications (e.g., PSSCH communications) to a group of UEs 120 in the at least one active sidelink BWP respectively on the at least one selected sidelink carrier. In some aspects, the first UE 120-1 may receive sidelink communications (e.g., PSSCH communications) broadcast or groupcast or unicast from the second UE 120-2 in the at least one active sidelink BWP respectively on the at least one selected sidelink carrier. In some aspects, the first UE 120-1 and the second UE 120-2 may have an established PC5 RRC connection for unicast, and the first UE 120-1 may transmit unicast sidelink communications (e.g., PSSCH communications) to the second UE 120-2 and/or receive unicast sidelink communications from the second UE 120-2 in the at least one active sidelink BWP respectively on the at least one selected sidelink carrier. In a case in which multiple sidelink carriers are selected for the sidelink communications, the first UE 120-1 may transmit and/or receive sidelink communications using carrier aggregation on the selected sidelink carriers, in a respective active bandwidth for each selected sidelink carrier.

As described above, the first UE 120-1 may identify a sidelink BWP configuration for a plurality of sidelink carriers, and the sidelink BWP configuration may configure one or more sidelink BWPs for each sidelink carrier of the plurality of sidelink carriers. The first UE 120-1 may identify, for at least one selected sidelink carrier, an active sidelink BWP from the one or more sidelink BWPs for each of the at least selected sidelink carrier. The first UE 120-1 may communicate with the second UE 120-2 in the at least active sidelink BWP respectively on the at least one selected sidelink carrier. As a result, UEs may be configured to transmit and/or receive sidelink communications within smaller operation bandwidths, which may result in reduced power consumption for UEs, as compared with utilizing wideband operations for all UEs communicating on a sidelink carrier with a large bandwidth (e.g., a carrier in FR2 or the 60 GHz band).

As indicated above, FIG. 6 is provided as an example. Other examples may differ from what is described with respect to FIG. 6.

Figure 7:
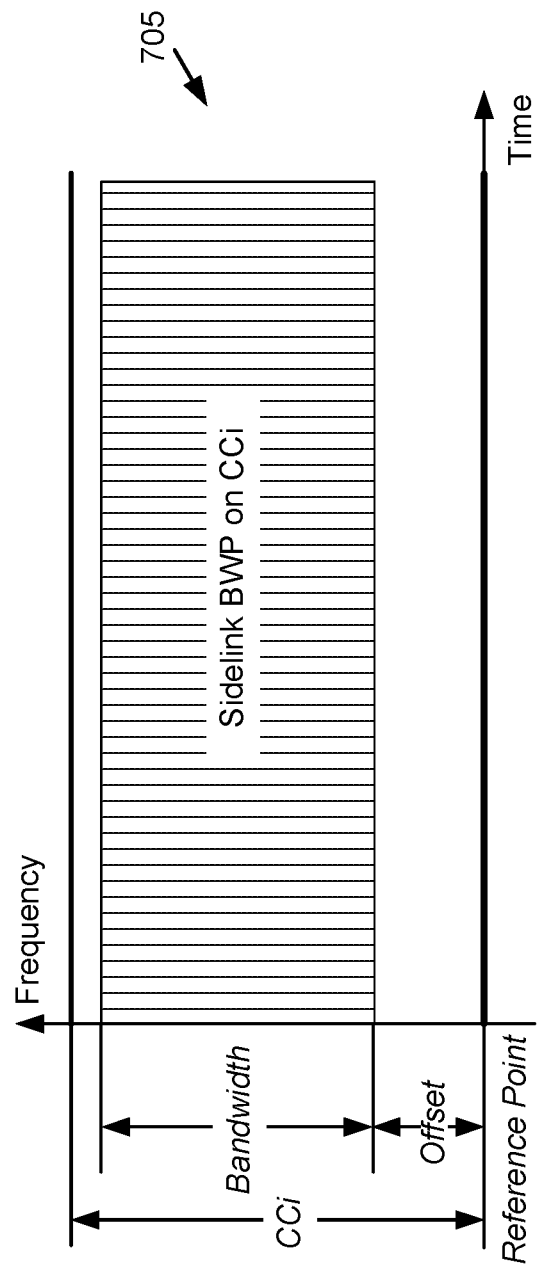

FIG. 7 is a diagram illustrating an example 700 associated with sidelink BWPs with sidelink carrier aggregation, in accordance with the present disclosure. As shown in FIG. 7, example 700 shows a sidelink BWP 705 configured on a sidelink carrier C0. As further shown in FIG. 7, the sidelink BWP 705 may be configured (e.g., in a sidelink BWP configuration) with an offset and a bandwidth, which define the sidelink BWP 705 on the sidelink carrier C0. The offset may be an offset from a frequency reference point associated with the sidelink carrier C0 (e.g., a starting frequency for the sidelink carrier C0) to a starting frequency for the sidelink BWP 705. The bandwidth may be a bandwidth size (e.g., frequency range) of the sidelink BWP 705. For example, the bandwidth may define the frequency range between the starting frequency for the sidelink BWP (e.g., as defined by the offset) and an ending frequency for the sidelink BWP. In some aspects, the offset and the bandwidth values may be indicated in units of subchannels or physical resource blocks (PRBs).

As indicated above, FIG. 7 is provided as an example. Other examples may differ from what is described with respect to FIG. 7.

Figure 8:
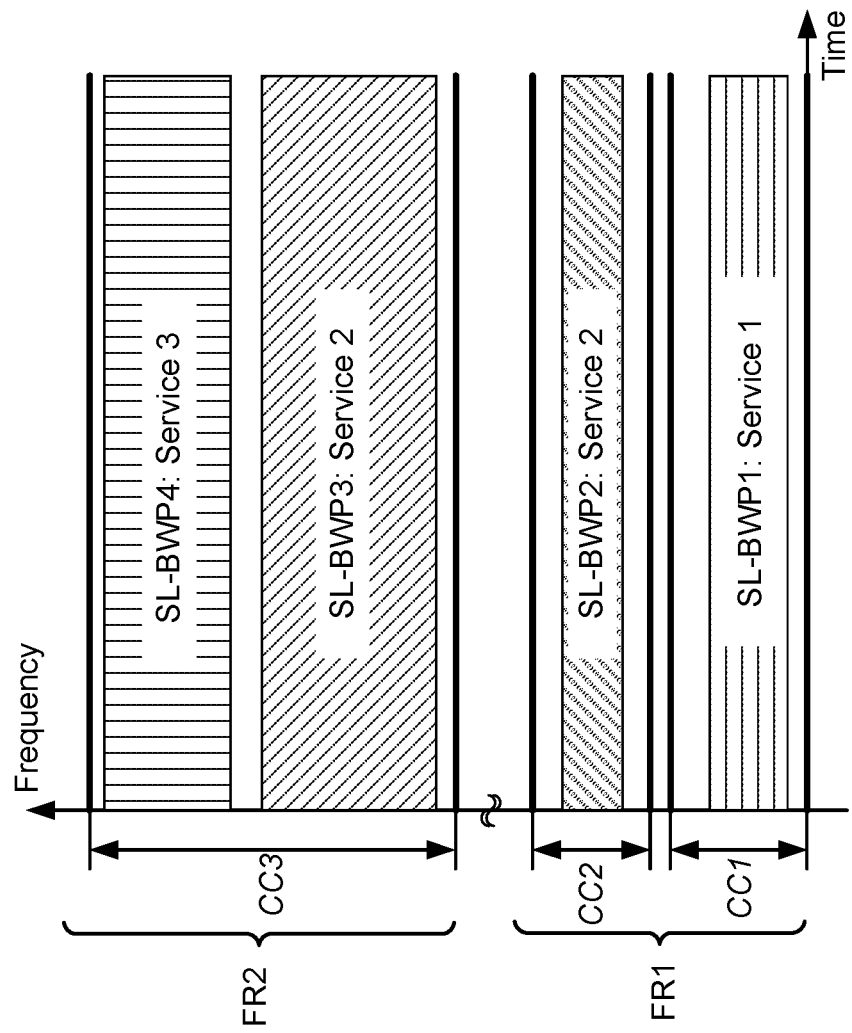

FIG. 8 is a diagram illustrating an example 800 associated with sidelink BWPs with sidelink carrier aggregation, in accordance with the present disclosure. As shown in FIG. 8, example 800 shows an example of a sidelink BWP configuration that includes different sidelink BWPs configured for different services. In some aspects, a sidelink BWP configuration, such as the sidelink BWP configuration shown in FIG. 8, may be pre-configured for a UE (e.g., by an OEM, a V2X server, or a cellular network, among other examples) or may be configured for the UE by a base station, or another UE.

As shown in FIG. 8, the sidelink BWP configuration may configure sidelink BWPs for a first CC (CC1) and a second CC (CC2) in the FR1 band and a third CC (CC3) in the FR2 band. The sidelink BWP configuration may configure first sidelink BWP (SL-BWP1) on CC1. The sidelink BWP configuration may configure a second sidelink BWP (SL-BWP2) on CC2. The sidelink BWP configuration may configure a third sidelink BWP (SL-BWP3) and a fourth sidelink BWP (SL-BWP4) on CC3. SL-BWP1, on CC1, may be associated with a first service (Service 1). For example, Service 1 may be a basic safety service for broadcasting a BSM. SL-BWP2, on CC2, and SL-BWP3, on CC3, may be associated with a second service (Service 2). For example, Service 2 may be a service for communications relating to sidelink positioning. In this case, SL-BWP2 may be configured with a narrow bandwidth and may be used for basic groupcast communications among UEs in a group for sidelink positioning, and SL-BWP3 may be configured with a wide bandwidth and may be used for transmitting sidelink positioning reference signals that require a wide bandwidth to satisfy position accuracy requirements. SL-BWP4, on CC3, may be associated with a third service (Service 3). For example, Service 3 may be a service for sharing sensor data via broadcast for advanced V2X services.

In some aspects, an SL-BWP (e.g., same bandwidth with the same or different offset) for a service may be configured on different sidelink carriers, in another words, replicated on multiple sidelink carries, for example, to improve the coverage for a broadcast or groupcast to UEs supporting different sidelink carriers or to improve the reliability with the parallel transmissions on different sidelink carriers.

As indicated above, one or more SL-BWPs corresponding respectively to one or more services on a carrier, FIG. 8 is provided as an example. Other examples may differ from what is described with respect to FIG. 8.

Figure 9:
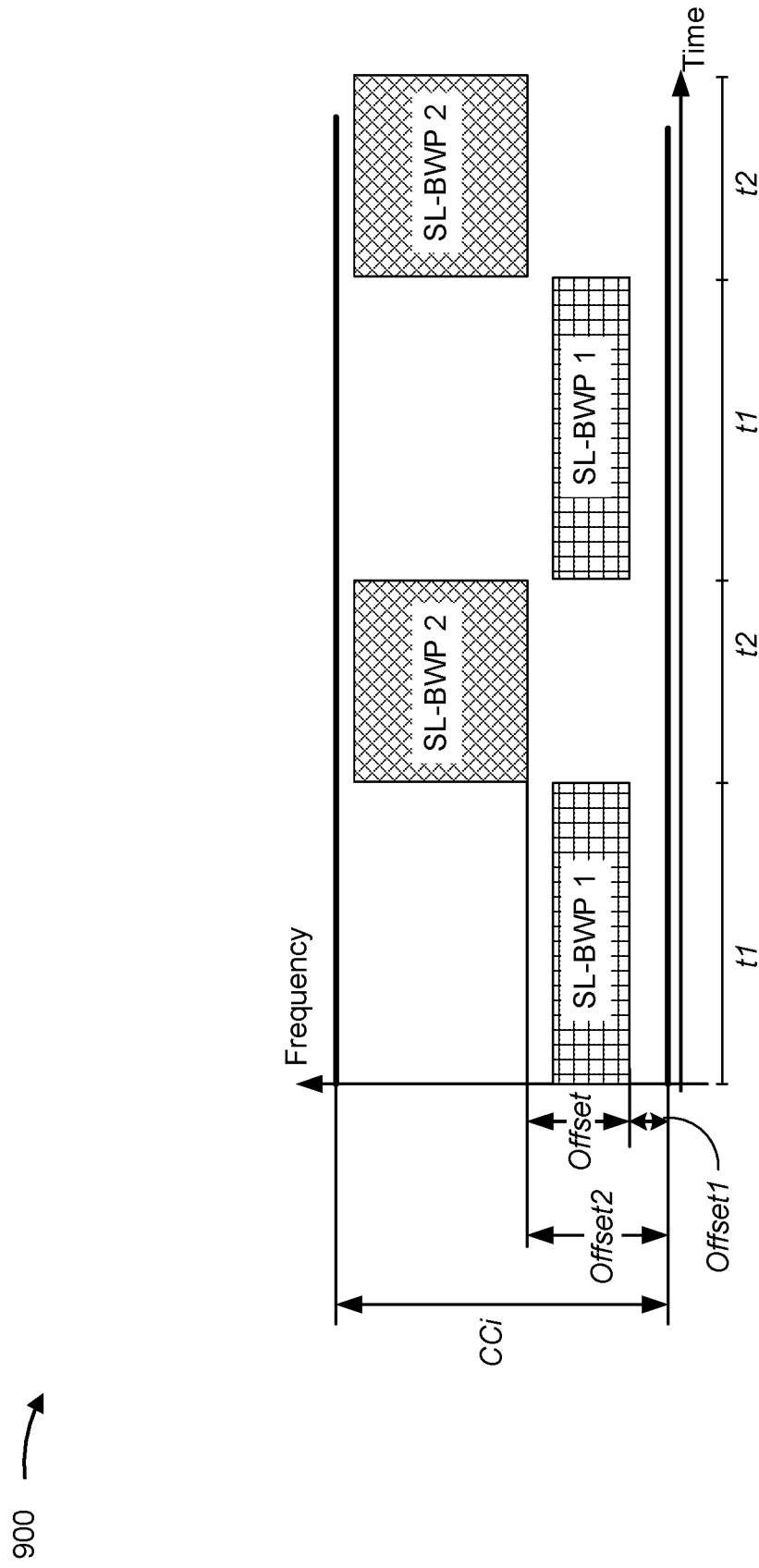

FIG. 9 is a diagram illustrating an example 900 associated with sidelink BWPs with sidelink carrier aggregation, in accordance with the present disclosure. As shown in FIG. 9, example 900 shows sidelink BWPs configured for different traffic patterns. As shown in FIG. 9, a sidelink BWP configuration may configure a first sidelink BWP (SL-BWP1) and a second sidelink BWP (SL-BWP2) for a component carrier (CCi). In some aspects, SL-BWP1 may be associated with a first traffic pattern and SL-BWP2 may be associated with a second traffic pattern. For example, SL-BWP1 and SL-BWP2 may be configured for traffic patterns associated with an XR service. In this case, the traffic for the XR service may alternate between time intervals in which there is no data streaming (e.g., the first traffic pattern) and time intervals in which there is data streaming (e.g., the second traffic pattern). As shown in FIG. 9, SL-BWP1 may be configured with a narrow bandwidth for when there is no data streaming, and SL-BWP2 may be configured with a wide bandwidth for when there is data streaming.

In some aspects, SL-BWP1 may be configured with a first bandwidth and a first offset value (shown as "Offset1" in FIG. 9) that indicates the offset between the frequency reference point of CCi and the starting frequency of SL-BWP1, and SL-BWP2 may be configured with a second bandwidth and a second offset value (shown as "Offset2" in FIG. 9) that indicates the offset between the frequency reference point of CCi and the starting frequency of SL-BWP2. In some aspects, SL-BWP1 may be configured with a first offset value (shown as "Offset1" in FIG. 9), and SL-BWP2 may be configured with an offset value (shown as "Offset" in FIG. 9) that indicates and offset between the starting frequency of SL-BWP1 and the starting frequency of SL-BWP2. In some examples, SL-BWPs may be configured with same offset value (e.g., Offset 1=Offset 2, or Offset=0 or no Offset configured).

In some aspects, SL-BWPs may be configured on different carriers (e.g., SL-BWP1 on CCi1 and SL-BWP2 on CCi2). In this case, the Offset 1 is from the frequency reference point of CCi and the Offset 2 is from the frequency reference point of CCi2.

In some aspects, the sidelink BWP configuration may configure a first timer duration (a) associated with the SL-BWP1 and a second timer duration (t2) associated with SL-BWP2. The first and second timer durations may configure a UE to switch between SL-BWP1 and SL-BWP2. For example, the first timer duration (t1) may begin when SL-BWP1 is activated as the active sidelink BWP for a UE, and the UE may be triggered to switch the active sidelink BWP from SL-BWP1 to SL-BWP2 upon expiration of the first timer duration (t1). The second timer duration (t2) may begin when SL-BWP2 is activated as the active sidelink BWP for the UE, and the UE may be triggered to switch the active sidelink BWP from SL-BWP2 to SL-BWP1 upon expiration of the second timer duration (t2). Accordingly, the UE may be triggered to switch between SL-BWP1 and SL-BWP2 based at least in part on the timer durations configured in the sidelink BWP configuration. In some aspects, the first timer duration (t1) and the second timer duration (t2) may be set based at least in part on a periodicity of periodic traffic, such that the UE may switch the active sidelink BWP in accordance with periodic changes to a particular traffic pattern, such as a traffic pattern associated with an XR service.

In some aspects, more than two timers may be configured respectively to more than two traffic patterns based on the state transition of traffic patterns. For example, the state transmission may be: SL-BWP 1 with timer 1 → SL-BWP 2 with timer 2 → SL-BWP 3 with timer 3 → SL-BWP1 with timer 1.

As indicated above, FIG. 9 is provided as an example. Other examples may differ from what is described with respect to FIG. 9.

Figure 10:
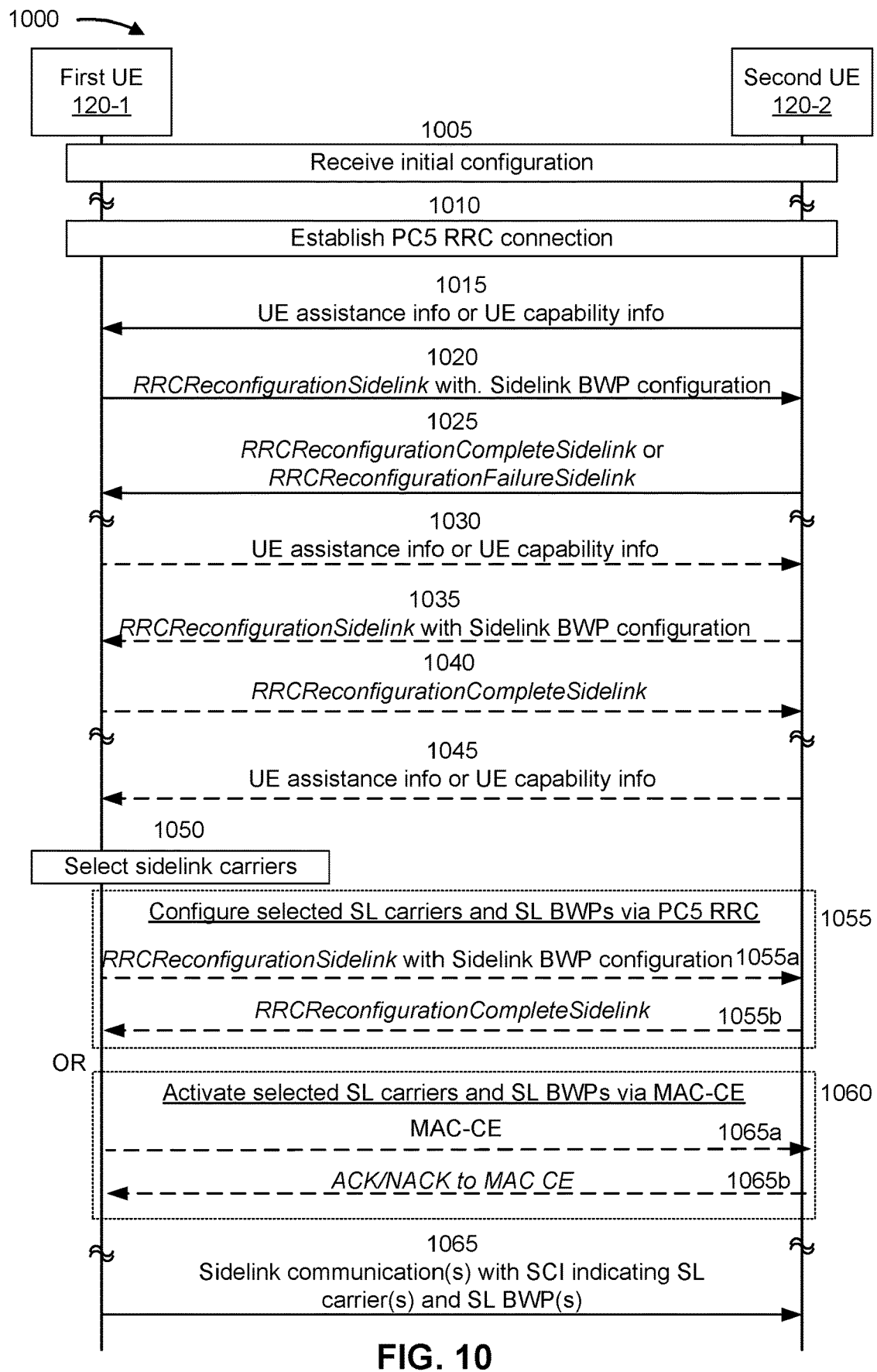

FIG. 10 is a diagram illustrating an example 1000 associated with sidelink BWPs with sidelink carrier aggregation, in accordance with the present disclosure. As shown in FIG. 10, example 1000 includes communication between a first UE 120-1 and a second UE 120-2. In some aspects, the first UE 120-1 and/or the second UE 120-2 may be included in a wireless network, such as wireless network 100. The first UE 120-1 and the second UE 120-2 may communicate via a wireless access link, which may include a sidelink. In some aspects, the first UE 120-1 may be a Tx UE, and the second UE 120-2 may be an Rx UE. In some aspects, the first UE 120-1 may be an Rx UE, and the second UE 120-2 may be a Tx UE. In some aspects, the first UE 120-1 and the second UE 120-2 may communicate using unicast sidelink communications and may operate using a resource allocation mode (e.g., Mode 2) in which resource selection and scheduling for sidelink communications are autonomously performed by the UEs 120-1 and 120-2 (e.g., rather than a base station).

As shown in FIG. 10, and by reference number 1005, the first UE 120-1 and the second UE 120-2 may each receive a respective initial configuration. In some aspects, the initial configuration for a UE 120 (e.g., the first UE 120-1 or the second UE 120-2) may include component carriers each associated with one or more services and/or QoS parameters associated with each of one or more services that utilize sidelink communications. In some aspects, the initial configuration may include an initial sidelink BWP configuration that includes one or more configured sidelink BWPs for each sidelink carrier. For example, the initial sidelink BWP configuration may indicate, for a sidelink carrier, one or more different sidelink BWPs associated different services, different QoS parameters, and/or different traffic patterns. In some aspects, the initial configurations for the first UE 120-1 and the second UE 120-2 may not be the same. For example, the first UE 120-1 may receive a first initial configuration, and the second UE 120-2 may receive a second initial configuration that is different from the first initial configuration.

In some aspects, the first UE 120-1 and/or the second UE 120-2 may receive the initial configuration from a base station. In some aspects, the first UE 120-1 and/or the second UE 120-2 may be pre-configured with the initial configuration. For example, the first UE 120-1 and/or the second UE 120-2 may be pre-configured with the initial configuration by an OEM, a server (e.g., a V2X server), or a cellular network device, among other examples. In some aspects, the first UE 120-1 and/or the second UE 120-2 may begin a service or application, and the first UE 120-1 and/or the second UE 120-2 may receive an initial configuration for that service or application from higher layer (e.g., V2X Service layer or Application layer). For example, the initial configuration may include QoS information, sidelink carrier information, and/or sidelink BWP information associated with that service or application on one or more sidelink carriers.

As further shown in FIG. 10, and by reference number 1010, the first UE 120-1 may establish a PC5 RRC connection with the second UE 120-2. In some aspects, the first UE 120-1 and the second UE 120-2 may share UE capability information (e.g., UECapabilityInformationSidelink via sidelink UE capability transfer procedure) when or after establishing the PC5 RRC connection. In some aspects, for each of the first UE 120-1 and the second UE 120-2, the UE capability information shared with the other UE may include the capability of the UE with respect to component carriers (e.g., sidelink carriers) associated sidelink BWPs for the sidelink carriers, security, and/or radio bearers based at least in part on a QoS flow or other QoS parameters.

As further shown in FIG. 10, and by reference number 1015, the second UE 120-2 may transmit UE assistance information or UE capability information to the first UE 120-1. The second UE 120-2 may transmit the UE assistance information or the UE capability information to the first UE 120-1 based at least in part on establishing the PC5 RRC connection. The second UE 120-2 may transmit the UE assistance information or the UE capability information to the first UE 120-1 in a PC5 RRC message (e.g., a first PC5 RRC message). For example, the PC5 RRC message may be a PC5 RRC message (e.g., UEAssistanceInformationSidelink) for transmitting UE assistance information on sidelink (e.g., UECapabilityInformationSidelink) from one UE to another UE. In some aspects, the UE assistance information may include information from the initial configuration (e.g., the initial sidelink BWP configuration) for the second UE 120-2. For example, the UE assistance information or the UE capability information may indicate sidelink carriers supported by the second UE 120-2 (and/or sidelink carriers blocked by the second UE 120-2) and associated sidelink BWPs configured for the supported sidelink carriers in the initial configuration for the second UE 120-2 or currently active sidelink BWPs on active sidelink carriers respectively for the second UE 120-2. In some aspects, the UE assistance information or the UE capability information may include a bi-directional or unidirectional indication for one or more of the sidelink BWPs configured for the second UE 120-2 in the initial configuration or for currently active sidelink BWPs on active sidelink carriers respectively. For example, the UE assistance information or the UE capability information may indicate, for a sidelink BWP, whether that sidelink BWP is configured for bi-directional communications to and from the second UE 120-2 or for unidirectional communications to or from the second UE 120-2.

As further shown in FIG. 10, and by reference number 1020, the first UE 120-1 may transmit, to the second UE 120-2, a sidelink BWP configuration for unicast communications between the first UE 120-1 and the second UE 120-2. The first UE 120-1 may receive the UE assistance information or the UE capability information from the second UE 120-2. In some aspects, the first UE 120-1 may determine the sidelink BWP configuration based at least in part on the UE assistance information or the UE capability information received from the second UE 120-2 and based at least in part on the initial configuration for the first UE 120-1.

The sidelink BWP configuration may configure one or more sidelink BWPs for each of a plurality of sidelink carriers. In some aspects, the plurality of sidelink carriers may be sidelink carrier candidates (e.g., sidelink carriers that are candidates to be used for sidelink communications between the first UE 120-1 and the second UE 120-2), and the first UE 120-1 may determine the sidelink carrier candidates in the sidelink BWP configuration based at least in part on the sidelink carriers supported or blocked by the first UE 120-1, the sidelink carriers supported or blocked by the second UE 120-2, and/or sidelink carriers (e.g., in the initial configuration for the first UE 120-1 and/or the second UE 120-2) associated with one or more services supported on the PC5 RRC connection between the first UE 120-1 and the second UE 120-2.

For each sidelink carrier candidate, the first UE 120-1 may determine one or more configured sidelink BWPs associated with that sidelink carrier candidate. For example, the first UE 120-1 may configure sidelink BWPs for each sidelink carrier candidate based at least in part on QoS parameters, services or service types supported on the PC5 RRC connection, and/or traffic patterns. In some aspects, the first UE 120-1 may select one or more sidelink BWPs configured for a sidelink carrier in the initial sidelink BWP configuration for the first UE 120-1 and/or the second UE 120-2 based on at least in part on the UE assistance information or the UE capability information received from the second UE 120-2. In some aspects, the first UE 120-1 may adjust an initial sidelink BWP configuration for the first UE 120-1 and/or an initial sidelink BWP configuration for the second UE 120-2 based on at least in part on the UE assistance information or the UE capability information received from the second UE 120-2. For example, the first UE 120-1 may adjust the offset and/or the bandwidth for one or more sidelink BWPs configured for a sidelink carrier in the initial sidelink BWP configuration for the first UE 120-1 and/or the second UE 120-2. In some aspects, the first UE 120-1 may configure one or more sidelink BWPs, not previously configured for a sidelink carrier (e.g., in the initial sidelink BWP configuration). For example, the first UE 120-1 may configure or adjust the bandwidth of a sidelink BWP based at least in part on maximum QoS requirements among QoS requirements associated with the first UE 120-1 and QoS requirements or capability with sidelink carriers and related sidelink BWPs associated with the second UE 120-2 (e.g., received in the UE assistance information or the UE capability information).

In some aspects, the first UE 120-1 may configure or adjust the offset for a sidelink BWP based at least in part on a PC5 link adjustment and/or a traffic pattern change. In some aspects, the first UE 120-1 may determine whether the sidelink BWP configuration is for bi-directional communications between the first UE 120-1 and the second UE 120-2 or for unidirectional transmissions to the second UE 120-2 or for unidirectional receptions from the second UE 120-2. In some aspects, the first UE 120-1 may configure or adjust the offset for a sidelink BWP for bi-directional communications based at least in part on the PC5 link identifier associated with the PC5 RRC connection between the first UE 120-1 and the second UE 120-2. For example, the first UE 120-1 may configure or adjust the offset of the sidelink BWP, on a sidelink carrier, based on sidelink BWPs associated with different PC5 RRC connections for the first UE 120-1 communicating with different UEs or for second UE 120-2 communicating with different UEs (e.g., received in the UE assistance information or the UE capability information). In some aspects, the first UE 120-1 may configure a sidelink BWP for unidirectional communications from the first UE 120-1 to the second UE 120-2 (or from the second UE 120-2 to the second UE 120-2) to have an offset that is associated with a source ID and destination ID pair associated with the unidirectional communications.

The first UE 120-1 may transmit the sidelink BWP configuration to the second UE 120-2 in a PC5 RRC message (e.g., a second PC5 RRC message). For example, the PC5 RRC message may be a PC5 RRC reconfiguration message (e.g., RRCReconfigurationSidelink). In this case, the PC5 RRC reconfiguration message may include an indication of the sidelink carriers (e.g., the sidelink carrier candidates) included in the sidelink BWP configuration, an indication of the one or more sidelink BWPs configured for each of the sidelink carriers, and an indication of whether the sidelink BWP configuration is bi-directional or unidirectional. In some aspects, the sidelink BWP configuration that is transmitted from the first UE 120-1 to the second UE 120-2 may be a bi-directional sidelink BWP configuration that configures sidelink carrier candidates and associated sidelink BWPs to be used for bi-directional communications between the first UE 120-1 and the second UE 120-2. In some aspects, the sidelink BWP configuration that is transmitted from the first UE 120-1 to the second UE 120-2 may be a unidirectional sidelink BWP configuration that configures sidelink carrier candidates and associated sidelink BWPs to be used for sidelink transmissions from the first UE 120-1 to the second UE 120-2 or for sidelink transmission from the second UE 120-2 to the first UE 120-1.

As further shown in FIG. 10, and by reference number 1025, the second UE 120-2 may transmit, to the first UE 120-1, a PC5 RRC reconfiguration complete message (e.g., RRCReconfigurationCompleteSidelink) or a PC5 RRC reconfiguration failure message (e.g., RRCReconfigurationFailureSidelink). In some aspects, based at least in part on receiving the sidelink BWP configuration (e.g., in the PC5 RRC reconfiguration message) from the first UE 120-1, the second UE 120-2 may transmit the PC5 RRC reconfiguration complete message to the first UE 120-1 to indicate that the second UE 120-2 accepts the sidelink BWP configuration received from the first UE 120-1. The first UE 120-1 and the second UE 120-2 may switch to the active sidelink BWPs on the active sidelink carriers as indicated in the sidelink BWP configuration.

In some aspects, based at least in part on receiving the sidelink BWP configuration (e.g., in the PC5 RRC reconfiguration message) from the first UE 120-1, the second UE 120-2 may transmit the PC5 RRC reconfiguration failure message (e.g., RRCReconfigurationFailureSidelink) to indicate that the second UE 120-2 rejects the sidelink BWP configuration received from the first UE 120-1. In this case, the PC5 RRC reconfiguration failure message may include an indication of which sidelink carriers and/or sidelink BWPs are rejected in the sidelink BWP configuration. Additionally, or alternatively, the PC5 RRC reconfiguration failure message may include an indication of one or more suitable sidelink carriers and/or sidelink BWPs that are acceptable for the second UE 120-2. In a case in which the second UE 120-2 transmits the PC5 RRC reconfiguration failure message to the first UE 120-1, the first UE 120-1 may revise the sidelink BWP configuration based at least in part on the PC5 RRC reconfiguration failure message and transmit the revised sidelink BWP configuration to the second UE 120-2.

In some aspects, as shown by reference numbers 1030, 1035, and 1040 in FIG. 10, in a case in which the sidelink BWP configuration transmitted from the first UE 120-1 to the second UE 120-2 (e.g., the first sidelink BWP configuration) is a unidirectional sidelink BWP configuration for sidelink communications in a first direction (e.g., for sidelink communications from the first UE 120-1 to the second UE 120-2 or for sidelink communications from the second UE 120-2 to the first UE 120-1), the second UE 120-2 may determine a second sidelink BWP configuration that is a unidirectional sidelink BWP configuration for sidelink communications in a second direction (e.g., for sidelink communications from the second UE 120-2 to the first UE 120-1 or for sidelink communications from the first UE 120-1 to the second UE 120-2). In this case, as shown by reference number 1030, the first UE 120-1 may transmit, to the second UE 120-2 UE assistance information or UE capability information relating to sidelink carriers supported (and/or blocked) by the first UE 120-1 and associated sidelink BWPs configured for the sidelink carriers. For example, the first UE 120-1 may transmit the UE assistance information (e.g., UEAssitanceInformationSidelink) or the UE capability information (e.g., UECapabilityInformationSidelink) in a PC5 RRC message. The second UE 120-2 may determine the second sidelink BWP configuration (e.g., the unidirectional sidelink BWP configuration for sidelink communications in the second direction) based at least in part on the UE assistance information or the UE capability information received from the first UE 120-1.

As shown by reference number 1035, the second UE 120-2 may transmit the second sidelink BWP configuration to the first UE 120-1. For example, the second UE 120-2 may transmit the second sidelink BWP configuration to the first UE 120-1 in a PC5 RRC reconfiguration message (e.g., RRCReconfigurationSidelink). As shown by reference number 1040, the first UE 120-1, based at least in part on receiving the second sidelink BWP configuration from the second UE 120-2, may transmit a PC5 RRC reconfiguration complete message (e.g., RRCReconfigurationCompleteSidelink) to the second UE 120-2. For example, the first UE 120-1 may transmit the PC5 RRC reconfiguration complete message to indicate that the first UE 120-1 accepts the second sidelink BWP configuration. Alternatively, the first UE 120-1 may transmit a PC5 RRC reconfiguration failure message (e.g., RRCReconfigurationFailureSidelink) to the second UE 120-2 to indicate that the first UE 120-1 rejects the second sidelink BWP configuration.

In a case in which the first sidelink BWP configuration (e.g., the sidelink BWP configuration transmitted from the first UE 120-1 to the second UE 120-2) is a bi-directional sidelink BWP configuration, the second UE 120-2 may utilize the first sidelink BWP configuration. In this case, the second UE 120-2 may not determine the second sidelink BWP configuration, and the operations shown by reference numbers 1030, 1035, and 1040 may not be performed. In other case in which the first sidelink BWP configuration (e.g., the sidelink BWP configuration transmitted from the first UE 120-1 to the second UE 120-2) is a bi-directional sidelink BWP configuration, the second UE 120-2 may need to adjust the first sidelink BWP configuration. In this case, the second UE 120-2 may determine the second sidelink BWP configuration, and the operations shown by reference numbers 1030, 1035, and 1040 may be performed.

As further shown in FIG. 10, and by reference number 1045, the second UE 120-2 may transmit, to the first UE 120-1 UE assistance information or UE capability information related to selecting one or more sidelink carriers and/or active sidelink BWPs for sidelink communications. For example, the second UE 120-2 may transmit the UE assistance information (e.g., UEAssistanceInformationSidelink) or the UE capability information (e.g., UECapabilityInformationSidelink) in a PC5 RRC message. In some aspects, the UE assistance information or the UE capability information may include an indication of one or more preferred sidelink carrier candidates from the sidelink carrier candidates in the sidelink BWP configuration and/or an indication of one or more preferred sidelink BWPs for one or more sidelink carrier candidates. For example, the preferred sidelink carrier candidates may be based at least in part on measurements (e.g., sidelink RSRP, RSRQ, RSSI, and/or CBR measurements) performed by the second UE 120-2 over the sidelink carrier candidates included in the sidelink BWP configuration.

As further shown in FIG. 10, and by reference number 1050, the first UE 120-1 may select one or more sidelink carriers for sidelink communications between the first UE 120-1 and the second UE 120-2. In some aspects, the first UE 120-1 may perform measurements (e.g., sidelink RSRP, RSRQ, RSSI, and/or CBR measurements) over the sidelink carrier candidates included in the sidelink BWP configuration, and the first UE 120-1 may select the sidelink carriers for sidelink transmissions, retransmissions and/or feedback based at least in part on the measurements. In some aspects, the first UE 120-1 may select the sidelink carriers for the sidelink transmissions, retransmissions and/or feedback based at least in part on the measurements on the sidelink carrier candidates performed by the first UE 120-1 and based at least in part on the UE assistance information or the UE capability information received from the second UE 120-2.

The first UE 120-1 may determine an active sidelink BWP for each selected sidelink carrier. For example, for each selected sidelink carrier, the first UE 120-1 may determine the active sidelink BWP from the one or more sidelink BWPs configured for that sidelink carrier in the sidelink BWP configuration. The first UE 120-1 may transmit, to the second UE 120-2, an indication of the one or more selected sidelink carriers and the active sidelink BWP for each selected sidelink carrier.

As further shown in FIG. 10, and by reference number 1055, in some options, the first UE 120-1 may configure the one or more selected sidelink carriers and the associated active sidelink BWPs via a PC5 RRC configuration. In this case, as shown by reference number 1055a, the first UE 120-1 may transmit, to the second UE 120-2, a PC5 RRC message that includes a configuration of one or more selected sidelink carriers and the active sidelink BWP for each of the one or more selected sidelink carriers. For example, the configuration of the selected sidelink carriers and the active sidelink BWP for each selected sidelink carrier may be included in a PC5 RRC reconfiguration message (e.g., RRCReconfigurationSidelink). In this case, the PC5 RRC reconfiguration message may include an indication of the one or more selected sidelink carriers and the active sidelink BWP for each selected sidelink carrier. In some aspects, the PC5 RRC configuration for the selected sidelink carriers and associated active sidelink BWPs may be a bi-directional configuration, and the selected sidelink carriers and the associated active sidelink BWPs may be used for bi-directional sidelink communications between the first UE 120-1 and the second UE 120-2. In some aspects, the PC5 RRC configuration for the selected sidelink carriers and associated active sidelink BWPs may be a unidirectional configuration, and the selected sidelink carriers and the associated active sidelink BWPs may be used for sidelink communications from the first UE 120-1 to the second UE 120-2 or for sidelink communications from the second UE 120-2 to the first UE 120-1.

As shown by reference number 1055b, the second UE 120-2 may transmit, to the first UE 120-1, a PC5 RRC reconfiguration complete message (e.g., RRCReconfigurationCompleteSidelink). For example, based at least in part on receiving the configuration of the one or more selected sidelink carriers and the active sidelink BWP for each selected sidelink carrier, the second UE 120-2 may transmit the PC5 RRC reconfiguration complete message to the first UE 120-1 to indicate that the second UE 120-2 accepts the configuration. Alternatively, the second UE 120-2 may transmit, to the first UE 120-1, a PC5 RRC reconfiguration failure message to indicate that the second UE 120-2 rejects the configuration.

As further shown in FIG. 10, and by reference number 1060, the first UE 120-1 may active the one or more selected sidelink carriers and the active sidelink BWPs for the selected sidelink carriers via a PC5 MAC-CE activation. As shown by reference number 1060a, the first UE 120-1 may transmit, to the second UE 120-2, a PC5 MAC-CE that includes an indication of the selected one or more sidelink carriers with the active sidelink BWP for each selected sidelink carriers. For example, the first UE 120-1 may transmit the PC5 MAC-CE to the second UE 120-2 on the PSSCH. In some aspects, the PC5 MAC-CE may be a PC5 MAC-CE activation that indicates the sidelink BWP to be activated for each selected sidelink carrier. Additionally, and/or alternatively, the first UE 120-1 may transmit, to the second UE 120-2 a PC5 MAC-CE deactivation that identifies a sidelink BWP to be deactivated for a selected sidelink carrier. In some aspects, the PC5 MAC-CE transmitted from the first UE 120-1 to the second UE 120-2 may be a bi-directional activation (or deactivation) that indicates an active sidelink BWP (or a sidelink BWP to be deactivated) to be used for bi-directional sidelink communications between the first UE 120-1 and the second UE 120-2. In some aspects, the PC5 MAC-CE transmitted from the first UE 120-1 to the second UE 120-2 may be a unidirectional activation (or deactivation) that indications an active sidelink BWP (or a sidelink BWP to be deactivated) to be used for sidelink communications from the first UE 120-1 to the second UE 120-2 or for sidelink communications from the second UE 120-2 to the first UE 120-1. In this case, a PC5 MAC-CE transmitted from the second UE 120-2 to the first UE 120-1 may be a unidirectional activation (or deactivation) that indications an active sidelink BWP (or a sidelink BWP to be deactivated) to be used for sidelink communications from the second UE 120-2 to the first UE 120-1 or for sidelink communications from the first UE 120-1 to the second UE 120-2.

In some aspects, the MAC CE for activation or deactivation may include layered indications (e.g., indicating sidelink carrier and then indicating active sidelink BWP under or after each sidelink carrier). For example, the MAC CE may include one or more fields for indicating respectively one or more selected sidelink carriers (e.g., carrier ID or carrier index) and a subfield under or after each sidelink carrier field for an active sidelink BWP (e.g., BWP ID or index), with {carrier 1 {bwp1}, carrier 2 {bwp2}, . . . } or like.

In some other aspects, the MAC CE for activation or deactivation may include joint indication (e.g., jointly indicating selected sidelink carriers and active sidelink BWP), for example, one or more fields for indicating respectively one or more selected sidelink carriers jointly with associated active sidelink BWP, e.g., {[carrier 1 bwp1], [carrier 2 bwp2], . . . } or like, where [carrier 1 bwp1] may be the index or codepoint of a lookup table with sidelink carriers and associated sidelink BWPs configured in the sidelink BWP configuration.

As shown by reference number 1060*b*, the second UE 120-2 may transmit, to the first UE 120-1, a feedback in connection with receiving the PC5 MAC-CE from the first UE 120-1. For example, the second UE 120-2 may transmit an ACK/NACK response to the first UE 120-1 in connection with receiving the PC5 MAC-CE from the first UE 120-1.

As further shown in FIG. 10, and by reference number 1065, the first UE 120-1 may dynamically transmit, to the second UE 120-2 one or more sidelink communications using the active sidelink BWP on the one or more selected sidelink carriers. In some aspects, the first UE 120-1 may use the one or more selected sidelink carriers and the active sidelink BWP for each sidelink carrier, as configured in the PC5 RRC configuration and/or indicated in the PC5 MAC-CE activation, to transmit one or more TBs to the second UE 120-2. In some aspects, the first UE 120-1 may transmit, to the second UE 120-2 SCI that indicates the one or more selected sidelink carriers and the associated active sidelink BWPs for a sidelink communication. In this case, the first UE 120-1 may transmit TBs on the one or more selected sidelink carriers with SCI indicating the selected carriers and the active BWP associated with each selected sidelink carrier. For example, in some aspects, the first UE 120-1 may use SCI-1 to indicate, to the second UE 120-2, activation or deactivation of a sidelink BWP for cross-carrier scheduling for transmissions or retransmissions (e.g., using a first index or code point of a lookup table with combinations of sidelink carriers and associated sidelink BWPs for an initial transmission and second index or code point for reserved retransmission if the retransmission is reserved on different sidelink carrier; otherwise, using one index or codepoint for both initial transmission and retransmission (s)). In some aspects, the first UE 120-1 may use SCI-2 to indicate, to the second UE 120-2, activation or deactivation of a sidelink BWP for cross-carrier retransmissions or feedback (e.g., using the index or code point of a lookup table with combinations of sidelink carriers and associated sidelink BWPs for a cross carrier retransmission reserved or for a cross carrier feedback to be received; or, using sidelink carrier index or ID with the associated sidelink BWP index or ID for a cross carrier retransmission reserved or for a cross carrier feedback to be received).

In some aspects, based at least in part on the sidelink BWP configuration, the first UE 120-1 and the second UE 120-2 may be triggered to switch the active sidelink BWP between different configured sidelink BWPs on same or different sidelink carriers in connection with the expiration of one or more configured timer durations associated with the configured sidelink BWPs. For example, the timer durations may be configured based at least in part on a periodicity of periodic traffic, such that the first UE 120-1 and the second UE 120-2 may switch the active sidelink BWP on the same sidelink carrier in accordance a periodic traffic pattern, or may switch the sidelink carrier and the associated active sidelink BWP at the same time in accordance a periodic traffic pattern.

In some aspects, a PC5 RRC message, a MAC-CE, and/or SCI (e.g., for indicating at least one selected sidelink carrier and an associated active sidelink BWP for each) may be transmitted on an anchor sidelink BWP on an anchor sidelink carrier. For example, the anchor sidelink BWP and the anchor sidelink carrier may be configured for the first UE 120-1 and the second UE 120-2 in the initial configuration (e.g., the default sidelink BWP or initial sidelink BWP on an anchor sidelink carrier) or may be selected by the first UE 120-1 or the second UE 120-2, for example, based on measurements received (e.g., via sidelink UE assistance information) or negotiation between paired UEs, and indicated in the sidelink BWP configuration or activated via MAC CE or SCI. In some aspects, a PC5 RRC message, a MAC-CE, and/or SCI (e.g., for indicating at least one selected sidelink carrier and an associated active sidelink BWP) may be transmitted on a common/initial sidelink BWP on a sidelink carrier. For example, the common/initial sidelink BWP and the sidelink carrier for the common/initial sidelink BWP may be configured for the first UE 120-1 and the second UE 120-2 in the initial configuration or may be selected by the first UE 120-1 or the second UE 120-2 and indicated in the sidelink BWP configuration or activation to the other paired UE. In some aspects, the anchor sidelink carrier for anchor sidelink BWP or the sidelink carrier for common/initial sidelink BWP may be a sidelink carrier in FR1 for FR1 and FR2 inter-band sidelink carrier aggregation, or may be a sidelink carrier on licensed spectrum for inter-band licensed and unlicensed sidelink carrier aggregation. In some other aspects, the anchor sidelink carrier for anchor sidelink BWP or the sidelink carrier for common/initial sidelink BWP may be a sidelink carrier selected or activated based on measurement for intra-band sidelink carrier aggregation.

As indicated above, FIG. 10 is provided as an example. Other examples may differ from what is described with respect to FIG. 10.

Figure 11:
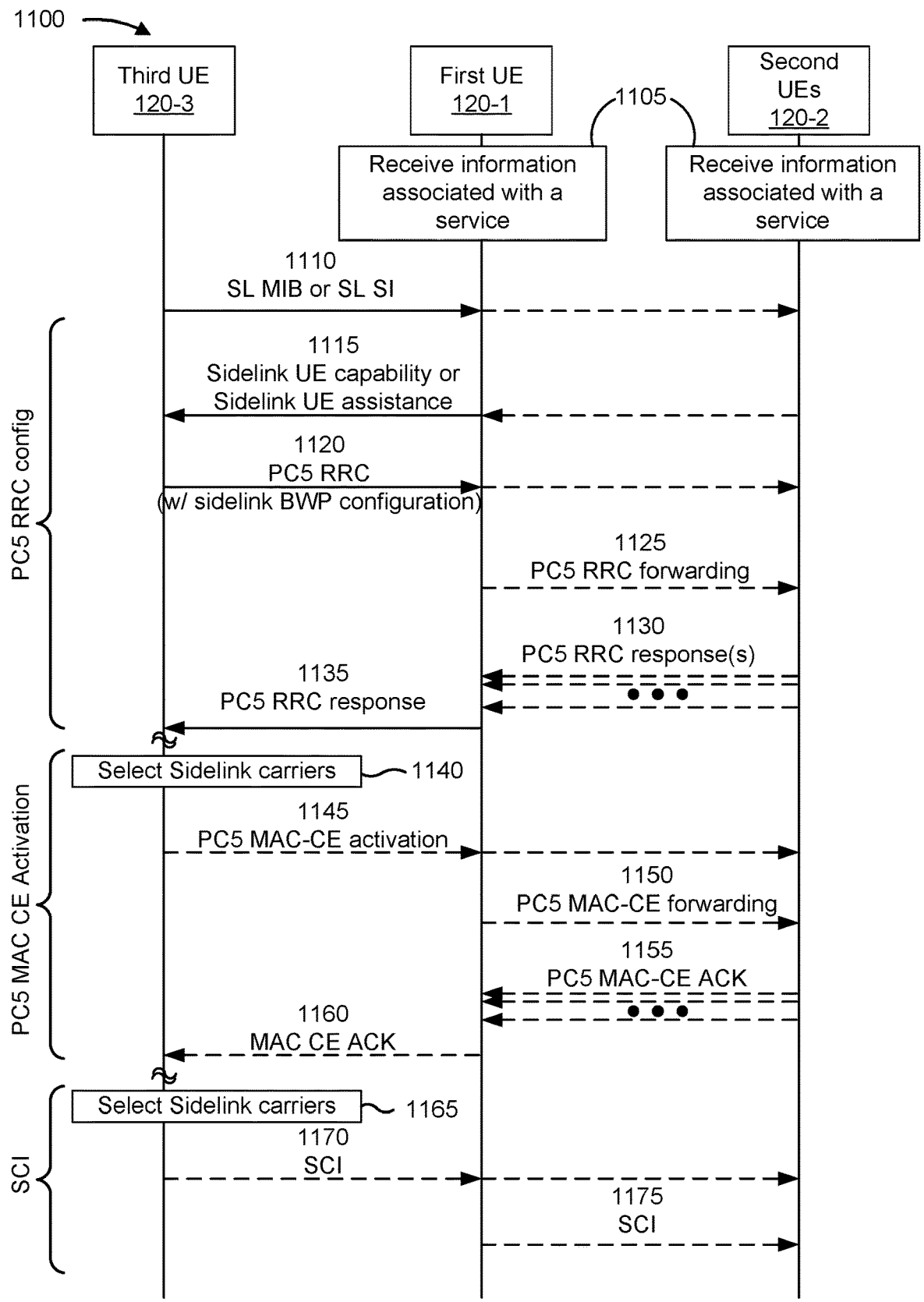

FIG. 11 is a diagram illustrating an example 1100 associated with sidelink BWPs with sidelink carrier aggregation, in accordance with the present disclosure. As shown in FIG. 11, example 1100 includes communication between a first UE 120-1, one or more second UEs 120-2, and a third UE 120-3. In some aspects, the first UE 120-1, the second UEs 120-2, and/or the third UE 120-3 may be included in a wireless network, such as wireless network 100. The first UE 120-1, the second UEs 120-2, and/or the third UE 120-3 may communicate via a wireless access link, which may include a sidelink. In some aspects, the first UE 120-1 may be a Tx UE, and the second UEs 120-2 may be Rx UEs. For example, in some aspects, the first UE 120-1 may be a Tx UE for broadcast communications, and the second UEs 120-2 may be Rx UEs in a coverage area of the first UE 120-1. In some aspects, the first UE 120-1 may be a Tx UE for groupcast communications, and the second UEs 120-2 may be a group Rx UEs receiving the groupcast communications. In some aspects, the first UE 120-1 may be a Tx UE for unicast communications, and the second UE 120-2 may be a Rx UE receiving the unicast communications. In some aspects, third UE 120-3 may be a "special purpose UE," such as an RSU, a group lead, a cluster head, or a scheduling UE.

As shown in FIG. 11, and by reference number 1105, the first UE 120-1 and the second UEs 120-2 may receive information associated with a service. In some aspects, the first UE 120-1 and the second UEs 120-2 may begin a service that uses a sidelink broadcast communications or sidelink groupcast communications, and the first UE 120-1 and the second UEs 120-2 may receive information associated with that service. For example, the information associated with the service may include QoS information, sidelink carrier information, and/or sidelink BWP information associated with that service.

As further shown in FIG. 11, and by reference number 1110, the first UE 120-1 may receive, from the third UE 120-3, a sidelink master information block (MIB) or other sidelink system information (SI) (e.g., a sidelink system information block (SIB)) that includes information relating to sidelink carriers and sidelink BWPs to be used for sidelink communications in proximity. In some aspects, the sidelink MIB or the sidelink SIB may include an initial sidelink BWP configuration (or a default sidelink BWP configuration) to be used for sidelink communications for all UEs in proximity. For example, the initial sidelink BWP configuration may indicate one or more configured sidelink BWPs for each of a plurality of sidelink carriers. In some aspects, the initial sidelink BWP configuration may indicate, for a sidelink carrier, one or more different sidelink BWPs associated different services, different destination IDs, different QoS parameters, and/or different traffic patterns.

In some aspects, one or more of the second UEs 120-2 that are in a coverage area of the third UE 120-3 may also receive the sidelink MIB or sidelink SIB including the information relating to sidelink carriers and sidelink BWPs to be used for sidelink communications (e.g., the initial sidelink BWP configuration).

As further shown in FIG. 11, and by reference number 1115, the first UE 120-1 may transmit, to the third UE 120-3, UE capability information (e.g., in a sidelink UE capability report) or UE assistance information via a PC5 RRC message (e.g., a UECapabilityInformationSidelink message or a UEAssistanceInformationSidelink message). For example, the UE capability information or the UE assistance information may include the sidelink carrier information, sidelink BWP information, and or QoS information associated with a service, service type (e.g., service type ID), or destination ID. In some aspects, one or more of the second UEs 120-2 that are in the coverage area of the third UE 120-3 may also transmit UE capability information or UE assistance information to the third UE 120-3. In some aspects, the first UE 120-1 may receive UE capability information or UE assistance information from one or more second UEs 120-2 that are outside of the coverage area of the base station 110, and the first UE 120-1 may forward the received UE capability information or UE assistance information to the third UE 120-3.

In some aspects, the first UE 120-1 may determine that the initial sidelink BWP configuration (or default sidelink BWP configuration), acquired in the sidelink MIB or other sidelink SI, is acceptable to use for broadcast or groupcast sidelink communications. In this case, the first UE 120-1 may not transmit the UE capability information or the UE assistance information to the third UE 120-3, and the third UE 120-3 may not configure a dedicated sidelink BWP configuration for the first UE 120-1.

As further shown in FIG. 11, and by reference number 1120, the third UE 120-3 may transmit, and the first UE 120-1 may receive, a sidelink BWP configuration. In some aspects, the third UE 120-3 may determine a sidelink BWP configuration to be used by the first UE 120-1 and the second UEs 120-2 for a broadcast or groupcast sidelink communication based at least in part on the UE capability information or UE assistance information received from the first UE 120-1. In some cases, the third UE 120-3 may determine the sidelink BWP configuration based at least in part on the UE capability information or UE assistance information received from the first UE 120-1 and UE capability information or UE assistance information received from one or more of the second UEs 120-2.

The sidelink BWP configuration may configure one or more sidelink BWPs for each of a plurality of sidelink carriers. In some aspects, the plurality of sidelink carriers may be sidelink carrier candidates (e.g., sidelink carriers that are candidates to be used for sidelink communications between the first UE 120-1 and the second UEs 120-2), and the third UE 120-3 may determine the sidelink carrier candidates in the sidelink BWP configuration based at least in part on the received UE capability information or UE assistance information. For each sidelink carrier candidate, the third UE 120-3 may determine one or more configured sidelink BWPs associated with that sidelink carrier candidate. For example, the third UE 120-3 may configure sidelink BWPs for each sidelink carrier candidate based at least in part on QoS parameters, services or service types, destination IDs, and/or traffic patterns. In some aspects, the third UE 120-3 may adjust the initial sidelink BWP configuration included in the sidelink MIB or other sidelink SI. For example, the third UE 120-3 may adjust the offset and/or the bandwidth for one or more sidelink BWPs configured for a sidelink carrier in the initial sidelink BWP configuration based at least in part on the UE capability information or UE assistance information. In some aspects, the third UE 120-3 may configure one or more sidelink BWPs, not previously configured in the initial sidelink BWP configuration, based at least in part on the UE capability information or the UE assistance information or measurements reported from the first UE 120-1 and the second UEs 120-2 (e.g., via sidelink UE assistance information).

The third UE 120-3 may transmit a PC5 RRC message that includes the sidelink BWP configuration. In some aspects, the third UE 120-3 may transmit the sidelink BWP configuration in a PC5 RRC broadcast message to one or more UEs (e.g., the first UE 120-1, and in some cases one or more of the second UEs 120-2) that are in a proximity of the third UE 120-3 (e.g., UEs in a coverage area of the third UE 120-3). In this case, the PC5 broadcast message may be a PC5 RRC broadcast message that is broadcast to the UEs in the coverage area of the third UE 120-3. In some aspects, the third UE 120-3 may broadcast the PC5 RRC broadcast message on a shared signaling radio bearer (e.g., SRB0 like) configured for PC5 RRC broadcast messages or on a configured sidelink common control logic channel. In some aspects, the third UE 120-3 may transmit the sidelink BWP configuration in a PC5 RRC groupcast message to UEs from a group of UEs (e.g., including the first UE 120-1 and the second UEs 120-2) that are in the coverage area of the third UE 120-3. In this case, the PC5 groupcast message may be a PC5 RRC groupcast message that is groupcast to the UEs from the group of UEs that are within in the coverage area of the third UE 120-3. In some aspects, the third UE 120-3 may groupcast the PC5 groupcast message on a group signaling radio bearer (SRBg) configured for the group of UEs or on a configured sidelink group common control logic channel.

The first UE 120-1 may receive the sidelink BWP configuration that is broadcast (e.g., via the PC5 RRC broadcast message) or groupcast (e.g., via the PC5 groupcast message) or unicast (e.g., via RRCReconfigurationSidelink) by the third UE 120-3. In some aspects, one of more of the second UEs 120-2 that are in coverage of the third UE 120-3 may also receive the sidelink BWP configuration that is broadcast (e.g., via the PC5 RRC broadcast message) or groupcast (e.g., via the PC5 groupcast message) or unicast (e.g., via RRCReconfigurationSidelink) by the third UE 120-3.

As further shown in FIG. 11, and by reference number 1125, the first UE 120-1 may forward the sidelink BWP configuration to one or more of the second UEs 120-2 outside of the coverage area of the third UE 120-3. In some aspects, the first UE 120-1 may forward the sidelink BWP configuration in a PC5 broadcast message on the SRB0-like using the sidelink broadcast or common control logic channel. In this case, the PC5 broadcast message, from the first UE 120-1, that includes the forwarded sidelink BWP configuration may be received by one or more of the second UEs 120-2 that are in a coverage area of the first UE 120-1. In some aspects, the first UE 120-1 may forward the sidelink BWP configuration in a PC5 groupcast message on the SRBg configured for the group of UEs (e.g., including the first UE 120-1 and the second UEs 120-2) using the sidelink group common control logic channel. In some aspects, the first UE 120-1 may forward the sidelink BWP configuration in a PC5 RRC unicast message to the second UE 120-2 using the sidelink control logic channel.

As further shown in in FIG. 11, and by reference number 1130, the second UEs 120-2 that receive the forwarded sidelink BWP configuration broadcast or groupcast or unicast from the first UE 120-1 may transmit respective PC5 RRC responses to the PC5 RRC message broadcast or groupcast or unicast by the first UE 120-1. For example, a second UE 120-2 may transmit a PC5 RRC reconfiguration complete message in unicast (e.g., RRCReconfiguration-CompleteSidelink) in connection with receiving the PC5 RRC message including the forwarded sidelink BWP configuration. In some aspects, the second UEs 120-2 may transmit the respective PC5 RRC responses in PC5 broadcast messages on the SRB0-like using the configured sidelink broadcast or common control logic channel. In some aspects, the second UEs 120-2 may transmit the respective PC5 RRC responses in PC5 RRC groupcast messages on the SRBg configured for the group of UEs using the configured sidelink group common control logic channel. The first UE 120-1 may receive the PC5 RRC responses (e.g., the PC5 RRC reconfiguration complete messages) transmitted (e.g., in PC5 RRC broadcast messages or PC5 RRC groupcast messages) by the second UEs 120-2 that are outside of the coverage area of the third UE 120-3.

As further shown in FIG. 11, and by reference number 1135, the first UE 120-1 may transmit a PC5 RRC response to the PC5 RRC broadcast message or the PC5 RRC groupcast message or PC5 RRC unicast message received from the third UE 120-3. For example, the first UE 120-1 may transmit a PC5 RRC response message in unicast (e.g., RRCReconfigurationCompleteSidelink) in response to receiving the PC5 RRC message including the sidelink BWP configuration. In some aspects, the first UE 120-1 may transmit the PC5 RRC response message in a PC5 RRC broadcast message on the SRB0-like using the configured sidelink broadcast or common control logic channel. In some aspects, the first UE 120-1 may transmit the PC5 RRC response message in a PC5 RRC groupcast message on the on the SRBg configured for the group of UEs using the configured sidelink group common control logic channel. In some aspects, the first UE 120-1 may transmit aggregated PC5 RRC responses received from the second UEs 120-2. In some aspects, the first UE 120-1 may transmit a PC5 RRC response based on the PC5 RRC responses received from the second UEs 120-2 (e.g., transmit "accept" or "complete", if all received responses are "accept" or "complete", or if a certain number of the responses or at least one response is "accept" or "complete", or if no response is "reject" or "failure").

In some aspects, one or more of the second UEs 120-2 that are in the coverage area of the third UE 120-3 may also transmit respective PC5 RRC responses in connection with receiving the PC5 RRC broadcast message or the PC5 RRC groupcast message transmitted from the third UE 120-3.

As further shown in FIG. 11, and by reference number 1140, the third UE 120-3 may select one or more sidelink carriers to be used by the first UE 120-1 for broadcasting or groupcast or unicast sidelink communications to the second UE(s) 120-2. The third UE 120-3 may also determine, for each selected sidelink carrier an active BWP to be used for sidelink communications on that selected sidelink carrier. The third UE 120-3 may select the active BWP for a selected sidelink carrier from the configured sidelink BWPs for that sidelink carrier in the sidelink BWP configuration. For example, the third UE 120-3 may determine the one or more selected sidelink carrier and/or the active sidelink BWP for each selected sidelink carrier based at least in part on a service or service type associated with the sidelink communications, a destination ID associated with the sidelink communications, a traffic pattern associated with the sidelink communications, one or more QoS parameters associated with the sidelink communications, and/or measurements from UEs (e.g., via sidelink UE assistance information).

In some aspects, the third UE 120-3 may use a PC5 RRC message to indicate the one or more selected sidelink carriers and the active BWP for each selected sidelink carrier. For example, the third UE 120-3 may transmit a configuration of one or more selected sidelink carriers and the active BWP for each selected sidelink carrier in a PC5 RRC broadcast message on the SRB0-like using configured sidelink broadcast or common control logic channel, or the third UE 120-3 may transmit a configuration of one or more selected sidelink carriers and the active BWP for each selected sidelink carrier in a PC5 groupcast message on the SRBg configured for the group of UEs using configured sidelink group common control logic channel, or the third UE 120-3 may transmit a configuration of one or more selected sidelink carriers and the active BWP for each selected sidelink carrier in a PC5 unicast message for the first UE 120-1 or the second UE 120-2 using configured sidelink control logic channel. In some aspects, as shown by reference number 1145 in FIG. 11, the third UE 120-3 may use a PC5 MAC-CE to indicate the one or more selected sidelink carriers and the active sidelink BWP for each selected sidelink carrier.

As shown by reference number 1145, in some aspects, the third UE 120-3 may transmit PC5 MAC-CE activation that includes an indication of the one or more selected sidelink carriers and the active sidelink BWP (e.g., the sidelink BWP to be activated) for each selected sidelink carrier. In some aspects, the third UE 120-3 may broadcast the MAC-CE activation to UEs in the coverage area of the third UE 120-3. In some aspects, the third UE 120-3 may groupcast the MAC-CE activation to UEs in the group of UEs (e.g., including the first UE 120-1 and the second UEs 120-2). In some aspects, the third UE 120-3 may unicast the MAC-CE activation to a UE (e.g., the first UE 120-1 or the second UEs 120-2). The PC5 MAC-CE activation may be a PC5 MAC-CE that includes an indication of at least one selected sidelink carrier and the sidelink BWP to be activated for each selected sidelink carrier. The third UE 120-3 may broadcast (e.g., broadcast the PSSCH carrying the MAC CE) or groupcast (e.g., groupcast the PSSCH carrying the MAC CE) or unicast (e.g., unicast the PSSCH carrying the MAC CE) the PC5 MAC-CE activation to activate a sidelink BWP on each of at least one selected sidelink carrier for the UEs in the coverage area of the third UE 120-3 or in the group of UEs or a UE. Additionally, and/or alternatively, the third UE 120-3 may broadcast or groupcast or unicast a PC5 MAC-CE deactivation that identifies a sidelink BWP to be deactivated for at least one selected sidelink carrier.

The PC5 MAC-CE activation transmitted by the third UE 120-3 may be received by the first UE 120-1. In some aspects, the PC5 MAC-CE activation may also be received by one or more of the second UEs 120-2 that are in the coverage area of the third UE 120-3.

As further shown in FIG. 11, and by reference number 1150, the first UE 120-1 may forward the PC5 MAC-CE activation to one or more of the second UEs 120-2 that are outside of the coverage range of the third UE 120-3. For example, the first UE 120-1 may broadcast or groupcast the PC5 MAC-CE including the indication of the one or more selected sidelink carriers and the active sidelink BWP for each selected sidelink carrier. The second UEs 120-2 within the coverage area of the first UE 120-1 may receive the forwarded PC5 MAC-CE including the indication of the one or more selected sidelink carriers and the active sidelink BWP for each selected sidelink carrier.

As further shown in FIG. 11, and by reference number 1155, the second UEs 120-2 that receive the forwarded PC5 MAC-CE from the first UE 120-1 may transmit respective a feedback (e.g., ACK/NACK to MAC CE) in connection with receiving the PC5 MAC-CE activation. The first UE 120-1 may receive the ACK/NACK feedback transmitted from the second UEs 120-2 that are outside of the coverage area of the third UE 120-3.

As further shown in FIG. 11, and by reference number 1160, the first UE 120-1 may transmit a feedback (e.g., ACK/NACK to MAC CE) in connection with receiving the PC5 MAC-CE activation transmitted by the third UE 120-3. The third UE 120-3 may receive the feedback transmitted from the first UE 120-1. In some aspects, the first UE 120-1 may transmit aggregated ACK/NACK responses received from the second UEs 120-2. In some aspects, the first UE 120-1 may transmit an ACK/NACK based on the ACK/NACK responses received from the second UE 120-2 (e.g., transmit ACK, if all received responses are ACKs, or if a certain number of the responses or at least one response is ACK, or if no response is NACK).

In some aspects, one or more of the second UEs 120-2 that are in the coverage area of the third UE 120-3 may also transmit respective feedback (e.g., ACK/NACK to MAC CE) in connection with receiving the PC5 MAC-CE activation transmitted by the third UE 120-3. The third UE 120-3 may receive the feedback transmitted by the second UEs 120-2 that are within the coverage area of the third UE 120-3.

In some aspects, the third UE 120-3 may use SCI to dynamically indicate activation, deactivation, or switching of an active sidelink BWP on each of at least one selected sidelink carrier for one or more sidelink communications. As shown in FIG. 11, and by reference number 1165, the third UE 120-3 may select one or more sidelink carriers for a sidelink communication, for example, based on measurements received from UEs (e.g., UE assistance information). The third UE 120-3 may determine the active sidelink BWP for each selected sidelink carrier. As further shown in FIG. 11, and by reference number 1170, the third UE 120-3 may transmit SCI that includes an indication of the one or more selected sidelink carriers and the active sidelink BWP for each selected sidelink carrier. In some aspects, the third UE 120-3 may broadcast the SCI to UEs in the coverage area of the third UE 120-3. In some aspects, the third UE 120-3 may groupcast the SCI to UEs in the group of UEs (e.g., including the first UE 120-1 and the second UEs 120-2).

In some aspects, such as a case in which the third UE 120-3 is a scheduling UE that scheduled sidelink communications for the first UE 120-1, an indication of a selected sidelink carrier and the active sidelink BWP for the selected sidelink carrier may be included in scheduling SCI that schedules a sidelink communication. In this case, the SCI may indicate the sidelink carrier and the active sidelink BWP to be used to transmit the sidelink communication scheduled by the SCI. For example, in some aspects, the third UE 120-3 may transmit SCI-1 to dynamically activate or deactivate a sidelink BWP on a selected sidelink carrier for cross-carrier scheduling. In some aspects, the third UE 120-3 may transmit SCI-2 to dynamically activate or deactivate a sidelink BWP on a selected sidelink carrier for cross-carrier retransmissions or feedback.

The first UE 120-1 may receive the SCI that indicates, for a sidelink communication, at least one selected sidelink carrier and an active sidelink BWP for each selected sidelink carrier. In some aspects, one or more of the second UEs 120-2 that are in the coverage area of the third UE 120-3 may also receive the SCI that indicates the at least one selected sidelink carrier and an active sidelink BWP for each selected sidelink carrier.

As further shown in FIG. 11, and by reference number 1175, the first UE 120-1 may forward the SCI including the indication of the at least one selected sidelink carrier and an active sidelink BWP for each selected sidelink carrier to one or more of the second UEs 120-2 that are outside of the coverage area of the third UE 120-3. For example, the first UE 120-1 may broadcast or groupcast the SCI, and the second UEs 120-2 that are outside of the coverage area of the third UE 120-3 may receive the SCI from the first UE 120-1.

In some aspects, based at least in part on the indication of the at least one selected sidelink carrier and the active sidelink BWP for each selected sidelink carrier (e.g., in the SCI), the first UE 120-1 may transmit (e.g., broadcast or groupcast) a sidelink communication (e.g., the sidelink communication scheduled by the SCI) in the active sidelink BWP on each selected sidelink carrier. Based at least in part on the indication of the at least one selected sidelink carrier and the active sidelink BWP for each selected sidelink carrier (e.g., in the SCI), the second UEs 120-2 may receive the sidelink communication transmitted by first UE 120-1 in the active sidelink BWP on each selected sidelink carrier.

In some aspects, a PC5 RRC message, a MAC-CE, and/or SCI (e.g., for indicating at least one selected sidelink carrier and an associated active sidelink BWP) may be transmitted on an anchor sidelink BWP on an anchor sidelink carrier, which may be configured for the UEs in the initial configuration or may be selected (e.g., by the third UE 120-3) and indicated in the sidelink BWP configuration. In some aspects, a PC5 RRC message, a MAC-CE, and/or SCI (e.g., for indicating at least one selected sidelink carrier and an associated active sidelink BWP) may be transmitted on a common/initial sidelink BWP on a sidelink carrier, which may be configured for the UEs in the initial configuration or may be selected (e.g., by the third UE 120-3) and indicated in the sidelink BWP configuration.

As indicated above, FIG. 11 is provided as an example. Other examples may differ from what is described with respect to FIG. 11.

Figure 12:
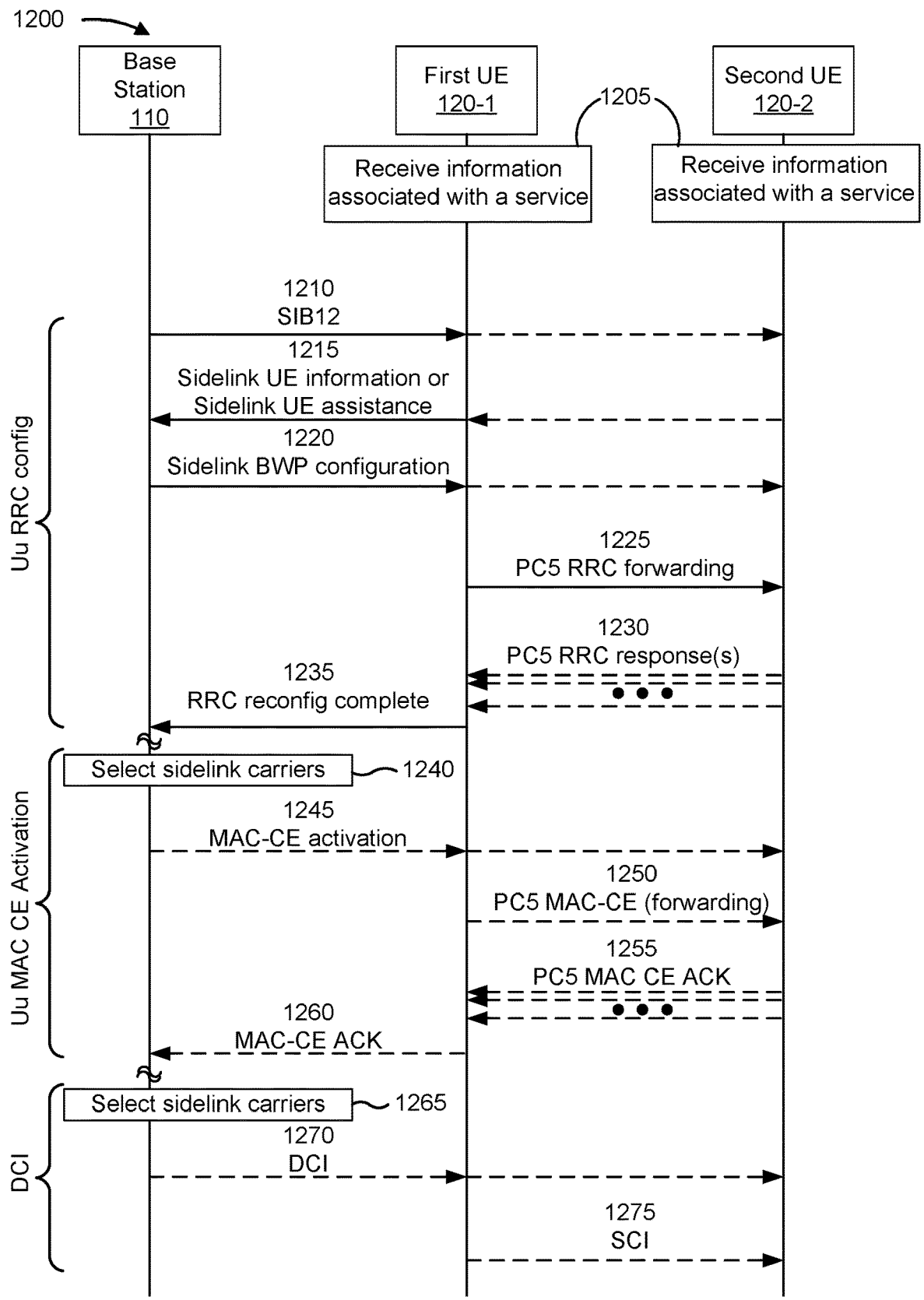

FIG. 12 is a diagram illustrating an example 1200 associated with sidelink BWPs with sidelink carrier aggregation, in accordance with the present disclosure. As shown in FIG. 12, example 1200 includes communication between a base station 110, a first UE 120-1, and one or more second UEs 120-2. In some aspects, the base station 110, the first UE 120-1, and/or the second UE(s) 120-2 may be included in a wireless network, such as wireless network 100. The base station 110, the first UE 120-1, and the second UE(s) 120-2 may communicate via wireless access links, which may include an uplink, a downlink, and a sidelink.

In some aspects, the first UE 120-1 may be a Tx UE and the second UE(s) 120-2 may include one or more Rx UEs. For example, in some aspects, the first UE 120-1 may be a Tx UE for broadcast communications, and the second UE(s) 120-2 may include one or more Rx UEs in a coverage area of the first UE 120-1. In some aspects, the first UE 120-1 may be a Tx UE for groupcast communications, and the second UE(s) 120-2 may include a group of Rx UEs receiving the groupcast communications. In some aspects, the first UE 120-1 may a Tx UE for a unicast communication via PC5 RRC connection with a second UE 120-2. In some aspects, the first UE 120-1 and/or the second UE(s) 120-2 may operate using a resource allocation mode (e.g., Mode 1) in which the base station 110 performs resource selection and scheduling for sidelink communications from the first UE 120-1 and/or the second UE(s) 120-2.

As shown in FIG. 12, and by reference number 1205, the first UE 120-1 and the second UEs 120-2 may receive information associated with a service. In some aspects, the first UE 120-1 and the second UEs 120-2 may begin a service that uses a sidelink broadcast communications or sidelink groupcast communications or sidelink unicast communications, and the first UE 120-1 and the second UEs 120-2 may receive information associated with that service. For example, the information associated with the service may include QoS information, sidelink carrier information, and/or sidelink BWP information associated with that service.

As further shown in FIG. 12, and by reference number 1210, the first UE 120-1 may receive, from the base station 110, SI that includes a sidelink configuration for a cell associated with the base station 110 (e.g., for all UEs in the coverage of the base station 110). For example, the base station may transmit, to the first UE 120-1, an SIB (e.g., SIB12) including the sidelink configuration (e.g., sl-Config-CommonNR). In some aspects, the sidelink configuration (e.g., sl-ConfigCommonNR) may include sidelink carrier information and sidelink BWP information for different services and/or QoS parameters. In some aspects, the sidelink configuration received from the base station 110 may include an initial sidelink BWP configuration (or default sidelink BWP configuration) for each of a plurality of sidelink carriers. For example, the initial sidelink BWP configuration may indicate one or more configured sidelink BWPs for each of a plurality of sidelink carriers. In some aspects, the initial sidelink BWP configuration may indicate, for a sidelink carrier, one or more different sidelink BWPs associated different services, different destination IDs, different QoS parameters, and/or different traffic patterns. For example, the initial sidelink BWP configuration may indicate an initial sidelink BWP (or a default sidelink BWP) for each of a plurality of sidelink carriers. For example, the initial sidelink BWP configuration may indicate an anchor sidelink BWP (or a default sidelink BWP or an initial sidelink BWP) for an anchor sidelink carrier configured in the initial sidelink BWP configuration.

In some aspects, one or more of the second UEs 120-2 that are in a coverage area of the base station 110 may also receive SIB (e.g., SIB12) including the sidelink configuration.

As further shown in FIG. 12, and by reference number 1215, the first UE 120-1 may transmit, to the base station 110, sidelink UE information message with UE capability information for sidelink (e.g., SidelinkUEInformationNR with sl-DestinationIdentity, sl-CastType, sl-InterestedFreqList, sl-QoS-InfoList, sl-CapabilityInformationSidelink including UECapabilityInformationSidelink, etc.) or sidelink UE assistance information (e.g., UEAssistanceInformation including UE assistance information for NR sidelink communication) via an RRC message. For example, the sidelink UE information or the sidelink UE assistance information may include the sidelink carrier information, sidelink BWP information, and or QoS information associated with a service, service type (e.g., service ID), destination ID, or UE measurements (e.g., via sidelink UE assistance information). In some aspects, one or more of the second UEs 120-2 that are in the coverage area of the base station 110 may also transmit sidelink UE information or sidelink UE assistance information to the base station 110. In some aspects, the first UE 120-1 may receive sidelink UE information or sidelink UE assistance information from one or more second UEs 120-2 that are outside of the coverage area of the base station 110, and the first UE 120-1 may forward the received sidelink UE capability information or sidelink UE assistance information to the base station 110. For example, the first UE 120-1 may transmit the aggregated sidelink UE information or sidelink UE assistance information received one or more second UEs 120-2 to the base station 110.

In some aspects, the first UE 120-1 may determine that the initial sidelink BWP configuration (or default sidelink BWP configuration), acquired in the SIB (e.g., SIB12), is acceptable to use for sidelink communications. In this case, the first UE 120-1 may not transmit the sidelink UE information or the sidelink UE assistance information to the base station 110, and the base station 110 may not configure a dedicated sidelink BWP configuration for the first UE 120-1.

As further shown in FIG. 12, and by reference number 1220, the base station 110 may transmit, and the first UE 120-1 may receive, a sidelink BWP configuration. In some aspects, the base station 110 may determine a sidelink BWP configuration to be used by the first UE 120-1 and the one or more second UEs 120-2 for broadcast, groupcast, and/or unicast sidelink communications based at least in part on the sidelink UE information or sidelink UE assistance information received from the first UE 120-1. In some cases, the base station 110 may determine the sidelink BWP configuration based at least in part on the sidelink UE information or sidelink UE assistance information received from the first UE 120-1 and the sidelink UE information or sidelink UE assistance information received from one or more of the second UEs 120-2.

The sidelink BWP configuration may configure one or more sidelink BWPs for each of a plurality of sidelink carriers. In some aspects, the plurality of sidelink carriers may be sidelink carrier candidates (e.g., sidelink carriers that are candidates to be used for sidelink communications between the first UE 120-1 and the second UE(s) 120-2), and the base station 110 may determine the sidelink carrier candidates in the sidelink BWP configuration based at least in part on the received sidelink UE information or sidelink UE assistance information. For each sidelink carrier candidate, the base station 110 may determine one or more configured sidelink BWPs associated with that sidelink carrier candidate. For example, the base station 110 may configure sidelink BWPs for each sidelink carrier candidate based at least in part on QoS parameters, services or service types, destination IDs, and/or traffic patterns. In some aspects, the base station 110 may adjust the initial sidelink BWP configuration included in the SIB (e.g., SIB12). For example, the base station 110 may adjust the offset and/or the bandwidth for one or more sidelink BWPs configured for a sidelink carrier in the initial sidelink BWP configuration based at least in part on the UE information or UE assistance information. In some aspects, the base station 110 may configure one or more sidelink BWPs, not previously configured in the initial sidelink BWP configuration, based at least in part on the sidelink UE information or the sidelink UE assistance information.

The base station 110 may transmit an RRC message that includes the sidelink BWP configuration. For example, the base station 110 may transmit an RRC reconfiguration message (e.g., RRCReconfiguration) that includes the sidelink BWP configuration. In some aspects, the base station 110 may also transmit an RRC reconfiguration message including the sidelink BWP configuration to one or more of the second UEs 120-2 that are in the coverage area of the base station 110.

As further shown in FIG. 12, and by reference number 1225, the first UE 120-1 may forward the sidelink BWP configuration to one or more of the second UEs 120-2 outside of the coverage area of the base station 110. For example, the first UE 120-1 may forward the sidelink BWP configuration via to one or more of the second UEs 120-2 in a PC5 RRC message. In some aspects, the first UE 120-1 may forward the sidelink BWP configuration in a PC5 broadcast message on the SRB0-like using the configured sidelink broadcast or common control logic channel. In this case, the PC5 broadcast message, from the first UE 120-1, that includes the forwarded sidelink BWP configuration may be received by one or more of the second UEs 120-2 that are in a coverage area of the first UE 120-1. In some aspects, the first UE 120-1 may forward the sidelink BWP configuration in a PC5 groupcast message on the SRBg configured for the group of UEs (e.g., including the first UE 120-1 and the second UEs 120-2) using the configured sidelink group common control logic channel. In some aspects, in a case in which the first UE 120-1 has established an PC5 RRC connection with a second UE 120-2, the first UE 120-1 may forward the sidelink BWP configuration to the second UE 120-2 in a unicast PC5 RRC reconfiguration message (e.g., RRCReconfigurationSidelink).

As further shown in FIG. 12, and by reference number 1230, the one or more second UEs 120-2 that receive the forwarded sidelink BWP configuration from the first UE 120-1 may transmit respective PC5 RRC responses to the PC5 RRC message broadcast or groupcast or unicast by the first UE 120-1. For example, a second UE 120-2 may transmit a PC5 RRC response message in connection with receiving the PC5 RRC message including the forwarded sidelink BWP configuration. In some aspects, the second UE 120-2 may transmit the PC5 RRC response in a PC5 RRC broadcast message on the SRB0-like using the configured sidelink broadcast or common control logic channel. In some aspects, the second UE 120-2 may transmit the PC5 RRC response in a PC5 groupcast message on the SRBg configured for the group of UEs using the configured sidelink group common control logic channel. In some aspects, in a case in which an RRC connection is established between the first UE 120-1 and the second UE 120-2, the second UE 120-2 may transmit the PC5 RRC response to the first UE 120-1 in a unicast PC5 RRC reconfiguration complete message (e.g., RRCReconfigurationCompleteSidelink).

As further shown in FIG. 12, and by reference number 1235, the first UE 120-1 may transmit an RRC reconfiguration complete message (e.g., RRCReconfigurationComplete) in connection with receiving the RRC message (e.g., the RRC reconfiguration message) including the sidelink BWP configuration from the base station 110. In some aspects, the first UE 120-1 may transmit the aggregated PC5 RRC responses received one or more second UEs 120-2 to the base station 110. In some aspects, one or more of the second UEs 120-2 that are in the coverage area of the base station 110 may also transmit respective RRC reconfiguration complete messages to the base station 110 in connection with receiving the RRC message (e.g., the RRC reconfiguration message) including the sidelink BWP configuration from the base station 110.

As further shown in FIG. 12, and by reference number 1240, the base station 110 may select one or more sidelink carriers to be used by the first UE 120-1 for sidelink communications (e.g., broadcast, groupcast, or unicast sidelink communications) to the second UE(s) 120-2. The base station 110 may also determine, for each selected sidelink carrier an active BWP to be used for sidelink communications on that selected sidelink carrier. The base station 110 may select the active BWP for a selected sidelink carrier from the configured sidelink BWPs for that sidelink carrier in the sidelink BWP configuration. For example, the base station 110 may determine the one or more selected sidelink carrier and/or the active sidelink BWP for each selected sidelink carrier based at least in part on a service or service type associated with the sidelink communications, a destination ID associated with the sidelink communications, a traffic pattern associated with the sidelink communications, one or more QoS parameters associated with the sidelink communications, and/or measurements received from UEs (e.g., via sidelink UE assistance information).

In some aspects, the base station 110 may use an RRC message (e.g., an RRC reconfiguration message) to indicate the one or more selected sidelink carriers and the active BWP for each selected sidelink carrier. For example, the base station 110 may transmit, to the first UE 120-1 (and/or the second UE(s) 120-2), an RRC configuration of one or more selected sidelink carriers and the active BWP for each selected sidelink carrier in a RRC reconfiguration message. In some aspects, as shown by reference number 1245 in FIG. 12, the base station 110 may use a MAC-CE (e.g., a Uu MAC-CE) to indicate the one or more selected sidelink carriers and the active sidelink BWP for each selected sidelink carrier.

As further shown in FIG. 12, and by reference number 1245, in some aspects, the base station 110 may transmit, to the first UE 120-1, a MAC-CE activation that includes an indication of the one or more selected sidelink carriers and the active sidelink BWP (e.g., the sidelink BWP to be activated) for each selected sidelink carrier. In some aspects, the base station 110 may also transmit to MAC-CE activation to one or more of the second UEs 120-2 that are in a coverage area of the base station 110. The base station 110 may transmit the MAC-CE activation to activate a sidelink BWP on at least one selected sidelink carrier for the first UE 120-1 and/or one or more other UEs (e.g., one or more second UEs 120-2). Additionally, and/or alternatively, the base station 110 may transmit, to the first UE 120-1 and/or one or more other UEs, a MAC-CE deactivation that identifies a sidelink BWP to be deactivated for at least one selected sidelink carrier.

As further shown in FIG. 12, and by reference number 1250, the first UE 120-1 may forward the MAC-CE activation to one or more of the second UEs 120-2 that are outside of the coverage range of the base station 110. In some aspects, the first UE 120-1 may broadcast or groupcast a PC5 MAC-CE that includes the indication of the one or more selected sidelink carriers and the active sidelink BWP for each selected sidelink carrier. In this case, the second UEs 120-2 within the coverage area of the first UE 120-1 may receive the PC5 MAC-CE including the indication of the one or more selected sidelink carriers and the active sidelink BWP for each selected sidelink carrier. In some aspects, in a case in which a PC5 RRC connection is established between the first UE 120-1 and a second UE 120-2, the first UE 120-1 may transmit the PC5 MAC-CE to the second UE 120-2 in a unicast transmission (e.g., over the PSSCH).

As further shown in FIG. 12, and by reference number 1255, the second UEs 120-2 that receive the forwarded PC5 MAC-CE from the first UE 120-1 may transmit respective a feedback (e.g., ACK/NACK for PC5 MAC CE) in connection with receiving the PC5 MAC-CE activation. The first UE 120-1 may receive the feedback transmitted from the second UEs 120-2 that are outside of the coverage area of the base station 110.

As further shown in FIG. 12, and by reference number 1260, the first UE 120-1 may transmit a feedback (e.g., ACK/NACK for MAC CE) to the base station 110 in connection with receiving the MAC-CE activation transmitted by the base station 110. In some aspects, the first UE 120-1 may transmit aggregated ACK/NACK responses received from the second UEs 120-2. In some aspects, the first UE 120-1 may transmit an ACK/NACK based on the ACK/NACK responses received from the second UE 120-2 (e.g., transmit ACK, if all received responses are ACKs, or if a certain number of the responses or at least one response is ACK, or if no response is NACK). In some aspects, one or more of the second UEs 120-2 that are in the coverage area of the base station 110 may also transmit respective a feedback (e.g., ACK/NACK for MAC CE) to the base station 110 in connection with receiving the MAC-CE activation transmitted by the base station 110.

In some aspects, the base station 110 may use DCI to dynamically indicate activation, deactivation, or switching of an active sidelink BWP on each of at least one selected sidelink carrier for one or more sidelink communications. As shown in FIG. 12, and by reference number 1265, the base station 110 may select one or more sidelink carriers for a sidelink communication to be transmitted by the first UE 120-1. The base station 110 may determine the active sidelink BWP for each selected sidelink carrier. As further shown in FIG. 12, and by reference number 1270, the base station 110 may transmit, to the first UE 120-1 (e.g., the Tx UE), DCI that includes an indication of the one or more selected sidelink carriers and the active sidelink BWP for each selected sidelink carrier. In some aspects, the base station 110 may transmit the DCI to one or more of the second UEs 120-2 (e.g., one or more Rx UEs) that are within the coverage area of the base station 110.

In some aspects, such as a case in which the base station 110 schedules sidelink communications for the first UE 120-1, an indication of a selected sidelink carrier and the active sidelink BWP for the selected sidelink carrier may be included in scheduling DCI that schedules a sidelink communication for the first UE 120-1. In this case, the DCI may indicate at least one selected sidelink carrier and the active sidelink BWP (for each selected sidelink carrier) to be used by the first UE 120-1 to transmit the sidelink communication scheduled by the DCI. In some aspects, the at least one selected sidelink carrier and the active sidelink BWP for each selected sidelink carrier may be indicated by using a first index or code point of a lookup table with combinations of sidelink carriers and associated sidelink BWPs for an initial transmission and second index or code point for reserved retransmission if the retransmission is reserved on different sidelink carrier, or by using one index or codepoint for both initial transmission and retransmission(s). In some aspects, the at least one selected sidelink carrier and the active sidelink BWP for each selected sidelink carrier may be indicated by using sidelink carrier index or ID with the associated sidelink BWP index or ID.

As further shown in FIG. 12, and by reference number 1275, the first UE 120-1 may forward the indication of the at least one selected sidelink carrier and an active sidelink BWP for each selected sidelink carrier to one or more of the second UEs 120-2 that are outside of the coverage area of the base station 110. For example, the first UE 120-1 may transmit SCI that includes the indication of the at least one selected sidelink carrier and an active sidelink BWP for each selected sidelink carrier to one or more of the second UEs 120-2 that are outside of the coverage area of the base station 110. In some aspects, the UE 120-1 may broadcast or groupcast the SCI, and the second UEs 120-2 that are outside of the coverage area of the base station 110 may receive the SCI from the first UE 120-1.

In some aspects, based at least in part on the indication of the at least one selected sidelink carrier and the active sidelink BWP for each selected sidelink carrier (e.g., in the DCI received from the base station 110), the first UE 120-1 may transmit a sidelink communication (e.g., the sidelink communication scheduled by the SCI) in the active sidelink BWP on each selected sidelink carrier. For example, the sidelink communication may be a sidelink broadcast communication, a sidelink groupcast communication, or a sidelink unicast communication. Based at least in part on the indication of the at least one selected sidelink carrier and the active sidelink BWP for each selected sidelink carrier (e.g., in the DCI received from the base station 110 and/or the SCI received from the first UE 120-1), the one or more second UEs 120-2 may receive the sidelink communication transmitted by first UE 120-1 in the active sidelink BWP on each selected sidelink carrier.

In some aspects, an RRC message, a MAC-CE, and/or DCI (e.g., for indicating at least one selected sidelink carrier and an associated active sidelink BWP) may be transmitted on an anchor downlink BWP on an anchor carrier, which may be configured for the UEs or may be selected by the base station 110. In some aspects, an RRC message, a MAC-CE, and/or DCI (e.g., for indicating at least one selected sidelink carrier and an associated active sidelink BWP) may be transmitted on a common/initial BWP on a carrier, which may be configured for the UEs or may be selected by the base station 110.

As indicated above, FIG. 12 is provided as an example. Other examples may differ from what is described with respect to FIG. 12.

Figure 13:
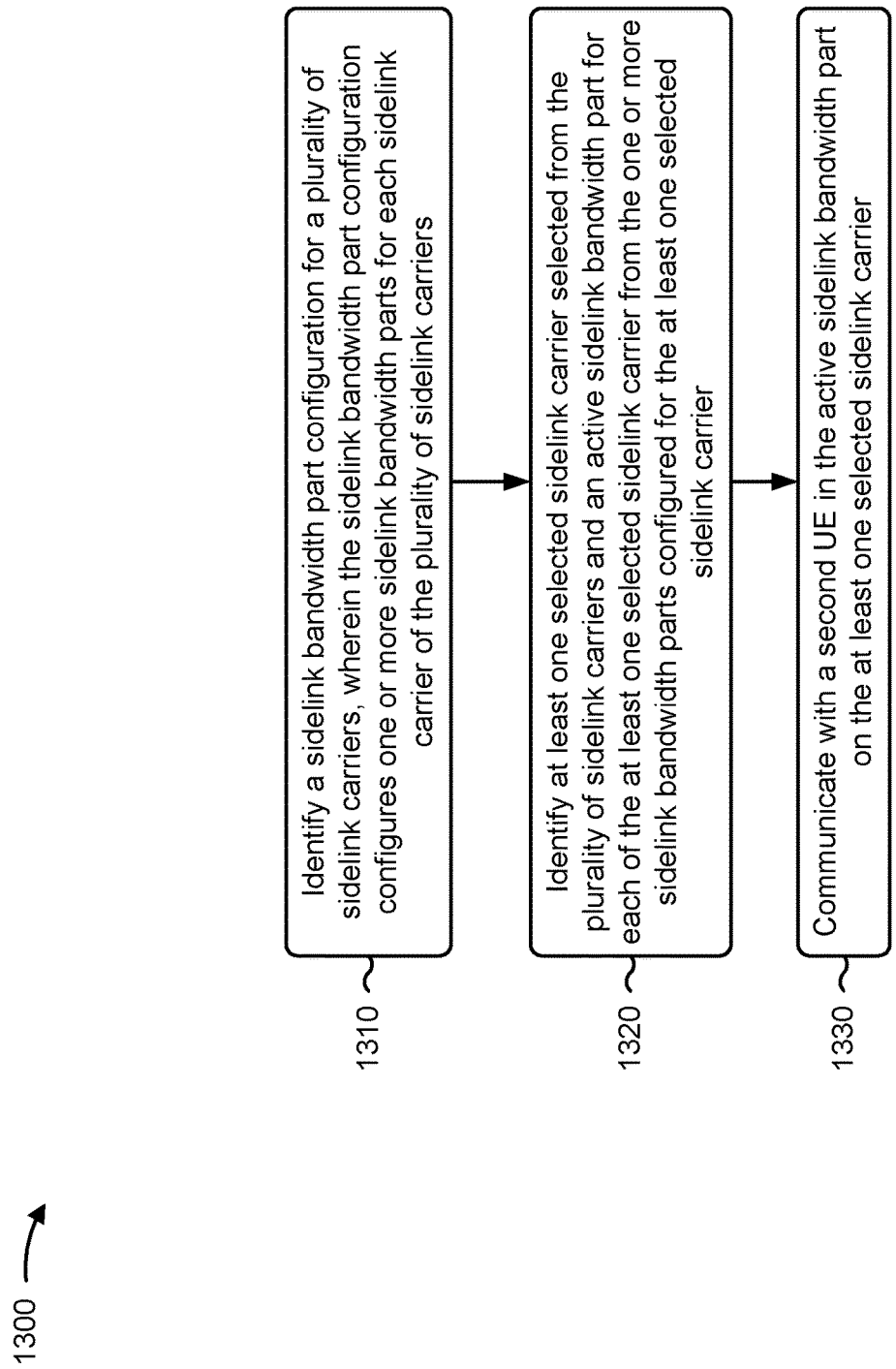
FIGS. 13-15 are diagrams illustrating example processes associated with sidelink bandwidth parts with sidelink carrier aggregation, in accordance with the present disclosure.

FIG. 13 is a diagram illustrating an example process 1300 performed, for example, by a first UE, in accordance with the present disclosure. Example process 1300 is an example where the first UE (e.g., UE 120) performs operations associated with sidelink bandwidth parts with sidelink carrier aggregation.

As shown in FIG. 13, in some aspects, process 1300 may include identifying a sidelink bandwidth part configuration for a plurality of sidelink carriers, wherein the sidelink bandwidth part configuration configures one or more sidelink bandwidth parts for each sidelink carrier of the plurality of sidelink carriers (block 1310). For example, the first UE (e.g., using communication manager 140 and/or identification component 1608, depicted in FIG. 16) may identify a sidelink bandwidth part configuration for a plurality of sidelink carriers, wherein the sidelink bandwidth part configuration configures one or more sidelink bandwidth parts for each sidelink carrier of the plurality of sidelink carriers, as described above.

As further shown in FIG. 13, in some aspects, process 1300 may include identifying at least one selected sidelink carrier selected from the plurality of sidelink carriers and an active sidelink bandwidth part for each of the at least one selected sidelink carrier from the one or more sidelink bandwidth parts configured for the at least one selected sidelink carrier (block 1320). For example, the first UE (e.g., using communication manager 140 and/or identification component 1608, depicted in FIG. 16) may identify at least one selected sidelink carrier selected from the plurality of sidelink carriers and an active sidelink bandwidth part for each of the at least one selected sidelink carrier from the one or more sidelink bandwidth parts configured for the at least one selected sidelink carrier, as described above.

As further shown in FIG. 13, in some aspects, process 1300 may include communicating with a second UE in the active sidelink bandwidth part on each of the at least one selected sidelink carrier (block 1330). For example, the first UE (e.g., using communication manager 140, reception component 1602, and/or transmission component 1604, depicted in FIG. 16) may communicate with a second UE in the active sidelink bandwidth part on each of the at least one selected sidelink carrier, as described above.

Process 1300 may include additional aspects, such as any single aspect or any combination of aspects described below and/or in connection with one or more other processes described elsewhere herein.

In a first aspect, for each of the one or more sidelink bandwidth parts configured for a sidelink carrier of the plurality of sidelink carriers, the sidelink bandwidth part configuration configures a respective bandwidth of the sidelink bandwidth part and a respective offset of the sidelink bandwidth part, and the respective offset of the sidelink bandwidth part is an offset from a frequency reference point associated with the sidelink carrier.

In a second aspect, alone or in combination with the first aspect, for each of the one or more sidelink bandwidth parts configured for the sidelink carrier of the plurality of sidelink carriers, the respective bandwidth of the sidelink bandwidth part is based at least in part on a quality of service parameter associated with the sidelink bandwidth part.

In a third aspect, alone or in combination with one or more of the first and second aspects, for each of the one or more sidelink bandwidth parts configured for the sidelink carrier of the plurality of sidelink carriers, the respective offset of the sidelink bandwidth part is based at least in part on at least one of a service type associated with the sidelink bandwidth part, a destination identifier associated with the sidelink bandwidth part, a PC5 radio resource control connection associated with the sidelink bandwidth part, or a traffic pattern associated with the sidelink bandwidth part.

In a fourth aspect, alone or in combination with one or more of the first through third aspects, the one or more sidelink bandwidth parts configured for a first sidelink carrier of the plurality of sidelink carriers include multiple sidelink bandwidth parts including a first sidelink bandwidth part associated with a first service type and a second sidelink bandwidth part associated with a second service type.

In a fifth aspect, alone or in combination with one or more of the first through fourth aspects, the one or more sidelink bandwidth parts configured for a second sidelink carrier of the plurality of sidelink carriers include a third sidelink bandwidth part associated with the first service type.

In a sixth aspect, alone or in combination with one or more of the first through fifth aspects, the one or more sidelink bandwidth parts configured for a first sidelink carrier of the plurality of sidelink carriers include multiple sidelink bandwidth parts including a first sidelink bandwidth part associated with a first destination identifier and a second sidelink bandwidth part associated with a second destination identifier.

In a seventh aspect, alone or in combination with one or more of the first through sixth aspects, the one or more sidelink bandwidth parts configured for a sidelink carrier of the plurality of sidelink carriers include multiple sidelink bandwidth parts including a first sidelink bandwidth part associated with a first traffic pattern and a second sidelink bandwidth part associated with a second sidelink bandwidth pattern, and the sidelink bandwidth part configuration configures a first timer duration associated with the first sidelink bandwidth part and a second timer duration associated with the second sidelink bandwidth part.

In an eighth aspect, alone or in combination with one or more of the first through seventh aspects, identifying the sidelink bandwidth part configuration includes determining the sidelink bandwidth part configuration for a PC5 RRC connection between the first UE and the second UE, and the sidelink bandwidth part configuration is a bi-directional configuration for unicast sidelink communications between the first UE and the second UE or a unidirectional configuration for unicast sidelink communications from the first UE to the second UE or from the second UE to the first UE.

In a ninth aspect, alone or in combination with one or more of the first through eighth aspects, process 1300 includes receiving, from the second UE and based at least in part on establishing the PC5 RRC connection, a first PC5 RRC message including UE capability information or UE assistance information that indicates sidelink carriers supported by the second UE and sidelink bandwidth part parameters associated with the sidelink carriers supported by the second UE, and determining the sidelink bandwidth part configuration for the PC5 RRC connection between the first UE and the second UE includes determining the sidelink bandwidth part configuration based at least in part on the UE capability information or UE assistance information received from the second UE, and transmitting, to the second UE, a second PC5 RRC message that indicates the plurality of sidelink carriers and the one or more sidelink bandwidth parts configured for each sidelink carrier of the plurality of sidelink carriers configured in the sidelink bandwidth part configuration.

In a tenth aspect, alone or in combination with one or more of the first through ninth aspects, determining the sidelink bandwidth part configuration based at least in part on the UE capability information or the UE assistance information received from the second UE includes adjusting at least one of the plurality of sidelink carriers or the one or more bandwidth parts configured for one or more of the plurality of sidelink carriers from an initial sidelink bandwidth part configuration associated with the first UE based at least in part on the UE capability information or the UE assistance information received from the second UE.

In an eleventh aspect, alone or in combination with one or more of the first through tenth aspects, the second PC5 RRC message is a PC5 RRC reconfiguration message, and further comprising receiving, from the second UE in connection with transmitting the PC5 RRC reconfiguration message, a PC5 RRC reconfiguration complete message or a PC5 RRC reconfiguration failure message that indicates at least one of a rejected sidelink bandwidth part configured for a sidelink carrier in the sidelink bandwidth part configuration or a revised sidelink bandwidth part configuration.

In a twelfth aspect, alone or in combination with one or more of the first through eleventh aspects, identifying the sidelink bandwidth part configuration includes transmitting, to the second UE in connection with establishing an RRC connection between the first UE and the second UE, a first PC5 RRC message including UE capability information or UE assistance information that indicates sidelink carriers supported by the first UE and sidelink bandwidth part parameters associated with the sidelink carriers supported by the first UE, and receiving the sidelink bandwidth part configuration from the second UE in a second PC5 RRC message, and the sidelink bandwidth part configuration is a bi-directional configuration for unicast sidelink communications between the first UE and the second UE or a unidirectional configuration for unicast sidelink communications to the first UE from the second UE or from the first UE to the second UE.

In a thirteenth aspect, alone or in combination with one or more of the first through twelfth aspects, identifying the sidelink bandwidth part configuration includes determining, in connection with establishing a PC5 RRC connection between the first UE and the second UE, a first sidelink bandwidth part configuration, and the first sidelink bandwidth part configuration is a unidirectional configuration for transmitting unicast sidelink communications to the second UE or receiving unicast sidelink communications from the second UE, and receiving, in connection with establishing the PC5 RRC connection, a second sidelink bandwidth part configuration, and the second sidelink bandwidth part configuration is a unidirectional configuration for receiving unicast sidelink communications from the second UE or transmitting unicast sidelink communications to the second UE.

In a fourteenth aspect, alone or in combination with one or more of the first through thirteenth aspects, identifying the at least one selected sidelink carrier and the active sidelink bandwidth part for the at least one selected sidelink carrier includes selecting the at least one selected sidelink carrier from the plurality of carriers, and selecting the active sidelink bandwidth part for each of at least one selected sidelink carrier.

In a fifteenth aspect, alone or in combination with one or more of the first through fourteenth aspects, communicating with the second UE includes transmitting at least one of a groupcast sidelink communication or a broadcast sidelink communication to one or more other UEs including the second UE in the respective active sidelink bandwidth parts on the one or more selected sidelink carriers, and identifying the sidelink bandwidth part configuration includes receiving the sidelink bandwidth part configuration from a third UE.

In a sixteenth aspect, alone or in combination with one or more of the first through fifteenth aspects, receiving the sidelink bandwidth part configuration includes receiving, from the third UE, a sidelink master information block including the sidelink bandwidth part configuration or sidelink system information including the sidelink bandwidth part configuration.

In a seventeenth aspect, alone or in combination with one or more of the first through sixteenth aspects, process 1300 includes transmitting, to the third UE, UE capability information or UE assistance information, wherein the UE capability information or the UE assistance information includes at least one of sidelink component carrier information associated with the first UE or sidelink bandwidth part information associated with the first UE, and wherein receiving the sidelink bandwidth part configuration includes receiving, from the third UE, the sidelink bandwidth part configuration in at least one of a PC5 RRC broadcast message or a PC5 RRC groupcast message based at least in part on transmitting the UE capability information or the UE assistance information to the third UE.

In an eighteenth aspect, alone or in combination with one or more of the first through seventeenth aspects, process 1300 includes receiving, from the second UE, UE capability information or UE assistance information for the second UE, forwarding, to the third UE, the UE capability information or the UE assistance information for the second UE, and forwarding the sidelink bandwidth part configuration to the second UE in at least one of a PC5 RRC broadcast message on a sidelink radio bearer configured for PC5 RRC broadcast messages or a PC5 RRC groupcast message on a sidelink radio bearer configured for a group of UEs including the first UE and the second UE.

In a nineteenth aspect, alone or in combination with one or more of the first through eighteenth aspects, identifying the at least one selected sidelink carrier selected from the plurality of sidelink carriers and the active sidelink bandwidth part for each of the at least one selected sidelink carrier from the one or more sidelink bandwidth parts configured for the at least one selected sidelink carrier includes receiving, from the third UE, an indication of the at least one selected sidelink carrier and the active bandwidth part for each of the at least one selected sidelink carrier in at least one of a PC5 MAC-CE, SCI, or PC5 RRC configuration included in a PC5 RRC groupcast message or a PC5 RRC broadcast message.

In a twentieth aspect, alone or in combination with one or more of the first through nineteenth aspects, process 1300 includes forwarding the indication of the at least one selected sidelink carrier and the active bandwidth part for each of the at least one selected sidelink carrier to the second UE in at least one of a PC5 MAC-CE, SCI, a PC5 RRC broadcast message, or a PC5 RRC groupcast message.

In a twenty-first aspect, alone or in combination with one or more of the first through twentieth aspects, receiving the indication of the at least one selected sidelink carrier and the active bandwidth part for each of the at least one selected sidelink carrier includes receiving the at least one of the PC5 MAC-CE, the SCI, or the PC5 RRC configuration in an anchor sidelink bandwidth part on an anchor sidelink carrier for the first UE.

In a twenty-second aspect, alone or in combination with one or more of the first through twenty-first aspects, identifying the sidelink bandwidth part configuration includes receiving the sidelink bandwidth part configuration from a base station.

In a twenty-third aspect, alone or in combination with one or more of the first through twenty-second aspects, receiving the sidelink bandwidth part configuration includes receiving, from the base station, system information including the sidelink bandwidth part configuration.

In a twenty-fourth aspect, alone or in combination with one or more of the first through twenty-third aspects, process 1300 includes transmitting, to the base station, UE capability information or UE assistance information, wherein the UE capability information or the UE assistance information includes at least one of sidelink component carrier information associated with the first UE or sidelink bandwidth part information associated with the first UE, and wherein receiving the sidelink bandwidth part configuration includes receiving, from the base station, an RRC configuration message including the sidelink bandwidth part configuration based at least in part on transmitting the UE capability information or the UE assistance information to the base station.

In a twenty-fifth aspect, alone or in combination with one or more of the first through twenty-fourth aspects, process 1300 includes receiving, from the second UE, UE capability information or UE assistance information for the second UE, forwarding, to the base station, the UE capability information or the UE assistance information for the second UE, and forwarding the sidelink bandwidth part configuration to the second UE in at least one of a PC5 RRC broadcast message on a sidelink radio bearer configured for PC5 RRC broadcast messages or a PC5 RRC groupcast message on a sidelink radio bearer configured for a group of UEs including the first UE and the second UE.

In a twenty-sixth aspect, alone or in combination with one or more of the first through twenty-fifth aspects, identifying the at least one selected sidelink carrier selected from the plurality of sidelink carriers and the active sidelink bandwidth part for each of the at least one selected sidelink carrier from the one or more sidelink bandwidth parts configured for each of the at least one selected sidelink carrier includes receiving, from the base station, an indication of the at least one selected sidelink carrier and the active bandwidth part for each of the at least one selected sidelink carrier in at least one of a MAC-CE, DCI, or an RRC message.

In a twenty-seventh aspect, alone or in combination with one or more of the first through twenty-sixth aspects, process 1300 includes forwarding the indication of the at least one selected sidelink carrier and the active bandwidth part for each of the at least one selected sidelink carrier to the second UE in at least one of a PC5 MAC-CE, SCI, a PC5 RRC broadcast message, or a PC5 RRC groupcast message.

In a twenty-eighth aspect, alone or in combination with one or more of the first through twenty-seventh aspects, receiving the indication of the at least one selected sidelink carrier and the active bandwidth part for the at least one selected sidelink carrier includes receiving the at least one of the MAC-CE, the DCI, or the RRC message in an anchor downlink bandwidth part on an anchor carrier for the first UE.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
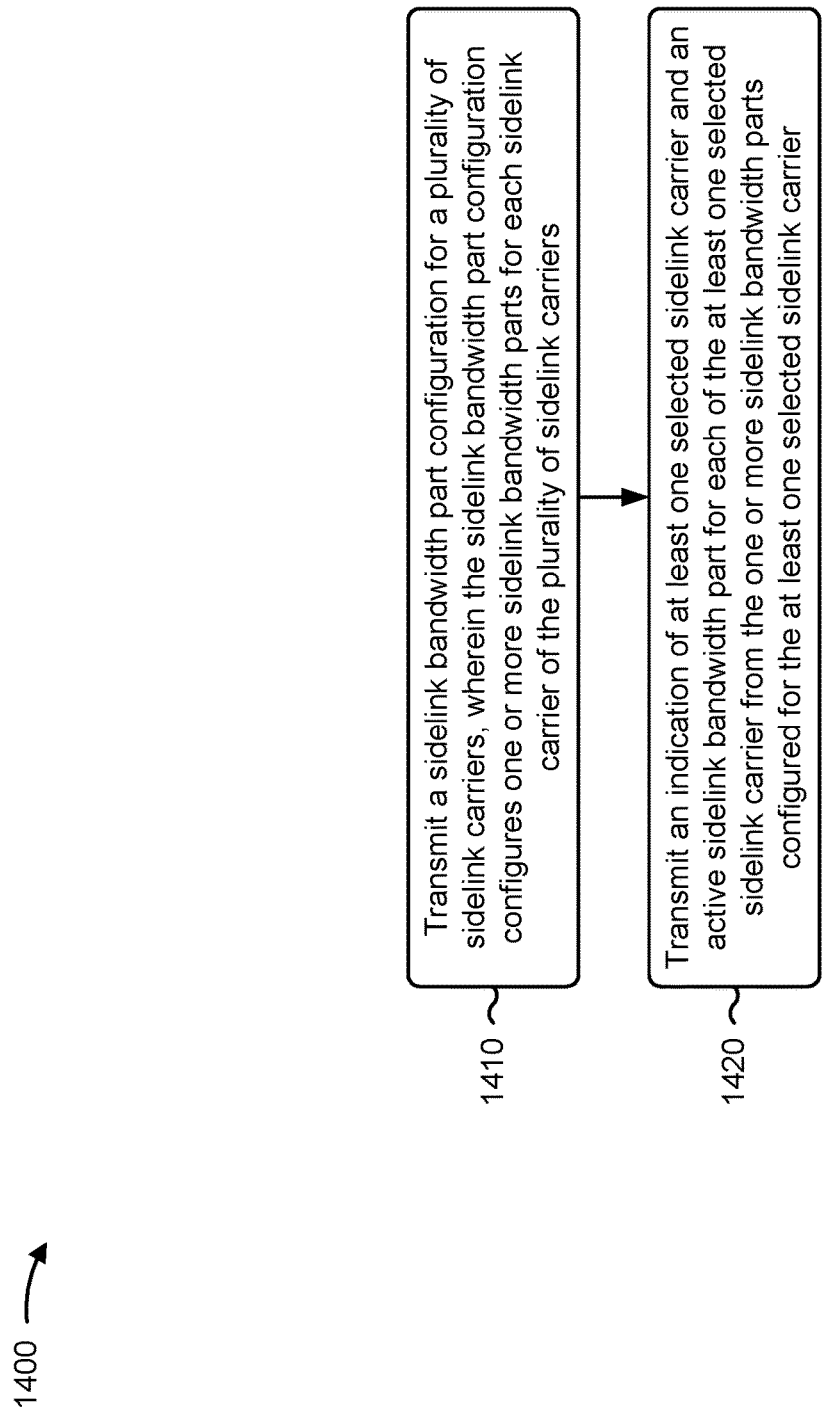

FIG. 14 is a diagram illustrating an example process 1400 performed, for example, by a UE, in accordance with the present disclosure. Example process 1400 is an example where the UE (e.g., UE 120) performs operations associated with sidelink bandwidth parts with sidelink carrier aggregation.

As shown in FIG. 14, in some aspects, process 1400 may include transmitting, to one or more other UEs, a sidelink bandwidth part configuration for a plurality of sidelink carriers, wherein the sidelink bandwidth part configuration configures one or more sidelink bandwidth parts for each sidelink carrier of the plurality of sidelink carriers (block 1410). For example, the UE (e.g., using communication manager 140 and/or transmission component 1604, depicted in FIG. 16) may transmit, to one or more other UEs, a sidelink bandwidth part configuration for a plurality of sidelink carriers, wherein the sidelink bandwidth part configuration configures one or more sidelink bandwidth parts for each sidelink carrier of the plurality of sidelink carriers, as described above.

As further shown in FIG. 14, in some aspects, process 1400 may include transmitting, to the one or more other UEs, an indication of at least one selected sidelink carrier and an active sidelink bandwidth part for each of the at least one selected sidelink carrier from the one or more sidelink bandwidth parts configured for the at least one selected sidelink carrier (block 1420). For example, the UE (e.g., using communication manager 140 and/or transmission component 1604, depicted in FIG. 16) may transmit, to the one or more other UEs, an indication of at least one selected sidelink carrier and an active sidelink bandwidth part for each of the at least one selected sidelink carrier from the one or more sidelink bandwidth parts configured for the at least one selected sidelink carrier, as described above.

Process 1400 may include additional aspects, such as any single aspect or any combination of aspects described below and/or in connection with one or more other processes described elsewhere herein.

In a first aspect, for each of the one or more sidelink bandwidth parts configured for a sidelink carrier of the plurality of sidelink carriers, the sidelink bandwidth part configuration configures a respective bandwidth of the sidelink bandwidth part and a respective offset of the sidelink bandwidth part, and the respective offset of the sidelink bandwidth part is an offset from a frequency reference point associated with the sidelink carrier.

In a second aspect, alone or in combination with the first aspect, for each of the one or more sidelink bandwidth parts configured for the sidelink carrier of the plurality of sidelink carriers, the respective bandwidth of the sidelink bandwidth part is based at least in part on a quality of service parameter associated with the sidelink bandwidth part.

In a third aspect, alone or in combination with one or more of the first and second aspects, for each of the one or more sidelink bandwidth parts configured for the sidelink carrier of the plurality of sidelink carriers, the respective offset of the sidelink bandwidth part is based at least in part on at least one of a service type associated with the sidelink bandwidth part, a destination identifier associated with the sidelink bandwidth part, a PC5 radio resource control connection associated with the sidelink bandwidth part, or a traffic pattern associated with the sidelink bandwidth part.

In a fourth aspect, alone or in combination with one or more of the first through third aspects, the one or more sidelink bandwidth parts configured for a first sidelink carrier of the plurality of sidelink carriers include a first sidelink bandwidth part associated with a first service type and a second sidelink bandwidth part associated with a second service type.

In a fifth aspect, alone or in combination with one or more of the first through fourth aspects, the one or more sidelink bandwidth parts configured for a second sidelink carrier of the plurality of sidelink carriers include a third sidelink bandwidth part associated with the first service type.

In a sixth aspect, alone or in combination with one or more of the first through fifth aspects, the one or more sidelink bandwidth parts configured for a first sidelink carrier of the plurality of sidelink carriers include a first sidelink bandwidth part associated with a first destination identifier and a second sidelink bandwidth part associated with a second destination identifier.

In a seventh aspect, alone or in combination with one or more of the first through sixth aspects, the one or more sidelink bandwidth parts configured for a sidelink carrier of the plurality of sidelink carriers include a first sidelink bandwidth part associated with a first traffic pattern and a second sidelink bandwidth part associated with a second sidelink bandwidth pattern, and the sidelink bandwidth part configuration configures a first timer duration associated with the first sidelink bandwidth part and a second timer duration associated with the second sidelink bandwidth part.

In an eighth aspect, alone or in combination with one or more of the first through seventh aspects, transmitting the sidelink bandwidth part configuration includes transmitting a sidelink master information block including the sidelink bandwidth part configuration or sidelink system information including the sidelink bandwidth part configuration.

In a ninth aspect, alone or in combination with one or more of the first through eighth aspects, process 1400 includes receiving UE capability information or UE assistance information for the one or more other UEs, wherein the UE capability information or the UE assistance information includes at least one of sidelink component carrier information associated with the one or more other UEs or sidelink bandwidth part information associated with the one or more other UEs, and wherein transmitting the sidelink bandwidth part configuration includes transmitting the sidelink bandwidth part configuration in at least one of a PC5 RRC broadcast message or a PC5 RRC groupcast message based at least in part on receiving the UE capability information or the UE assistance information for the one or more other UEs.

In a tenth aspect, alone or in combination with one or more of the first through ninth aspects, transmitting the indication of at least one selected sidelink carrier and an active sidelink bandwidth part for each of the at least one selected sidelink carrier includes transmitting the indication of the at least one selected sidelink carrier and the active bandwidth part for each of the at least one selected sidelink carrier in at least one of a PC5 MAC-CE, SCI, or PC5 RRC configuration included in a PC5 RRC groupcast message or a PC5 RRC broadcast message.

In an eleventh aspect, alone or in combination with one or more of the first through tenth aspects, transmitting the indication of the at least one selected sidelink carrier and the active bandwidth part for each of the at least one selected sidelink carrier further includes transmitting the at least one of the PC5 MAC-CE, the SCI, or the PC5 RRC configuration in an anchor sidelink bandwidth part on an anchor sidelink carrier for the UE.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
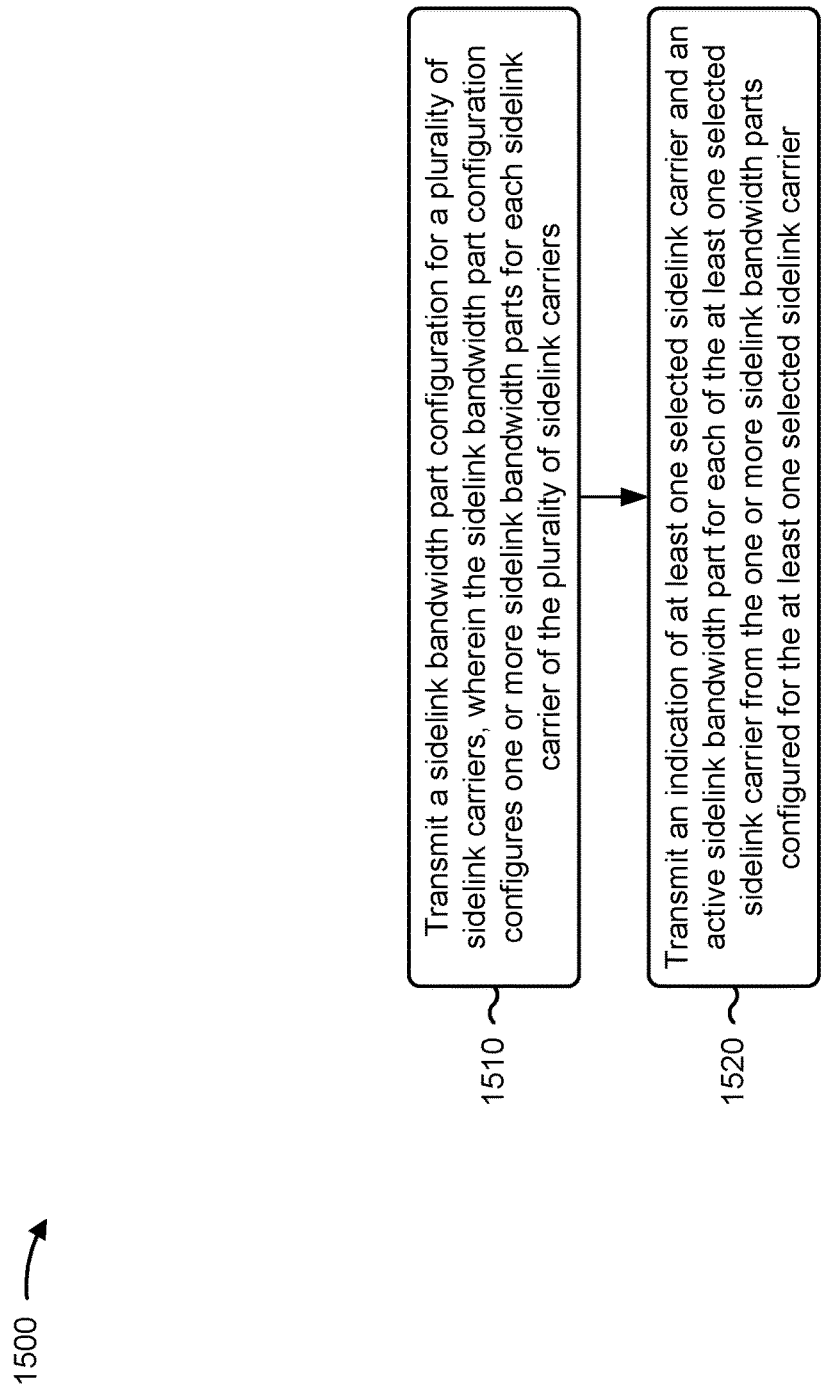

FIG. 15 is a diagram illustrating an example process 1500 performed, for example, by a base station, in accordance with the present disclosure. Example process 1500 is an example where the base station (e.g., base station 110) performs operations associated with sidelink bandwidth parts with sidelink carrier aggregation.

As shown in FIG. 15, in some aspects, process 1500 may include transmitting, to a UE, a sidelink bandwidth part configuration for a plurality of sidelink carriers, wherein the sidelink bandwidth part configuration configures one or more sidelink bandwidth parts for each sidelink carrier of the plurality of sidelink carriers (block 1510). For example, the base station (e.g., using communication manager 150 and/or transmission component 1704, depicted in FIG. 17) may transmit, to a UE, a sidelink bandwidth part configuration for a plurality of sidelink carriers, wherein the sidelink bandwidth part configuration configures one or more sidelink bandwidth parts for each sidelink carrier of the plurality of sidelink carriers, as described above.

As further shown in FIG. 15, in some aspects, process 1500 may include transmitting, to the UE, an indication of at least one selected sidelink carrier and an active sidelink bandwidth part for each of the at least one selected sidelink carrier from the one or more sidelink bandwidth parts configured for the at least one selected sidelink carrier (block 1520). For example, the base station (e.g., using communication manager 150 and/or transmission component 1704, depicted in FIG. 17) may transmit, to the UE, an indication of at least one selected sidelink carrier and an active sidelink bandwidth part for each of the at least one selected sidelink carrier from the one or more sidelink bandwidth parts configured for the at least one selected sidelink carrier, as described above.

Process 1500 may include additional aspects, such as any single aspect or any combination of aspects described below and/or in connection with one or more other processes described elsewhere herein.

In a first aspect, for each of the one or more sidelink bandwidth parts configured for a sidelink carrier of the plurality of sidelink carriers, the sidelink bandwidth part configuration configures a respective bandwidth of the sidelink bandwidth part and a respective offset of the sidelink bandwidth part, and the respective offset of the sidelink bandwidth part is an offset from a frequency reference point associated with the sidelink carrier.

In a second aspect, alone or in combination with the first aspect, for each of the one or more sidelink bandwidth parts configured for the sidelink carrier of the plurality of sidelink carriers, the respective bandwidth of the sidelink bandwidth part is based at least in part on a quality of service parameter associated with the sidelink bandwidth part.

In a third aspect, alone or in combination with one or more of the first and second aspects, for each of the one or more sidelink bandwidth parts configured for the sidelink carrier of the plurality of sidelink carriers, the respective offset of the sidelink bandwidth part is based at least in part on at least one of a service type associated with the sidelink bandwidth part, a destination identifier associated with the sidelink bandwidth part, a PC5 radio resource control connection associated with the sidelink bandwidth part, or a traffic pattern associated with the sidelink bandwidth part.

In a fourth aspect, alone or in combination with one or more of the first through third aspects, the one or more sidelink bandwidth parts configured for a first sidelink carrier of the plurality of sidelink carriers include a first sidelink bandwidth part associated with a first service type and a second sidelink bandwidth part associated with a second service type.

In a fifth aspect, alone or in combination with one or more of the first through fourth aspects, the one or more sidelink bandwidth parts configured for a second sidelink carrier of the plurality of sidelink carriers include a third sidelink bandwidth part associated with the first service type.

In a sixth aspect, alone or in combination with one or more of the first through fifth aspects, the one or more sidelink bandwidth parts configured for a first sidelink carrier of the plurality of sidelink carriers include a first sidelink bandwidth part associated with a first destination identifier and a second sidelink bandwidth part associated with a second destination identifier.

In a seventh aspect, alone or in combination with one or more of the first through sixth aspects, the one or more sidelink bandwidth parts configured for a sidelink carrier of the plurality of sidelink carriers include a first sidelink bandwidth part associated with a first traffic pattern and a second sidelink bandwidth part associated with a second sidelink bandwidth pattern, and the sidelink bandwidth part configuration configures a first timer duration associated with the first sidelink bandwidth part and a second timer duration associated with the second sidelink bandwidth part.

In an eighth aspect, alone or in combination with one or more of the first through seventh aspects, transmitting the sidelink bandwidth part configuration includes transmitting system information including the sidelink bandwidth part configuration.

In a ninth aspect, alone or in combination with one or more of the first through eighth aspects, process 1500 includes receiving, from the UE, UE capability information or UE assistance information, wherein the UE capability information or the UE assistance information includes at least one of sidelink component carrier information associated with the UE or sidelink bandwidth part information associated with the UE, and wherein transmitting the sidelink bandwidth part configuration includes transmitting, to the UE, a RRC configuration message including the sidelink bandwidth part configuration based at least in part on receiving the UE capability information or the UE assistance information.

In a tenth aspect, alone or in combination with one or more of the first through ninth aspects, transmitting the indication of at least one selected sidelink carrier and an active sidelink bandwidth part for each of the at least one selected sidelink carrier includes transmitting, to the UE, the indication of the at least one selected sidelink carrier and the active bandwidth part for each of the at least one selected sidelink carrier in at least one of a MAC-CE, DCI, or an RRC message.

In an eleventh aspect, alone or in combination with one or more of the first through tenth aspects, transmitting the indication of the at least one selected sidelink carrier and the active bandwidth part for the at least one selected sidelink carrier further includes transmitting the at least one of the MAC-CE, the DCI, or the RRC message in an anchor downlink bandwidth part on an anchor carrier for the UE.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
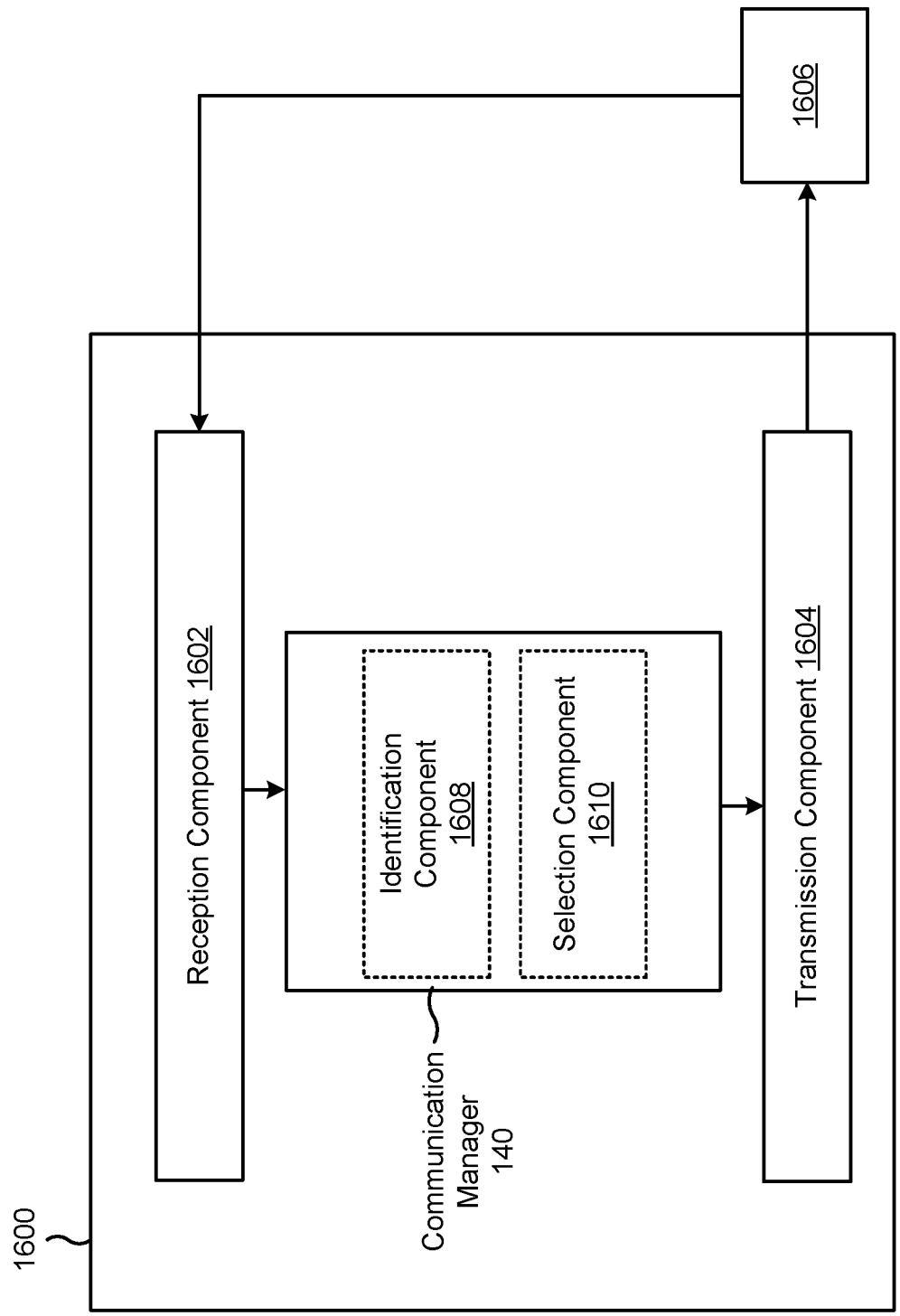
FIGS. 16-17 are diagrams of example apparatuses for wireless communication, in accordance with the present disclosure.

FIG. 16 is a diagram of an example apparatus 1600 for wireless communication. The apparatus 1600 may be a UE, or a UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 140. The communication manager 140 may include one or more of an identification component 1608 or a selection component 1610, among other examples.

In some aspects, the apparatus 1600 may be configured to perform one or more operations described herein in connection with FIGS. 6-12. Additionally, or alternatively, the apparatus 1600 may be configured to perform one or more processes described herein, such as process 1300 of FIG. 13, process 1400 of FIG. 14, or a combination thereof. In some aspects, the apparatus 1600 and/or one or more components shown in FIG. 16 may include one or more components of the UE described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a modem, a demodulator, a MIMO detector, a receive processor, a controller/processor, a memory, or a combination thereof, of the UE described in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the UE described in connection with FIG. 2. In some aspects, the transmission component 1604 may be co-located with the reception component 1602 in a transceiver.

The identification component 1608 may identify a sidelink bandwidth part configuration for a plurality of sidelink carriers, wherein the sidelink bandwidth part configuration configures one or more sidelink bandwidth parts for each sidelink carrier of the plurality of sidelink carriers. The identification component 1608 may identify at least one selected sidelink carrier selected from the plurality of sidelink carriers and an active sidelink bandwidth part for each of the at least one selected sidelink carrier from the one or more sidelink bandwidth parts configured for the at least one selected sidelink carrier. The reception component 1602 and/or the transmission component 1604 may communicate with a second UE in the active sidelink bandwidth part on each of the at least one selected sidelink carrier.

The reception component 1602 may receive, from the second UE and based at least in part on establishing the PC5 RRC connection, a first PC5 RRC message including UE capability information or UE assistance information that indicates sidelink carriers supported by the second UE and sidelink bandwidth part parameters associated with the sidelink carriers supported by the other UE.

The transmission component 1604 may transmit, to the second UE, a second PC5 RRC message that indicates the plurality of sidelink carriers and the one or more sidelink bandwidth parts configured for each sidelink carrier of the plurality of sidelink carriers configured in the sidelink bandwidth part configuration.

The selection component 1610 may select the at least one selected sidelink carrier.

The transmission component 1604 may transmit, to the second UE, at least one of a PC5 RRC message including a configuration of the at least one selected sidelink carrier and the active bandwidth part for each of the at least one selected sidelink carrier, a PC5 MAC-CE including an indication of the at least one selected sidelink carrier and the active bandwidth part for each of the at least one selected sidelink carrier, or SCI including an indication of the at least one selected sidelink carrier and the active bandwidth part for each of the at least one selected sidelink carrier.

The transmission component 1604 may transmit, to a third UE, UE capability information or UE assistance information, wherein the UE capability information or the UE assistance information includes at least one of sidelink component carrier information associated with the UE or sidelink bandwidth part information associated with the UE.

The reception component 1602 may receive, from the second UE, UE capability information or UE assistance information for the second UE.

The transmission component 1604 may forward, to the third UE, the UE capability information or the UE assistance information for the second UE.

The transmission component 1604 may forward the sidelink bandwidth part configuration to the second UE in at least one of a PC5 RRC broadcast message on a sidelink radio bearer configured for PC5 RRC broadcast messages or a PC5 RRC groupcast message on a sidelink radio bearer configured for a group of UEs including the UE and the second UE.

The transmission component 1604 may forward the indication of the at least one selected sidelink carrier and the active bandwidth part for each of the at least one selected sidelink carrier to the second UE in at least one of a PC5 MAC-CE, SCI, a PC5 RRC broadcast message, or a PC5 RRC groupcast message.

The transmission component 1604 may transmit, to the base station, UE capability information or UE assistance information, wherein the UE capability information or the UE assistance information includes at least one of sidelink component carrier information associated with the UE or sidelink bandwidth part information associated with the UE.

The reception component 1602 may receive, from the second UE, UE capability information or UE assistance information for the second UE.

The transmission component 1604 may forward, to the base station, the UE capability information or the UE assistance information for the second UE.

The transmission component 1604 may forward the sidelink bandwidth part configuration to the second UE in at least one of a PC5 RRC broadcast message on a sidelink radio bearer configured for PC5 RRC broadcast messages or a PC5 RRC groupcast message on a sidelink radio bearer configured for a group of UEs including the UE and the second UE.

The transmission component 1604 may forward the indication of the at least one selected sidelink carrier and the active bandwidth part for each of the at least one selected sidelink carrier to the second UE in at least one of a PC5 MAC-CE, SCI, a PC5 RRC broadcast message, or a PC5 RRC groupcast message.

The transmission component 1604 may transmit, to one or more other UEs, a sidelink bandwidth part configuration for a plurality of sidelink carriers, wherein the sidelink bandwidth part configuration configures one or more sidelink bandwidth parts for each sidelink carrier of the plurality of sidelink carriers. The transmission component 1604 may transmit, to the one or more other UEs, an indication of at least one selected sidelink carrier and an active sidelink bandwidth part for each of the at least one selected sidelink carrier from the one or more sidelink bandwidth parts configured for the at least one selected sidelink carrier.

The reception component 1602 may receive UE capability information or UE assistance information for the one or more other UEs, wherein the UE capability information or the UE assistance information includes at least one of sidelink component carrier information associated with the one or more other UEs or sidelink bandwidth part information associated with the one or more other UEs.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
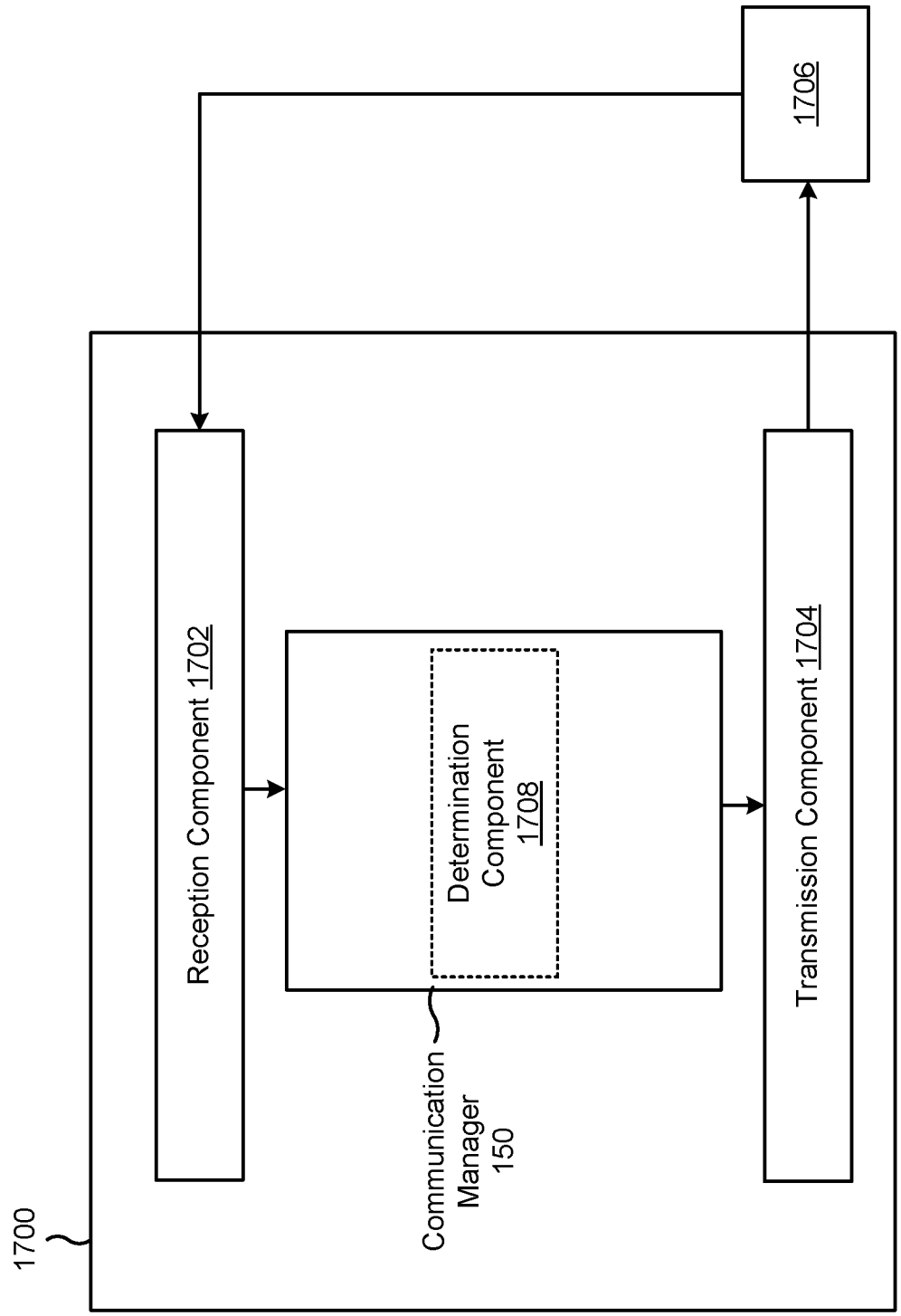

FIG. 17 is a diagram of an example apparatus 1700 for wireless communication. The apparatus 1700 may be a base station, or a base station may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include the communication manager 150. The communication manager 150 may include a determination component 1708, among other examples.

In some aspects, the apparatus 1700 may be configured to perform one or more operations described herein in connection with FIGS. 6-12. Additionally, or alternatively, the apparatus 1700 may be configured to perform one or more processes described herein, such as process 1500 of FIG. 15, or a combination thereof. In some aspects, the apparatus 1700 and/or one or more components shown in FIG. 17 may include one or more components of the base station described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1706. In some aspects, the reception component 1702 may include one or more antennas, a modem, a demodulator, a MIMO detector, a receive processor, a controller/processor, a memory, or a combination thereof, of the base station described in connection with FIG. 2.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the base station described in connection with FIG. 2. In some aspects, the transmission component 1704 may be co-located with the reception component 1702 in a transceiver.

The transmission component 1704 may transmit, to a UE, a sidelink bandwidth part configuration for a plurality of sidelink carriers, wherein the sidelink bandwidth part configuration configures one or more sidelink bandwidth parts for each sidelink carrier of the plurality of sidelink carriers. The transmission component 1704 may transmit, to the UE, an indication of at least one selected sidelink carrier and an active sidelink bandwidth part for each of the at least one selected sidelink carrier from the one or more sidelink bandwidth parts configured for the at least one selected sidelink carrier.

The reception component 1702 may receive, from the UE, UE capability information or UE assistance information, wherein the UE capability information or the UE assistance information includes at least one of sidelink component carrier information associated with the UE or sidelink bandwidth part information associated with the UE.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The following provides an overview of some Aspects of the present disclosure:

Aspect 1: A method of wireless communication performed by a first user equipment (UE), comprising: identifying a sidelink bandwidth part configuration for a plurality of sidelink carriers, wherein the sidelink bandwidth part configuration configures one or more sidelink bandwidth parts for each sidelink carrier of the plurality of sidelink carriers; identifying at least one selected sidelink carrier selected from the plurality of sidelink carriers and an active sidelink bandwidth part for each of the at least one selected sidelink carrier from the one or more sidelink bandwidth parts configured for the at least one selected sidelink carrier; and communicating with a second UE in the active sidelink bandwidth part on each of the at least one selected sidelink carrier.

Aspect 2: The method of Aspect 1, wherein for each of the one or more sidelink bandwidth parts configured for a sidelink carrier of the plurality of sidelink carriers, the sidelink bandwidth part configuration configures a respective bandwidth of the sidelink bandwidth part and a respective offset of the sidelink bandwidth part, and wherein the respective offset of the sidelink bandwidth part is an offset from a frequency reference point associated with the sidelink carrier.

Aspect 3: The method of Aspect 2, wherein for each of the one or more sidelink bandwidth parts configured for the sidelink carrier of the plurality of sidelink carriers, the respective bandwidth of the sidelink bandwidth part is based at least in part on a quality of service parameter associated with the sidelink bandwidth part.

Aspect 4: The method of any of Aspects 2-3, wherein for each of the one or more sidelink bandwidth parts configured for the sidelink carrier of the plurality of sidelink carriers, the respective offset of the sidelink bandwidth part is based at least in part on at least one of a service type associated with the sidelink bandwidth part, a destination identifier associated with the sidelink bandwidth part, a PC5 radio resource control connection associated with the sidelink bandwidth part, or a traffic pattern associated with the sidelink bandwidth part.

Aspect 5: The method of any of Aspects 1-4, wherein the one or more sidelink bandwidth parts configured for a first sidelink carrier of the plurality of sidelink carriers include multiple sidelink bandwidth parts including a first sidelink bandwidth part associated with a first service type and a second sidelink bandwidth part associated with a second service type.

Aspect 6: The method of Aspect 5, wherein the one or more sidelink bandwidth parts configured for a second sidelink carrier of the plurality of sidelink carriers include a third sidelink bandwidth part associated with the first service type.

Aspect 7: The method of any of Aspects 1-6, wherein the one or more sidelink bandwidth parts configured for a first sidelink carrier of the plurality of sidelink carriers include multiple sidelink bandwidth parts including a first sidelink bandwidth part associated with a first destination identifier and a second sidelink bandwidth part associated with a second destination identifier.

Aspect 8: The method of any of Aspects 1-7, wherein the one or more sidelink bandwidth parts configured for a sidelink carrier of the plurality of sidelink carriers include multiple sidelink bandwidth parts including a first sidelink bandwidth part associated with a first traffic pattern and a second sidelink bandwidth part associated with a second sidelink bandwidth pattern, and the sidelink bandwidth part configuration configures a first timer duration associated with the first sidelink bandwidth part and a second timer duration associated with the second sidelink bandwidth part.

Aspect 9: The method of any of Aspects 1-8, wherein identifying the sidelink bandwidth part configuration comprises: determining the sidelink bandwidth part configuration for a PC5 radio resource control (RRC) connection between the first UE and the second UE, wherein the sidelink bandwidth part configuration is a bi-directional configuration for unicast sidelink communications between the first UE and the second UE or a unidirectional configuration for unicast sidelink communications from the first UE to the second UE or from the second UE to the first UE.

Aspect 10: The method of Aspect 9, further comprising: receiving, from the second UE and based at least in part on establishing the PC5 RRC connection, a first PC5 RRC message including UE capability information or UE assistance information that indicates sidelink carriers supported by the second UE and sidelink bandwidth part parameters associated with the sidelink carriers supported by the second UE, wherein determining the sidelink bandwidth part configuration for the PC5 RRC connection between the first UE and the second UE comprises determining the sidelink bandwidth part configuration based at least in part on the UE capability information or UE assistance information received from the second UE; and transmitting, to the second UE, a second PC5 RRC message that indicates the plurality of sidelink carriers and the one or more sidelink bandwidth parts configured for each sidelink carrier of the plurality of sidelink carriers configured in the sidelink bandwidth part configuration.

Aspect 11: The method of Aspect 10, wherein determining the sidelink bandwidth part configuration based at least in part on the UE capability information or the UE assistance information received from the second UE comprises: adjusting at least one of the plurality of sidelink carriers or the one or more bandwidth parts configured for one or more of the plurality of sidelink carriers from an initial sidelink bandwidth part configuration associated with the first UE based at least in part on the UE capability information or the UE assistance information received from the second UE.

Aspect 12: The method of any of Aspects 10-11, wherein the second PC5 RRC message is a PC5 RRC reconfiguration message, and further comprising: receiving, from the second UE in connection with transmitting the PC5 RRC reconfiguration message, a PC5 RRC reconfiguration complete message or a PC5 RRC reconfiguration failure message that indicates at least one of a rejected sidelink bandwidth part configured for a sidelink carrier in the sidelink bandwidth part configuration or a revised sidelink bandwidth part configuration.

Aspect 13: The method of any of Aspects 1-12, wherein identifying the sidelink bandwidth part configuration comprises: transmitting, to the second UE in connection with establishing a radio resource control (RRC) connection between the first UE and the second UE, a first PC5 RRC message including UE capability information or UE assistance information that indicates sidelink carriers supported by the first UE and sidelink bandwidth part parameters associated with the sidelink carriers supported by the first UE; and receiving the sidelink bandwidth part configuration from the second UE in a second PC5 RRC message, wherein the sidelink bandwidth part configuration is a bi-directional configuration for unicast sidelink communications between the first UE and the second UE or a unidirectional configuration for unicast sidelink communications to the first UE from the second UE or from the first UE to the second UE.

Aspect 14: The method of any of Aspects 1-13, wherein identifying the sidelink bandwidth part configuration comprises: determining, in connection with establishing a PC5 radio resource control (RRC) connection between the first UE and the second UE, a first sidelink bandwidth part configuration, wherein the first sidelink bandwidth part configuration is a unidirectional configuration for transmitting unicast sidelink communications to the second UE or receiving unicast sidelink communications from the second UE; and receiving, in connection with establishing the PC5 RRC connection, a second sidelink bandwidth part configuration, wherein the second sidelink bandwidth part configuration is a unidirectional configuration for receiving unicast sidelink communications from the second UE or transmitting unicast sidelink communications to the second UE.

Aspect 15: The method of any of Aspects 1-14, wherein identifying the at least one selected sidelink carrier and the active sidelink bandwidth part for each of the at least one selected sidelink carrier comprises: selecting the at least one selected sidelink carrier from the plurality of sidelink carriers; and selecting the active sidelink bandwidth part for each of at least one selected sidelink carrier.

Aspect 16: The method of Aspect 15, further comprising: transmitting, to the second UE, at least one of: a PC5 radio resource control (RRC) message including a configuration of the at least one selected sidelink carrier and the active bandwidth part for each of the at least one selected sidelink carrier, a PC5 medium access control (MAC) control element (MAC-CE) including an indication of the at least one selected sidelink carrier and the active bandwidth part for each of the at least one selected sidelink carrier, or sidelink control information (SCI) including an indication of the at least one selected sidelink carrier and the active bandwidth part for each of the at least one selected sidelink carrier.

Aspect 17: The method of Aspect 16, wherein transmitting the at least one of the PC5 RRC message, the PC5 MAC-CE or the SCI comprises: transmitting the at least one of the PC5 RRC message, the PC5 MAC-CE, or the SCI in an anchor sidelink bandwidth part on an anchor sidelink carrier for the first UE.

Aspect 18: The method of any of Aspects 1-8, wherein communicating with the second UE comprises transmitting at least one of a groupcast sidelink communication or a broadcast sidelink communication to one or more other UEs including the second UE in the respective active sidelink bandwidth parts on the one or more selected sidelink carriers, and wherein identifying the sidelink bandwidth part configuration comprises: receiving the sidelink bandwidth part configuration from a second other UE.

Aspect 19: The method of Aspect 18, wherein receiving the sidelink bandwidth part configuration comprises: receiving, from the third UE, a sidelink master information block including the sidelink bandwidth part configuration or sidelink system information including the sidelink bandwidth part configuration.

Aspect 20: The method of any of Aspects 18-19, further comprising: transmitting, to the third UE, UE capability information or UE assistance information, wherein the UE capability information or the UE assistance information includes at least one of sidelink component carrier information associated with the first UE or sidelink bandwidth part information associated with the first UE, and wherein receiving the sidelink bandwidth part configuration comprises receiving, from the third UE, the sidelink bandwidth part configuration in at least one of a PC5 radio resource control (RRC) broadcast message or a PC5 RRC groupcast message based at least in part on transmitting the UE capability information or the UE assistance information to the third UE.

Aspect 21: The method of any of Aspects 18-20, further comprising: receiving, from the second UE, UE capability information or UE assistance information for the second UE; forwarding, to the third UE, the UE capability information or the UE assistance information for the second UE; and forwarding the sidelink bandwidth part configuration to the second UE in at least one of a PC5 radio resource control (RRC) broadcast message on a sidelink radio bearer configured for PC5 RRC broadcast messages or a PC5 RRC groupcast message on a sidelink radio bearer configured for a group of UEs including the first UE and the second UE.

Aspect 22: The method of any of Aspects 18-21, wherein identifying the at least one selected sidelink carrier and the active sidelink bandwidth part for each of the at least one selected sidelink carrier comprises: receiving, from the third UE, an indication of the at least one selected sidelink carrier and the active bandwidth part for each of the at least one selected sidelink carrier in at least one of a PC5 medium access control (MAC) control element (MAC-CE), sidelink control information (SCI), or PC5 radio resource control (RRC) configuration included in a PC5 RRC groupcast message or a PC5 RRC broadcast message.

Aspect 23: The method of Aspect 22, further comprising: forwarding the indication of the at least one selected sidelink carrier and the active bandwidth part for each of the at least one selected sidelink carrier to the second UE in at least one of a PC5 MAC-CE, SCI, a PC5 RRC broadcast message, or a PC5 RRC groupcast message.

Aspect 24: The method of any of Aspects 22-23, wherein receiving the indication of the at least one selected sidelink carrier and the active bandwidth part for each of the at least one selected sidelink carrier comprises: receiving the at least one of the PC5 MAC-CE, the SCI, or the PC5 RRC configuration in an anchor sidelink bandwidth part on an anchor sidelink carrier for the first UE.

Aspect 25: The method of any of Aspects 1-8, wherein identifying the sidelink bandwidth part configuration comprises: receiving the sidelink bandwidth part configuration from a base station.

Aspect 26: The method of Aspect 25, wherein receiving the sidelink bandwidth part configuration comprises: receiving, from the base station, system information including the sidelink bandwidth part configuration.

Aspect 27: The method of any of Aspects 25-26, further comprising: transmitting, to the base station, UE capability information or UE assistance information, wherein the UE capability information or the UE assistance information includes at least one of sidelink component carrier information associated with the first UE or sidelink bandwidth part information associated with the first UE, and wherein receiving the sidelink bandwidth part configuration comprises receiving, from the base station, a radio resource control (RRC) configuration message including the sidelink bandwidth part configuration based at least in part on transmitting the UE capability information or the UE assistance information to the base station.

Aspect 28: The method of any of Aspects 25-27, further comprising: receiving, from the second UE, UE capability information or UE assistance information for the second UE; forwarding, to the base station, the UE capability information or the UE assistance information for the second UE; and forwarding the sidelink bandwidth part configuration to the second UE in at least one of a PC5 radio resource control (RRC) broadcast message on a sidelink radio bearer configured for PC5 RRC broadcast messages or a PC5 RRC groupcast message on a sidelink radio bearer configured for a group of UEs including the first UE and the second UE.

Aspect 29: The method of any of Aspects 25-28, wherein identifying the at least one selected sidelink carrier and the active sidelink bandwidth part for each of the at least one selected sidelink carrier comprises: receiving, from the base station, an indication of the at least one selected sidelink carrier and the active bandwidth part for each of the at least one selected sidelink carrier in at least one of a medium access control (MAC) control element (MAC-CE), downlink control information (DCI), or a radio resource control (RRC) message.

Aspect 30: The method of Aspect 29, further comprising: forwarding the indication of the at least one selected sidelink carrier and the active bandwidth part for each of the at least one selected sidelink carrier to the second UE in at least one of a PC5 MAC-CE, SCI, a PC5 RRC broadcast message, or a PC5 RRC groupcast message.

Aspect 31: The method of any of Aspects 29-30, wherein receiving the indication of the at least one selected sidelink carrier and the active bandwidth part for the at least one selected sidelink carrier comprises: receiving the at least one of the MAC-CE, the DCI, or the RRC message in an anchor downlink bandwidth part on an anchor carrier for the first UE.

Aspect 32: A method of wireless communication performed by a UE, comprising: transmitting, to one or more other UEs, a sidelink bandwidth part configuration for a plurality of sidelink carriers, wherein the sidelink bandwidth part configuration configures one or more sidelink bandwidth parts for each sidelink carrier of the plurality of sidelink carriers; and transmitting, to the one or more other UEs, an indication of at least one selected sidelink carrier and an active sidelink bandwidth part for each of the at least one selected sidelink carrier from the one or more sidelink bandwidth parts configured for the at least one selected sidelink carrier.

Aspect 33: The method of Aspect 32, wherein for each of the one or more sidelink bandwidth parts configured for a sidelink carrier of the plurality of sidelink carriers, the sidelink bandwidth part configuration configures a respective bandwidth of the sidelink bandwidth part and a respective offset of the sidelink bandwidth part, and wherein the respective offset of the sidelink bandwidth part is an offset from a frequency reference point associated with the sidelink carrier.

Aspect 34: The method of Aspect 33, wherein for each of the one or more sidelink bandwidth parts configured for the sidelink carrier of the plurality of sidelink carriers, the respective bandwidth of the sidelink bandwidth part is based at least in part on a quality of service parameter associated with the sidelink bandwidth part.

Aspect 35: The method of any of Aspects 33-34, wherein for each of the one or more sidelink bandwidth parts configured for the sidelink carrier of the plurality of sidelink carriers, the respective offset of the sidelink bandwidth part is based at least in part on at least one of a service type associated with the sidelink bandwidth part, a destination identifier associated with the sidelink bandwidth part, a PC5 radio resource control connection associated with the sidelink bandwidth part, or a traffic pattern associated with the sidelink bandwidth part.

Aspect 36: The method of any of Aspects 32-25, wherein the one or more sidelink bandwidth parts configured for a first sidelink carrier of the plurality of sidelink carriers include a first sidelink bandwidth part associated with a first service type and a second sidelink bandwidth part associated with a second service type.

Aspect 37: The method of Aspect 36, wherein the one or more sidelink bandwidth parts configured for a second sidelink carrier of the plurality of sidelink carriers include a third sidelink bandwidth part associated with the first service type.

Aspect 38: The method of any of Aspects 32-37, wherein the one or more sidelink bandwidth parts configured for a first sidelink carrier of the plurality of sidelink carriers include a first sidelink bandwidth part associated with a first destination identifier and a second sidelink bandwidth part associated with a second destination identifier.

Aspect 39: The method of any of Aspects 32-38, wherein the one or more sidelink bandwidth parts configured for a sidelink carrier of the plurality of sidelink carriers include a first sidelink bandwidth part associated with a first traffic pattern and a second sidelink bandwidth part associated with a second sidelink bandwidth pattern, and the sidelink bandwidth part configuration configures a first timer duration associated with the first sidelink bandwidth part and a second timer duration associated with the second sidelink bandwidth part.

Aspect 40: The method of any of Aspects 32-39, wherein transmitting the sidelink bandwidth part configuration comprises: transmitting a sidelink master information block including the sidelink bandwidth part configuration or sidelink system information including the sidelink bandwidth part configuration.

Aspect 41: The method of any of Aspects 32-40, further comprising: receiving UE capability information or UE assistance information for the one or more other UEs, wherein the UE capability information or the UE assistance information includes at least one of sidelink component carrier information associated with the one or more other UEs or sidelink bandwidth part information associated with the one or more other UEs, and wherein transmitting the sidelink bandwidth part configuration comprises transmitting the sidelink bandwidth part configuration in at least one of a PC5 radio resource control (RRC) broadcast message or a PC5 RRC groupcast message based at least in part on receiving the UE capability information or the UE assistance information for the one or more other UEs.

Aspect 42: The method of any of Aspects 32-41, wherein transmitting the indication of at least one selected sidelink carrier and an active sidelink bandwidth part for each of the at least one selected sidelink carrier comprises: transmitting the indication of the at least one selected sidelink carrier and the active bandwidth part for each of the at least one selected sidelink carrier in at least one of a PC5 medium access control (MAC) control element (MAC-CE), sidelink control information (SCI), or PC5 radio resource control (RRC) configuration included in a PC5 RRC groupcast message or a PC5 RRC broadcast message.

Aspect 43: The method of Aspect 42, wherein transmitting the indication of the at least one selected sidelink carrier and the active bandwidth part for each of the at least one selected sidelink carrier further comprises: transmitting the at least one of the PC5 MAC-CE, the SCI, or the PC5 RRC configuration in an anchor sidelink bandwidth part on an anchor sidelink carrier for the UE.

Aspect 44: A method of wireless communication performed by a base station, comprising: transmitting, to a UE, a sidelink bandwidth part configuration for a plurality of sidelink carriers, wherein the sidelink bandwidth part configuration configures one or more sidelink bandwidth parts for each sidelink carrier of the plurality of sidelink carriers; and transmitting, to the UE, an indication of at least one selected sidelink carrier and an active sidelink bandwidth part for each of the at least one selected sidelink carrier from the one or more sidelink bandwidth parts configured for the at least one selected sidelink carrier.

Aspect 45: The method of Aspect 44, wherein for each of the one or more sidelink bandwidth parts configured for a sidelink carrier of the plurality of sidelink carriers, the sidelink bandwidth part configuration configures a respective bandwidth of the sidelink bandwidth part and a respective offset of the sidelink bandwidth part, and wherein the respective offset of the sidelink bandwidth part is an offset from a frequency reference point associated with the sidelink carrier.

Aspect 46: The method of Aspect 45, wherein for each of the one or more sidelink bandwidth parts configured for the sidelink carrier of the plurality of sidelink carriers, the respective bandwidth of the sidelink bandwidth part is based at least in part on a quality of service parameter associated with the sidelink bandwidth part.

Aspect 47: The method of any of Aspects 45-46, wherein for each of the one or more sidelink bandwidth parts configured for the sidelink carrier of the plurality of sidelink carriers, the respective offset of the sidelink bandwidth part is based at least in part on at least one of a service type associated with the sidelink bandwidth part, a destination identifier associated with the sidelink bandwidth part, a PC5 radio resource control connection associated with the sidelink bandwidth part, or a traffic pattern associated with the sidelink bandwidth part.

Aspect 48: The method of any of Aspects 44-47, wherein the one or more sidelink bandwidth parts configured for a first sidelink carrier of the plurality of sidelink carriers include a first sidelink bandwidth part associated with a first service type and a second sidelink bandwidth part associated with a second service type.

Aspect 49: The method of Aspect 48, wherein the one or more sidelink bandwidth parts configured for a second sidelink carrier of the plurality of sidelink carriers include a third sidelink bandwidth part associated with the first service type.

Aspect 50: The method of any of Aspects 44-49, wherein the one or more sidelink bandwidth parts configured for a first sidelink carrier of the plurality of sidelink carriers include a first sidelink bandwidth part associated with a first destination identifier and a second sidelink bandwidth part associated with a second destination identifier.

Aspect 51: The method of any of Aspects 44-50, wherein the one or more sidelink bandwidth parts configured for a sidelink carrier of the plurality of sidelink carriers include a first sidelink bandwidth part associated with a first traffic pattern and a second sidelink bandwidth part associated with a second sidelink bandwidth pattern, and the sidelink bandwidth part configuration configures a first timer duration associated with the first sidelink bandwidth part and a second timer duration associated with the second sidelink bandwidth part.

Aspect 52: The method of any of Aspects 44-51, wherein transmitting the sidelink bandwidth part configuration comprises: transmitting system information including the sidelink bandwidth part configuration.

Aspect 53: The method of any of Aspects 44-52, further comprising: receiving, from the UE, UE capability information or UE assistance information, wherein the UE capability information or the UE assistance information includes at least one of sidelink component carrier information associated with the UE or sidelink bandwidth part information associated with the UE, and wherein transmitting the sidelink bandwidth part configuration comprises transmitting, to the UE, a radio resource control (RRC) configuration message including the sidelink bandwidth part configuration based at least in part on receiving the UE capability information or the UE assistance information.

Aspect 54: The method of any of Aspects 44-53, wherein transmitting the indication of at least one selected sidelink carrier and an active sidelink bandwidth part for each of the at least one selected sidelink carrier comprises: transmitting, to the UE, the indication of the at least one selected sidelink carrier and the active bandwidth part for each of the at least one selected sidelink carrier in at least one of a medium access control (MAC) control element (MAC-CE), downlink control information (DCI), or a radio resource control (RRC) message.

Aspect 55: The method of Aspect 54, wherein transmitting the indication of the at least one selected sidelink carrier and the active bandwidth part for the at least one selected sidelink carrier further comprises: transmitting the at least one of the MAC-CE, the DCI, or the RRC message in an anchor downlink bandwidth part on an anchor carrier for the UE.

Aspect 56: An apparatus for wireless communication at a device, comprising a processor; memory coupled with the processor; and instructions stored in the memory and executable by the processor to cause the apparatus to perform the method of one or more of Aspects 1-31.

Aspect 57: An apparatus for wireless communication at a device, comprising a processor; memory coupled with the processor; and instructions stored in the memory and executable by the processor to cause the apparatus to perform the method of one or more of Aspects 32-43.

Aspect 58: An apparatus for wireless communication at a device, comprising a processor; memory coupled with the processor; and instructions stored in the memory and executable by the processor to cause the apparatus to perform the method of one or more of Aspects 44-55.

Aspect 59: A device for wireless communication, comprising a memory and one or more processors coupled to the memory, the one or more processors configured to perform the method of one or more of Aspects 1-31.

Aspect 60: A device for wireless communication, comprising a memory and one or more processors coupled to the memory, the one or more processors configured to perform the method of one or more of Aspects 32-43.

Aspect 61: A device for wireless communication, comprising a memory and one or more processors coupled to the memory, the one or more processors configured to perform the method of one or more of Aspects 44-55.

Aspect 62: An apparatus for wireless communication, comprising at least one means for performing the method of one or more of Aspects 1-31.

Aspect 63: An apparatus for wireless communication, comprising at least one means for performing the method of one or more of Aspects 32-43.

Aspect 64: An apparatus for wireless communication, comprising at least one means for performing the method of one or more of Aspects 44-55.

Aspect 65: A non-transitory computer-readable medium storing code for wireless communication, the code comprising instructions executable by a processor to perform the method of one or more of Aspects 1-31.

Aspect 66: A non-transitory computer-readable medium storing code for wireless communication, the code comprising instructions executable by a processor to perform the method of one or more of Aspects 32-43.

Aspect 67: A non-transitory computer-readable medium storing code for wireless communication, the code comprising instructions executable by a processor to perform the method of one or more of Aspects 44-55.

Aspect 68: A non-transitory computer-readable medium storing a set of instructions for wireless communication, the set of instructions comprising one or more instructions that, when executed by one or more processors of a device, cause the device to perform the method of one or more of Aspects 1-31.

Aspect 69: A non-transitory computer-readable medium storing a set of instructions for wireless communication, the set of instructions comprising one or more instructions that, when executed by one or more processors of a device, cause the device to perform the method of one or more of Aspects 32-43.

Aspect 70: A non-transitory computer-readable medium storing a set of instructions for wireless communication, the set of instructions comprising one or more instructions that, when executed by one or more processors of a device, cause the device to perform the method of one or more of Aspects 44-55.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
a memory; and
one or more processors, coupled to the memory, configured to:
identify a sidelink bandwidth part configuration for a plurality of sidelink carriers, wherein the sidelink bandwidth part configuration configures one or more sidelink bandwidth parts for each sidelink carrier of the plurality of sidelink carriers;
identify, at least one selected sidelink carrier selected from the plurality of sidelink carriers and an active sidelink bandwidth part for each of the at least one selected sidelink carrier from the one or more sidelink bandwidth parts configured for the at least one selected sidelink carrier;
communicate with a second UE in the active sidelink bandwidth part on each of the at least one selected sidelink carrier; and
wherein the one or more sidelink bandwidth parts configured for a sidelink carrier of the plurality of sidelink carriers include multiple sidelink bandwidth parts including a first sidelink bandwidth part associated with a first traffic pattern and a second sidelink bandwidth part associated with a second sidelink bandwidth pattern, and the sidelink bandwidth part configuration configures a first timer duration associated with the first sidelink bandwidth part and a second timer duration associated with the second sidelink bandwidth part.

2. A first user equipment (UE) for wireless communication, comprising:
a memory; and
one or more processors, coupled to the memory, configured to:
identify a sidelink bandwidth part configuration for a plurality of sidelink carriers, wherein the sidelink bandwidth part configuration configures one or more sidelink bandwidth parts for each sidelink carrier of the plurality of sidelink carriers;
identify, at least one selected sidelink carrier selected from the plurality of sidelink carriers and an active sidelink bandwidth part for each of the at least one selected sidelink carrier from the one or more sidelink bandwidth parts configured for the at least one selected sidelink carrier;
communicate with a second UE in the active sidelink bandwidth part on each of the at least one selected sidelink carrier; and
wherein the one or more processors are further configured to:
determine the sidelink bandwidth part configuration for a PC5 radio resource control (RRC) connection between the first UE and the second UE, wherein the sidelink bandwidth part configuration is a bi-directional configuration for unicast sidelink communications between the first UE and the second UE or a unidirectional configuration for unicast sidelink communications from the first UE to the second UE or from the second UE to first UE;
receive, from the second UE and based at least in part on establishing the PC5 RRC connection, a first PC5 RRC message including UE capability information or UE assistance information that indicates sidelink carriers supported by the second UE and sidelink bandwidth part parameters associated with the sidelink carriers supported by the second UE, wherein the one or more processors, to determine the sidelink bandwidth part configuration for the PC5 RRC connection between the first UE and the second UE, are configured to determine the sidelink bandwidth part configuration based at least in part on the UE capability information or UE assistance information received from the second UE; and transmit, to the second UE, a second PC5 RRC message that indicates the plurality of sidelink carriers and the one or more sidelink bandwidth parts configured for each sidelink carrier of the plurality of sidelink carriers configured in the sidelink bandwidth part configuration.

3. A first user equipment (UE) for wireless communication, comprising:

a memory; and one or more processors, coupled to the memory, configured to:

identify a sidelink bandwidth part configuration for a plurality of sidelink carriers, wherein the sidelink bandwidth part configuration configures one or more sidelink bandwidth parts for each sidelink carrier of the plurality of sidelink carriers;

identify, at least one selected sidelink carrier selected from the plurality of sidelink carriers and an active sidelink bandwidth part for each of the at least one selected sidelink carrier from the one or more sidelink bandwidth parts configured for the at least one selected sidelink carrier;

communicate with a second UE in the active sidelink bandwidth part on each of the at least one selected sidelink carrier; and wherein the one or more processors, to communicate with the second UE, are configured to transmit at least one of a groupcast sidelink communication or a broadcast sidelink communication to one or more other UEs including the second UE in the respective active sidelink bandwidth parts on the one or more selected sidelink carriers, and wherein the one or more processors, to identify the sidelink bandwidth part configuration, are configured to:

receive the sidelink bandwidth part configuration from a third UE; and wherein the one or more processors, to identify the at least one selected sidelink carrier and the active sidelink bandwidth part for each of the at least one selected sidelink carrier, are configured to:

receive, from the third UE, an indication of the at least one selected sidelink carrier and the active bandwidth part for each of the at least one selected sidelink carrier in at least one of a PC5 medium access control (MAC) control element (MAC-CE), sidelink control information (SCI), or PC5 radio resource control (RRC) configuration included in a PC5 RRC groupcast message or a PC5 RRC broadcast message.

4. The first UE of claim 3, wherein the one or more processors are further configured to:

forward the indication of the at least one selected sidelink carrier and the active bandwidth part for each of the at least one selected sidelink carrier to the second UE in at least one of a PC5 MAC-CE, SCI, a PC5 RRC broadcast message, or a PC5 RRC groupcast message.

5. A first user equipment (UE) for wireless communication, comprising:

a memory; and one or more processors, coupled to the memory, configured to:

identify a sidelink bandwidth part configuration for a plurality of sidelink carriers, wherein the sidelink bandwidth part configuration configures one or more sidelink bandwidth parts for each sidelink carrier of the plurality of sidelink carriers;

identify, at least one selected sidelink carrier selected from the plurality of sidelink carriers and an active sidelink bandwidth part for each of the at least one selected sidelink carrier from the one or more sidelink bandwidth parts configured for the at least one selected sidelink carrier;

communicate with a second UE in the active sidelink bandwidth part on each of the at least one selected sidelink carrier; and wherein the one or more processors, to identify the sidelink bandwidth part configuration, are configured to:

receive the sidelink bandwidth part configuration from a base station; and wherein the one or more processors are further configured to:

receive, from the second UE, UE capability information or UE assistance information for the second UE;

forward, to the base station, the UE capability information or the UE assistance information for the second UE; and forward the sidelink bandwidth part configuration to the second UE in at least one of a PC5 radio resource control (RRC) broadcast message on a sidelink radio bearer configured for PC5 RRC broadcast messages or a PC5 RRC groupcast message on a sidelink radio bearer configured for a group of UEs including the first UE and the second UE.

* * * * *